US012449693B2

(12) United States Patent
Matsuda et al.

(10) Patent No.: US 12,449,693 B2
(45) Date of Patent: Oct. 21, 2025

(54) DISPLAY DEVICE THAT INCLUDES LIGHT BLOCKING PORTION WITH INCLINED PORTION

(71) Applicant: Sharp Display Technology Corporation, Kameyama (JP)

(72) Inventors: Noboru Matsuda, Kameyama (JP); Shinpei Higashida, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 35 days.

(21) Appl. No.: 18/402,193

(22) Filed: Jan. 2, 2024

(65) Prior Publication Data

US 2024/0272471 A1 Aug. 15, 2024

(30) Foreign Application Priority Data

Feb. 10, 2023 (JP) .................................. 2023-018989
May 30, 2023 (JP) ................................. 2023-088758

(51) Int. Cl.
*G02F 1/1335* (2006.01)
*G02F 1/1343* (2006.01)
*G02F 1/1362* (2006.01)

(52) U.S. Cl.
CPC .. *G02F 1/133512* (2013.01); *G02F 1/133514* (2013.01); *G02F 1/134309* (2013.01); *G02F 1/136222* (2021.01)

(58) Field of Classification Search
CPC ......... G02F 1/134372; G02F 1/134363; G02F 1/133707; G02F 1/133512
See application file for complete search history.

(56) References Cited

U.S. PATENT DOCUMENTS

2007/0229748 A1* 10/2007 Fujita ................ G02F 1/134363
349/141
2014/0043575 A1* 2/2014 Lee .................... G02F 1/134363
349/139

FOREIGN PATENT DOCUMENTS

JP         6603577 B2    11/2019

\* cited by examiner

*Primary Examiner* — Lauren Nguyen
(74) *Attorney, Agent, or Firm* — ScienBiziP, P.C.

(57) ABSTRACT

A display device includes a light blocking portion and a slit. A portion of an upper layer electrode overlapping a lower layer electrode is provided with a slit extending along a second direction inclined with respect to a first direction. An inclined portion extending along a third direction inclined toward the same side as the second direction with respect to the first direction is included in an end portion, of outer peripheral end portions of the light blocking portion, adjacent to the slit in the first direction. A second angle of the inclined portion that is an angle formed by the third direction with respect to the first direction is larger than a first angle that is an angle formed by the second direction with respect to the first direction.

17 Claims, 69 Drawing Sheets

DISPLAY DEVICE THAT INCLUDES LIGHT BLOCKING PORTION WITH INCLINED PORTION

CROSS-REFERENCE TO RELATED APPLICATIONS

This application claims the benefit of priority to Japanese Patent Application Numbers 2023-088758 and 2023-018989 filed on May 30, 2023 and Feb. 10, 2023, respectively. The entire contents of each of the above-identified applications are hereby incorporated by reference.

BACKGROUND

Technical Field

The technique disclosed in the present specification relates to a display device.

In the related art, a liquid crystal display device disclosed in JP 6603577 B is known as an example of a display device. The liquid crystal display device described in JP 6603577 B includes a first substrate, a second substrate facing the first substrate, and a liquid crystal layer sealed between the first substrate and the second substrate. Further, the first substrate includes a scanning line, a signal line, a switching element electrically connected to the scanning line and the signal line, a first electrode, a color filter layer, a common wiring line in contact with the first electrode along the signal line, a reflection suppressing layer located on the common wiring line, an insulating layer covering the reflection suppressing layer and the first electrode, a second electrode electrically connected to the switching element through a contact hole formed as an opening formed at least in the insulating layer and the color filter layer, an inflow preventing layer forming a protruding portion surrounding the contact hole, and an alignment film covering the insulating layer, the second electrode, and the inflow preventing layer.

SUMMARY

When the liquid crystal display device described in JP 6603577 B is manufactured, there is a possibility that the second electrode, the common wiring line, and the reflection suppressing layer are displaced to either the left or the right in the first direction. When such displacement occurs, part of the common wiring line and the reflection suppressing layer may enter a slit between two belt-shaped electrodes constituting the second electrode. The belt-shaped electrodes are parallel to the common wiring line and the reflection suppressing layer. Thus, when the above-described displacement occurs, part of the common wiring line and the reflection suppressing layer is inserted over the entire length of the slit. The common wiring line and the reflection suppressing layer have the same potential as the first electrode. Thus, when part of the common wiring line and the reflection suppressing layer is inserted over the entire length of the slit as described above, distortion or the like of the electrical field applied to the liquid crystal layer may occur. Therefore, the luminance may be reduced, and as a result, a dark line might be visually recognized.

The techniques described herein have been made based on the circumstances described above, and an object thereof is to suppress reduction in luminance.

(1) A display device according to a technique described herein includes: a first color filter; a second color filter arranged side by side with the first color filter in the same layer, and exhibiting a color different from a color exhibited by the first color filter; a first pixel electrode disposed on an upper layer side of the first color filter and disposed overlapping the first color filter; a second pixel electrode disposed on the upper layer side of the second color filter and disposed overlapping the second color filter; a common electrode disposed on the upper layer side or a lower layer side of the first pixel electrode and the second pixel electrode and disposed overlapping the first pixel electrode and the second pixel electrode; an insulating film interposed between the first pixel electrode and the second pixel electrode, and the common electrode; and a light blocking portion disposed at a boundary between the first color filter and the second color filter, on the upper layer side of the first color filter and the second color filter, wherein among the first pixel electrode, the second pixel electrode, and the common electrode, an electrode located on the upper layer side of the insulating film is an upper layer electrode, and an electrode located on the lower layer side of the insulating film is a lower layer electrode, an arrangement direction of the first color filter and the second color filter is a first direction, a portion of the upper layer electrode overlapping the lower layer electrode is provided with a slit extending along a second direction inclined with respect to the first direction, an inclined portion extending along a third direction inclined toward the same side as the second direction with respect to the first direction is included in an end portion, of outer peripheral end portions of the light blocking portion, adjacent to the slit in the first direction, and a second angle of the inclined portion that is an angle formed by the third direction with respect to the first direction is larger than a first angle that is an angle formed by the second direction with respect to the first direction.

(2) In the display device, in addition to (1) described above, the inclined portion may be disposed intersecting an edge portion of the slit in the upper layer electrode in plan view.

(3) In the display device, in addition to (1) or (2) described above, the end portion of the light blocking portion may include a third angle portion forming a third angle, larger than the second angle, with respect to the first direction, and the inclined portion may be provided in such a manner that a boundary with the third angle portion matches an intersection between the edge portion of the slit and the end portion as a result of expected maximum displacement of the upper layer electrode and the light blocking portion in the first direction.

(4) In the display device, in addition to (1) or (2) described above, the end portion of the light blocking portion may include a third angle portion forming a third angle, larger than the second angle, with respect to the first direction, and the inclined portion may be provided in such a manner that a boundary with the third angle portion is located in the slit as a result of expected maximum displacement of the upper layer electrode and the light blocking portion in the first direction.

(5) In the display device, in addition to (4) described above, a distance between the boundary of the inclined portion and the intersection between the edge portion of the slit and the end portion as a result of the expected maximum displacement of the upper layer electrode and the light blocking portion in the first direction may be longer than a distance between a center position of the end portion in a length direction and the intersection.

(6) In the display device, in addition to any of (1) to (5) described above, the inclined portion may be provided with the second angle being in a range having an upper limit value of 87° and a lower limit value of an angle that is larger than the first angle by 3°.

(7) In the display device, in addition to any of (1) to (6) described above, the slit may include a first slit overlapping the first color filter and a second slit overlapping the second color filter, the outer peripheral end portion of the light blocking portion may include a first end portion adjacent to the first slit in the first direction and a second end portion adjacent to the second slit in the first direction, and the inclined portion may include a first inclined portion included in the first end portion and a second inclined portion included in the second end portion.

(8) In the display device, in addition to any of (1) to (7) described above, the light blocking portion may be disposed on the upper layer side of the upper layer electrode.

(9) In the display device, in addition (8) described above, the upper layer electrode may be the common electrode, and the light blocking portion may be directly layered on the common electrode.

(10) In the display device, in addition to any of (1) to (9) described above, a wiring line disposed more on the lower layer side than the first color filter and the second color filter, at a boundary between the first color filter and the second color filter may be further provided, and the first color filter, the second color filter, and the wiring line may each extend in a fifth direction inclined toward the same side as the second direction with respect to the first direction.

(11) In the display device, in addition to (10) described above, the slit may be provided with the first angle being smaller than a fourth angle being an angle formed by the fifth direction with respect to the first direction.

(12) In the display device, in addition to (10) or (11) described above, the end portion of the light blocking portion may include a third angle portion forming a third angle, larger than the second angle, with respect to the first direction, and the first color filter, the second color filter, and the wiring line may have a fourth angle being equal to the third angle, the fourth angle being an angle formed by the fifth direction with respect to the first direction.

(13) In the display device, in addition to (10) or (11) described above, the first color filter, the second color filter, and the wiring line may have a fourth angle being equal to the second angle, the fourth angle being an angle formed by the fifth direction with respect to the first direction.

(14) In the display device, in addition to any of (10) to (13) described above, a dimension of a portion of the light blocking portion including the inclined portion in the first direction may be larger than a dimension of the wiring line in the first direction.

According to the techniques described in the present specification, reduction in luminance can be suppressed.

BRIEF DESCRIPTION OF DRAWINGS

The disclosure will be described with reference to the accompanying drawings, wherein like numbers reference like elements.

DESCRIPTION OF EMBODIMENTS

First Embodiment

A first embodiment will be described with reference to FIGS. 1 to 24. In the present embodiment, a goggle-type head-mounted display (Head-Mounted Display: HMD) 10HMD and a liquid crystal display device 10 used for the head-mounted display are exemplified. Note that some drawings show an X-axis, a Y-axis, and a Z-axis, and directions of these axes are drawn so as to be common in all the drawings.

Figure 1:
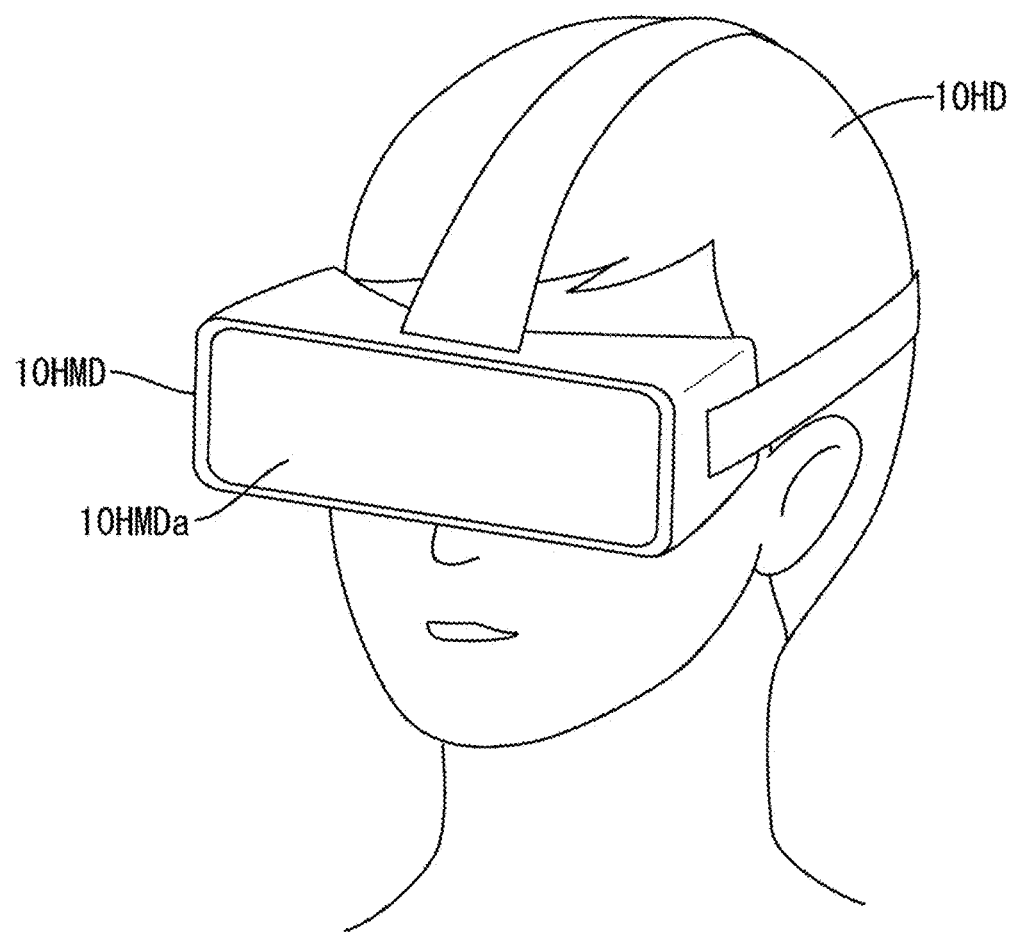
FIG. 1 is a schematic perspective view illustrating a state in which a head-mounted display according to a first embodiment is worn on the head by a user.

The appearance of the goggle-type head-mounted display 10HMD will be described with reference to FIG. 1. As illustrated in FIG. 1, the head-mounted display 10HMD includes a head-mounted device 10HMDa mounted on the head 10HD of the user. The head-mounted device 10HMDa surrounds both eyes of the user.

Figure 2:
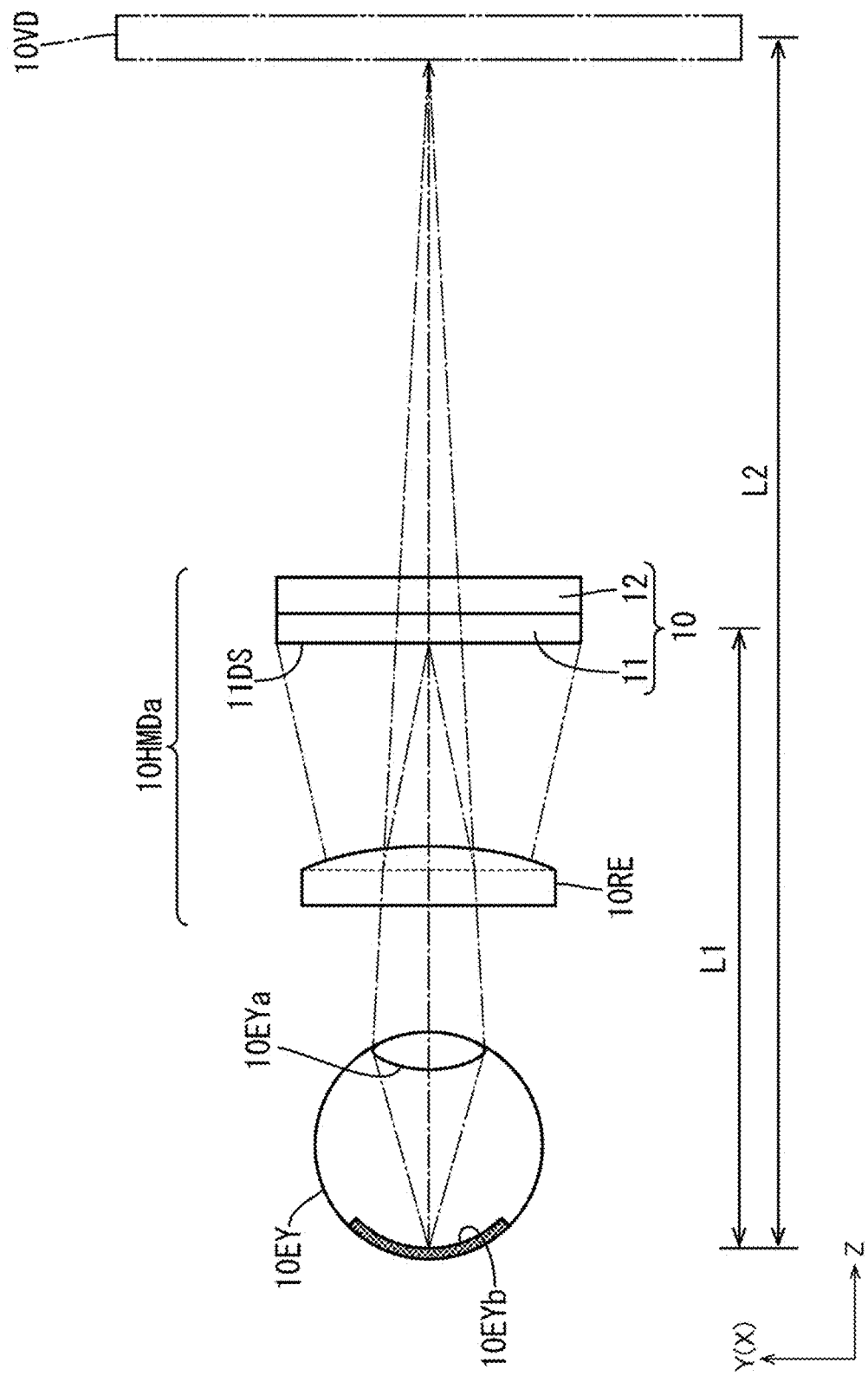
FIG. 2 is a schematic side view illustrating an optical relationship between a liquid crystal display device and a lens unit provided in a head-mounted device included in the head-mounted display according to the first embodiment, and an eyeball of the user.

A configuration of the head-mounted device 10HMDa will be described with reference to FIG. 2. As illustrated in FIG. 2, the head-mounted device 10HMDa incorporates at least a liquid crystal display device 10 displaying an image and a lens unit 10RE focusing the image displayed on the liquid crystal display device 10 on an eyeball 10EY of the user. The liquid crystal display device 10 includes at least a liquid crystal panel (display device) 11 and a backlight device (illumination device) 12 irradiating the liquid crystal panel 11 with light. A main surface of the liquid crystal panel 11 on the lens unit 10RE side is a display surface 11DS displaying the image. The lens unit 10RE is disposed to be interposed between the liquid crystal display device 10 and the eyeball 10EY of the user. The lens unit 10RE imparts a refracting action to light. By adjusting the focal length of the lens unit 10RE, the user can recognize that an image focused on a retina 10EYb through a crystalline lens 10EYa of the eyeball 10EY is displayed on a virtual display 10VD that is apparently present at a position of a distance L2 from the eyeball 10EY. This distance L2 is much larger than an actual distance L1 from the eyeball 10EY to the liquid crystal display device 10. Accordingly, the user can visually recognize an enlarged image that is a virtual image displayed on the virtual display 10VD having a screen size (for example, from about several tens of inches to about several hundreds of inches) much larger than a screen size (for example, from about 0. several inches to about several inches) of the liquid crystal display device 10.

By mounting one liquid crystal display device 10 on the head-mounted device 10HMDa an image for a right eye and an image for a left eye can be displayed on the liquid crystal display device 10. Alternatively, by mounting two liquid crystal display devices 10 on the head-mounted device 10HMDa, the image for the right eye and the image for the left eye may be displayed on one of the liquid crystal display devices 10 and on the other of the liquid crystal display devices 10, respectively. The head-mounted device 10HMDa may be provided with earphones or the like that are addressed to the ears of the user and emit a sound.

Figure 3:
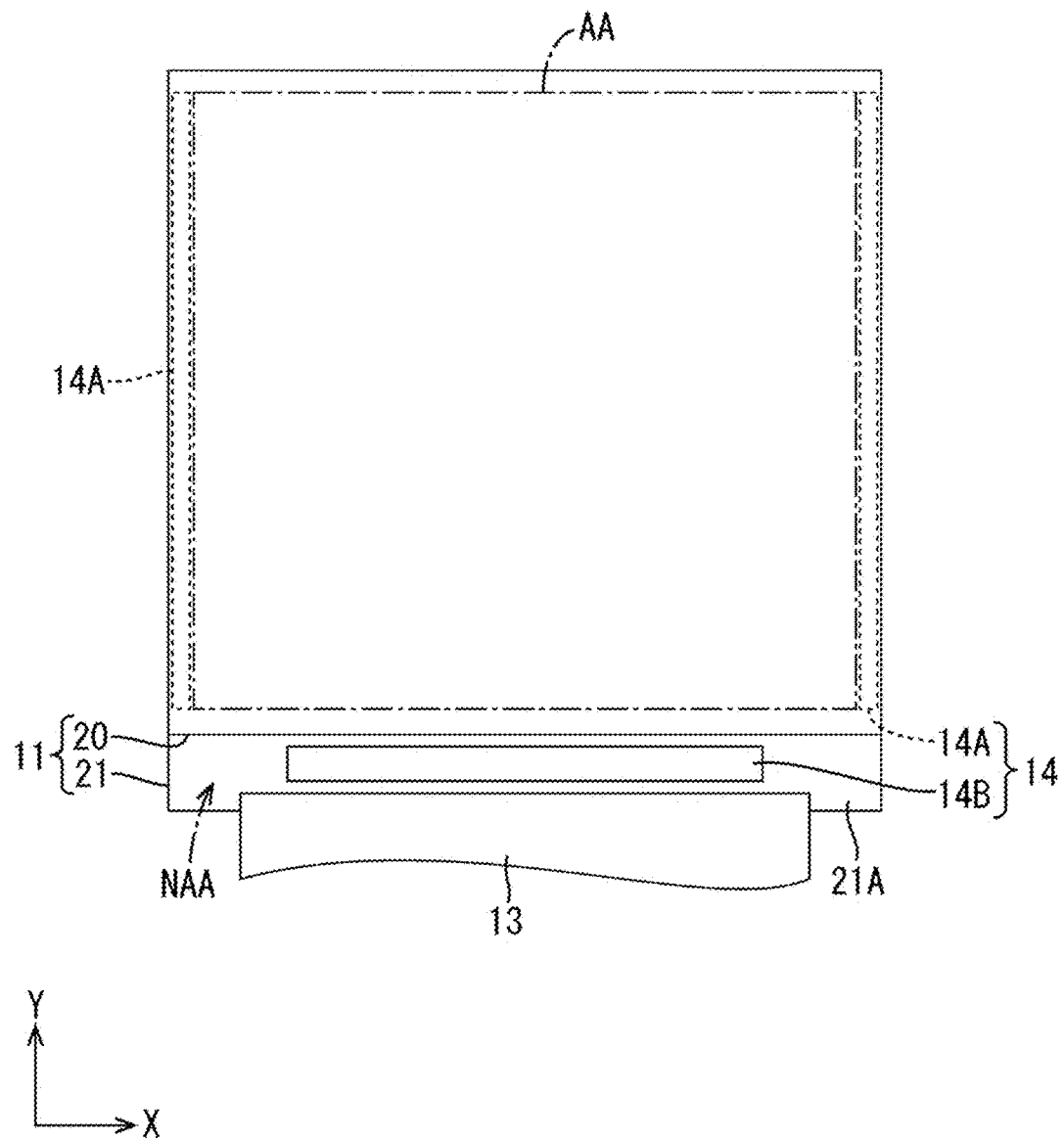
FIG. 3 is a schematic plan view illustrating a liquid crystal panel and a flexible substrate provided in the liquid crystal display device according to the first embodiment.

A configuration of the liquid crystal panel 11 included in the liquid crystal display device 10 will be described with reference to FIG. 3 and the like. Note that the configuration of the backlight device 12 is as known, and includes, for example, a light source such as an LED, an optical member that converts light from the light source into planar light by applying an optical effect to the light from the light source, and the like. As illustrated in FIG. 3, the liquid crystal panel 11 has a rectangular shape as a whole in plan view. A center-side portion of the screen of the liquid crystal panel 11 is a display region AA in which an image is displayed. A frame-shaped outer peripheral portion surrounding the display region AA of the screen of the liquid crystal panel 11 is a non-display region NAA in which no image is displayed. A range surrounded by an alternating dotted-dashed line in FIG. 3 is the display region AA. The liquid crystal panel 11 according to the present embodiment is used in the head-mounted display 10HMD described above and thus has an extremely high resolution, with a pixel density thereof being, for example, about 1000 ppi or more.

As illustrated in FIG. 3, the liquid crystal panel 11 is formed by bonding a pair of substrates 20 and 21 together. Of the pair of substrates 20 and 21, one disposed on a front side is a counter substrate (second substrate, CF substrate) 20, and the other one disposed on a back side is an array substrate (first substrate, active matrix substrate) 21. The counter substrate 20 and the array substrate 21 are each formed by layering various films on an inner face side of a respective one of glass substrates 20GS and 21GS that are substantially transparent and have excellent light-transmittance. The substrates 20GS and 21GS contain, for example, alkali-free glass as a main material. The array substrate 21 is larger than the counter substrate 20, and part of the array substrate 21 protrudes laterally with respect to the counter substrate 20. A flexible substrate 13 is mounted on a protruding portion 21A of the array substrate 21. The flexible substrate 13 has a configuration in which a plurality of wiring line patterns are formed on a flexible base material having insulating properties. One end side of the flexible substrate 13 is connected to the array substrate 21, and the other end side thereof is connected to an external control substrate (signal supply source). Various signals supplied from the control substrate are transmitted to the liquid crystal panel 11 via the flexible substrate 13.

As illustrated in FIG. 3, a circuit portion (peripheral circuit portion) 14 is provided in the non-display region NAA of the liquid crystal panel 11. The circuit portion 14 includes a first circuit portion 14A and a second circuit portion 14B. A pair of the first circuit portions 14A are disposed sandwiching the display region AA from both sides in the X-axis direction. The first circuit portion 14A is provided in a belt-shaped range extending along the Y-axis direction. The first circuit portion 14A is configured to supply a scanning signal to a gate wiring line 25 described later, and monolithically provided on the array substrate 21. The first circuit portion 14A is a Gate Driver Monolithic (GDM) circuit. The first circuit portion 14A includes a shift register circuit configured to output the scanning signal at a predetermined timing, a buffer circuit for amplifying the scanning signal, and the like. The second circuit portion 14B is disposed at a position interposed between the display region AA and the flexible substrate 13 in the Y-axis direction. The second circuit portion 14B is provided in a belt-shaped range extending along the X-axis direction. The second circuit portion 14B is configured to supply an image signal (data signal) to a source wiring line 26 described later, and monolithically provided on the array substrate 21. The second circuit portion 14B includes a source shared driving (SSD) circuit and the like. The second circuit portion 14B has a switching function of distributing an image signal supplied by the flexible substrate 13 to each source wiring line 26 or the like.

Figure 4:
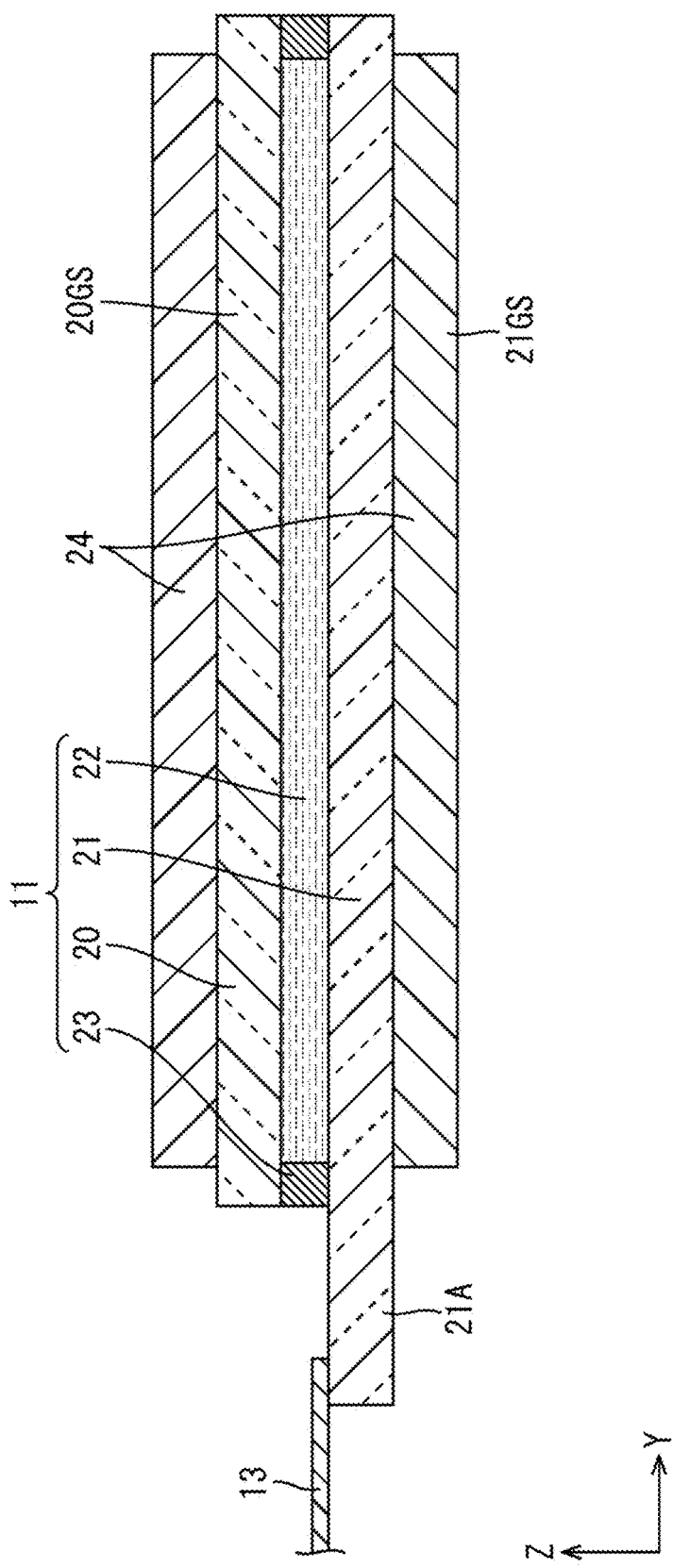
FIG. 4 is a schematic cross-sectional view of the liquid crystal panel according to the first embodiment.

Next, a schematic cross-sectional configuration of the liquid crystal panel 11 will be described with reference to FIG. 4. As illustrated in FIG. 4, the pair of substrates 20 and 21 are disposed to face each other with a gap therebetween in the Z-axis direction that is the normal direction of main surfaces of the substrates 20 and 21. At least a liquid crystal layer 22 and a sealing portion 23 sealing the liquid crystal layer 22 are each interposed between the pair of substrates 20 and 21. The liquid crystal layer 22 contains liquid crystal molecules that are a substance having optical characteristics changing according to an applied electrical field. The sealing portion 23 has a rectangular frame-like shape (endless ring shape) as a whole in plan view, and surrounds over the entire periphery of the liquid crystal layer 22 in the non-display region NAA. A gap (cell gap) corresponding to the thickness of the liquid crystal layer 22 is maintained by the sealing portion 23. Note that polarizers 24 are bonded to outer face sides of the pair of substrates 20 and 21, respectively.

Figure 5:
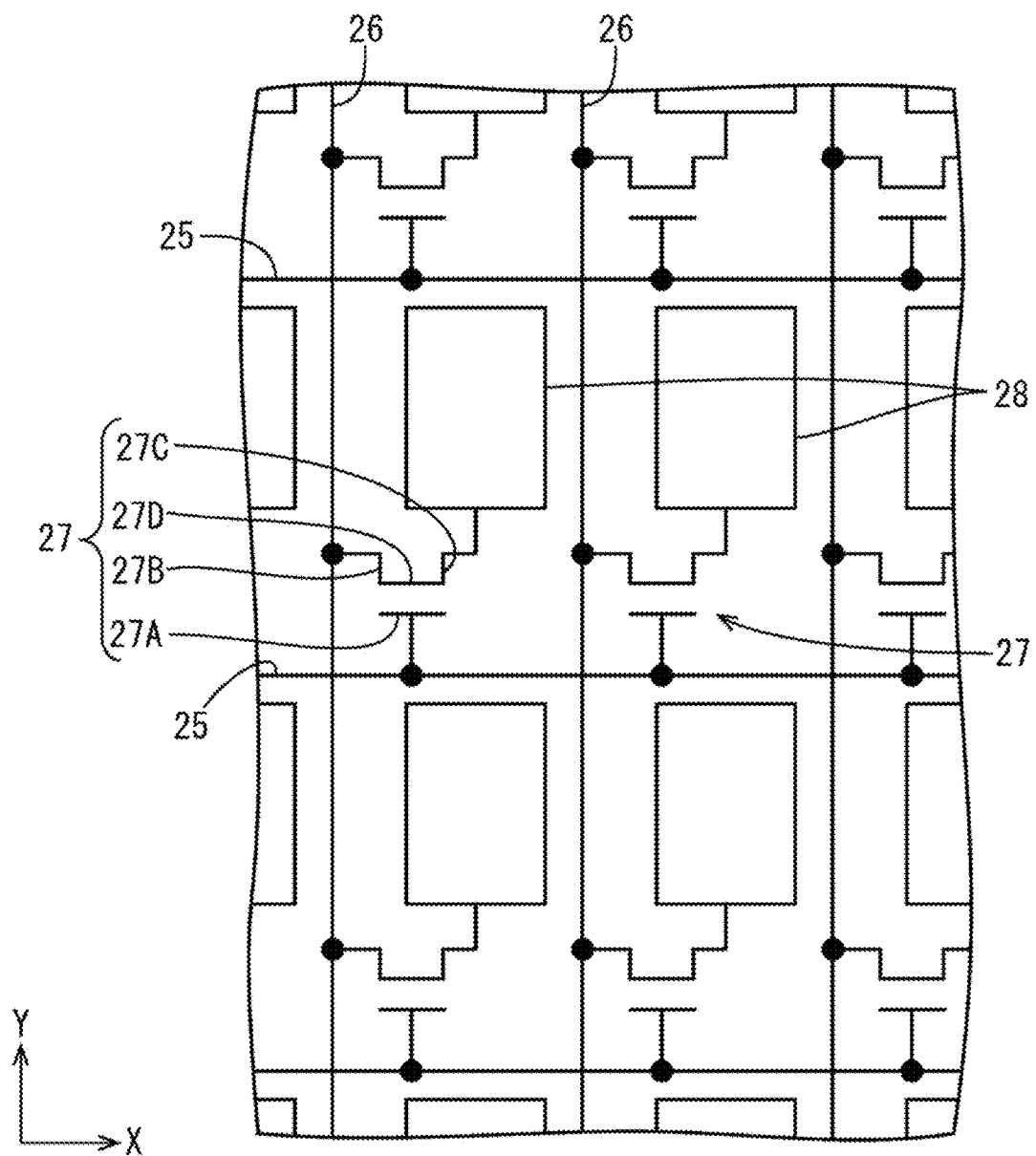
FIG. 5 is a circuit diagram illustrating a pixel arrangement in a display region of an array substrate provided in the liquid crystal panel according to the first embodiment.

An overview of a pixel arrangement in the display region AA of the array substrate 21 will now be described with reference to FIG. 5. A plurality of gate wiring lines (scanning wiring lines) 25 and a plurality of source wiring lines (image wiring lines) 26 forming a lattice pattern are disposed on an inner face side of the display region AA of the array substrate 21 as illustrated in FIG. 5. Each of the gate wiring lines 25 extends in the X-axis direction to cross the display region AA. The plurality of gate wiring lines 25 are arranged side by side at intervals in the Y-axis direction. The scanning signal output from the first circuit portion 14A described above is sequentially supplied to each of the plurality of gate wiring lines 25 from an upper-stage side in FIG. 5. Each of the source wiring lines 26 extends in the Y-axis direction to cross the display region AA, and intersects the plurality of gate wiring lines 25. The plurality of source wiring lines 26 are arranged at intervals in the X-axis direction. The image signals output from the second circuit portion 14B are distributed to the source wiring lines 26. A TFT (switching element) 27 and a pixel electrode 28 are each provided near an intersection of the gate wiring line 25 and the source wiring line 26. A plurality of the TFTs 27 and a plurality of the pixel electrode 28 are arranged regularly in the X-axis direction and the Y-axis direction. The gate wiring line 25, the source wiring line 26, and the pixel electrode 28 are connected to the TFT 27. The TFT 27 includes a gate electrode 27A to which the gate wiring line 25 is connected, a source electrode 27B to which the source wiring line 26 is connected, a drain electrode 27C to which the pixel electrode 28 is connected, and a semiconductor portion 27D connected to the source electrode 27B and the drain electrode 27C. The semiconductor portion 27D is made of a semiconductor material and is disposed overlapping the gate electrode 27A. When the TFT 27 is driven based on the scanning signal supplied from the gate wiring line 25 to the gate electrode 27A, the TFT 27 charges the pixel electrode 28 to a potential based on the image signal supplied from the source wiring line 26 to the source electrode 27B. The pixel electrode 28 forms an elongated shape with a longitudinal direction matching the Y-axis direction.

Figure 6:
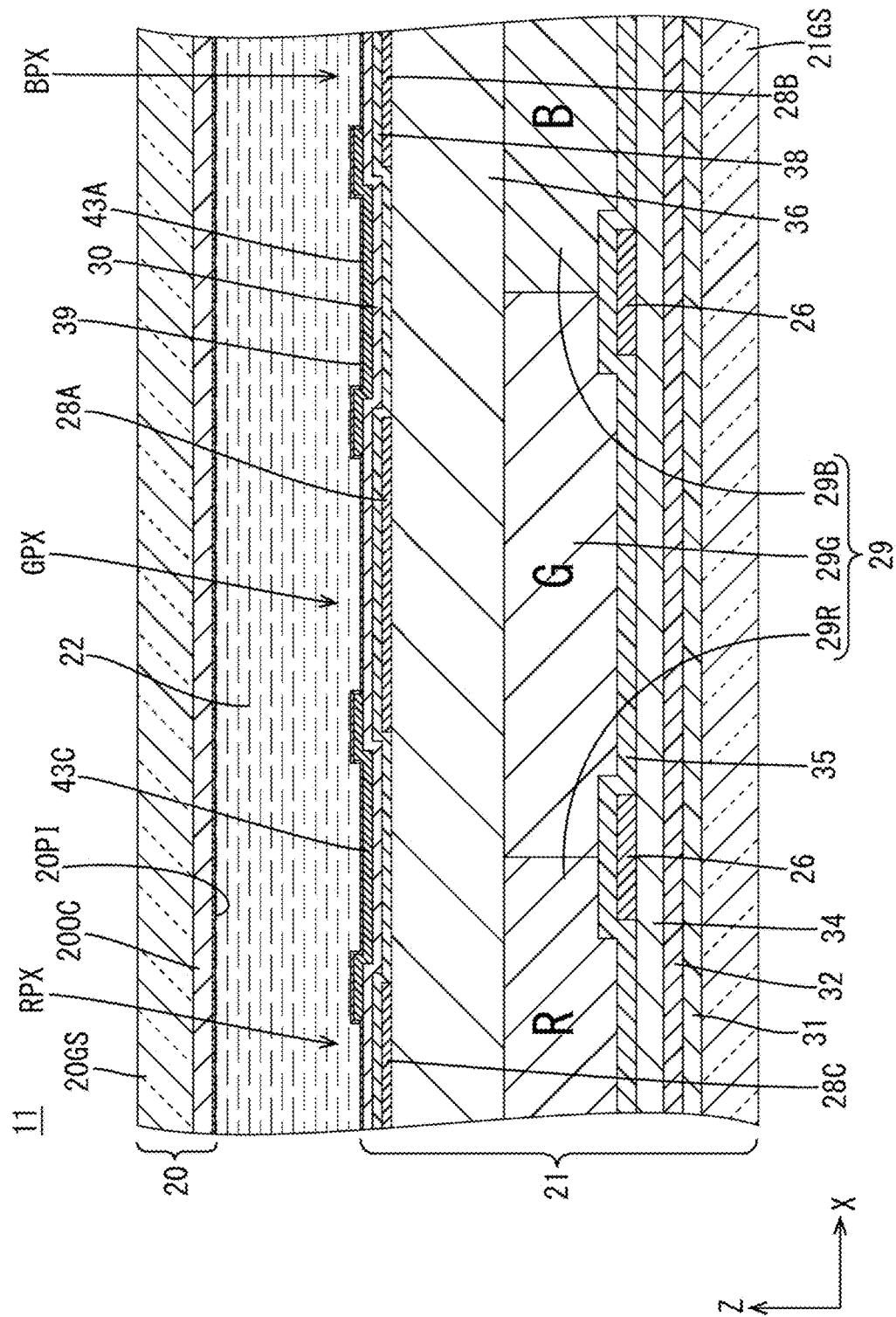
FIG. 6 is a cross-sectional view illustrating the pixel arrangement in the display region of the liquid crystal panel according to the first embodiment.

A color filter 29 is provided in addition to the pixel electrode 28 on the inner face side of the display region AA of the array substrate 21, as illustrated in FIG. 6. Thus, the liquid crystal panel 11 according to the present embodiment can be regarded as having a color filter on array (COA) structure. The color filter 29 is disposed overlapping the pixel electrode 28 and, together with the overlapping pixel electrode 28, constitutes a pixel, which is a unit of display. The color filter 29 includes a plurality of types (three types) exhibiting colors different from each other. The plurality of types of color filters 29 exhibiting colors different from each other are arranged side by side so as to be adjacent to each other in the extension direction of the gate wiring line 25 (X-axis direction). Thus, the arrangement direction (first direction) of the plurality of types of color filters 29 exhibiting colors different from each other matches the X-axis direction. The plurality of types of color filters 29 exhibiting colors different from each other extend along the extension direction (Y-axis direction) of the source wiring line 26. In this manner, the plurality of types of color filters 29 exhibiting colors different from each other are arrayed in a stripe pattern as a whole. The plurality of color filters 29 exhibiting colors different from each other are disposed such that boundaries thereof (color boundaries) overlap the source wiring line 26.

Specifically, as illustrated in FIG. 6, the color filters 29 include three types that are a first color filter (green color filter) 29G exhibiting green, a second color filter (blue color filter) 29B exhibiting blue, and a third color filter (red color filter) 29R exhibiting red. In the following description, when the color filters 29 are distinguished from each other, a suffix G is appended to the reference numeral of the first color filter exhibiting green, a suffix B is appended to the reference numeral of the second color filter exhibiting blue, and a suffix R is appended to the reference numeral of the third color filter exhibiting red.

The first color filter 29G selectively transmits green light having a wavelength included in a green wavelength region (approximately 500 nm to approximately 570 nm). The second color filter 29B selectively transmits blue light included in a blue wavelength region (approximately 400 nm to approximately 500 nm). The third color filter 29R selectively transmits red light having a wavelength included in a red wavelength region (approximately 600 nm to approximately 780 nm). In the present embodiment, the color filters 29 are arrayed with the first color filter 29G, the third color filter 29R, and the second color filter 29B repeatedly arranged side by side in that order from the left side in FIG. 6.

As illustrated in FIG. 6, the first color filter 29G, together with the overlapping pixel electrode 28, constitutes a first pixel (green pixel) GPX exhibiting green. The pixel electrode 28 constituting the first pixel GPX is referred to as a first pixel electrode 28A. The second color filter 29B, together with the overlapping pixel electrode 28, constitutes a second pixel (blue pixel) BPX exhibiting blue. The pixel electrode 28 constituting the second pixel BPX is referred to as a second pixel electrode 28B. The third color filter 29R, together with the overlapping pixel electrode 28, constitutes a third pixel (red pixel) RPX exhibiting red. The pixel electrode 28 constituting the third pixel RPX is referred to as a third pixel electrode 28C. In this liquid crystal panel 11, the three color pixels GPX, BPX, RPX arranged along the X-axis direction constitute display pixels capable of color display with predetermined gradation. An array pitch of each of the pixels GPX, BPX, RPX in the Y-axis direction is approximately three times a respective array pitch in the X-axis direction.

A common electrode 30 is provided on the inner face side of the display region AA of the array substrate 21, as illustrated in FIG. 6. The common electrode 30 is disposed more on the upper layer side than the pixel electrode 28, and is disposed over substantially the entire display region AA. Accordingly, the common electrode 30 overlaps the pixel electrode 28 disposed in the display region AA. As described above, in the array substrate 21 according to the present embodiment, the "upper layer electrode" that is the electrode among the pixel electrode 28 and the common electrode 30 located on the upper layer side is the common electrode 30, and the "lower layer electrode" that is the electrode located on the lower layer side is the pixel electrode 28. A plurality of slits 30A are each formed open in a respective one of portions of the common electrodes 30 each overlapping a respective one of the plurality of pixel electrodes 28. The number of slits 30A is equal to the number of pixel electrodes 28. The plurality of slits 30A include a first slit 30A1 overlapping the first pixel electrode 28A and the first color filter 29G and a second slit 30A2 overlapping the second pixel electrode 28B and the second color filter 29B. A common potential signal that is a common potential (reference potential) is supplied to the common electrode 30. When the pixel electrode 28 is charged to a potential based on the image signal transmitted to the source wiring line 26 according to driving of the TFT 27, a potential difference is generated between the pixel electrode 28 and the common electrode 30. Then, a fringe electrical field (oblique electrical field) including a component in a normal direction with respect to a main surface of the array substrate 21 in addition to a component along the main surface of the array substrate 21 is generated between an opening edge of the slit 30A in the common electrode 30 and the pixel electrode 28. Accordingly, by using this fringe electrical field, it is possible to control the alignment state of the liquid crystal molecules included in the liquid crystal layer 22, and a predetermined display is formed based on the alignment state of the liquid crystal molecules. In other words, the operation mode of the liquid crystal panel 11 according to the present embodiment is a fringe field switching (FFS) mode.

Figure 7:
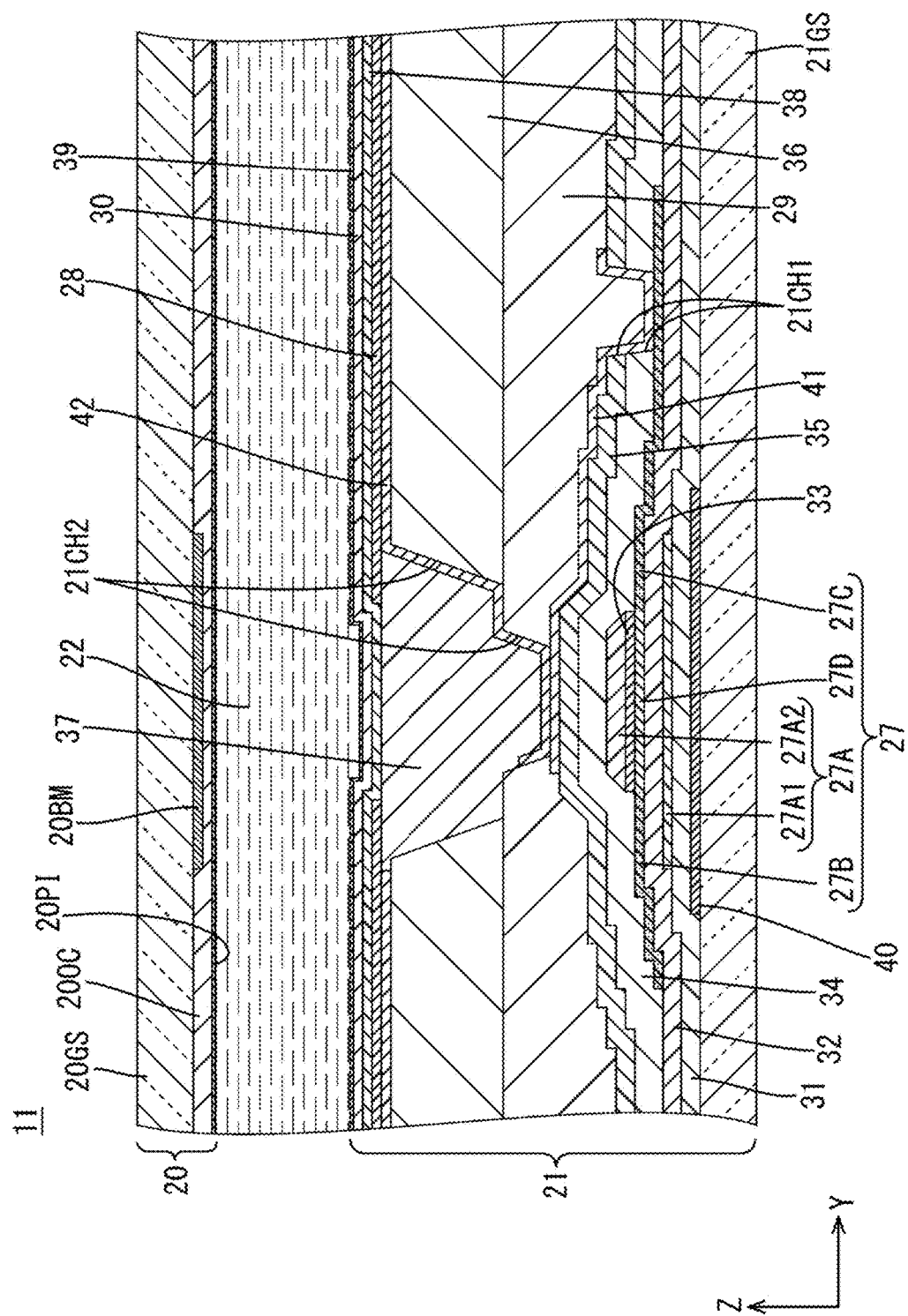
FIG. 7 is a cross-sectional view illustrating a structure for connection between a pixel electrode and a TFT in the display region of the liquid crystal panel according to the first embodiment.

Subsequently, the various films layered on a glass substrate 21GS of the array substrate 21 will be described in detail with reference to FIG. 6 and FIG. 7. As illustrated in FIG. 6 and FIG. 7, at least a first metal film, a first insulating film 31, a second metal film, a second insulating film 32, a semiconductor film, a third insulating film 33, a third metal film, a fourth insulating film 34, a fourth metal film, a fifth insulating film 35, a first transparent electrode film, the color filter 29, a sixth insulating film 36, a second transparent electrode film, a seventh insulating film 37, a third transparent electrode film, an eighth insulating film 38, a fourth transparent electrode film, a fifth metal film, and an alignment film 39 are layered on the glass substrate 21GS of the array substrate 21 in this order from the lower layer side (glass substrate 21GS side).

The first metal film, the second metal film, the third metal film, the fourth metal film, and the fifth metal film are each a single-layer film made of one type of metal material or a layered film or alloy made of different types of metal materials, and thus have conductivity and light-blocking properties. Among them, the first metal film constitutes a lower layer side light blocking portion 40. The lower layer side light blocking portion 40 is disposed at a position overlapping the semiconductor portion 27D of the TFT 27, and thus can block light traveling from the backlight device 12 to the semiconductor portion 27D. This can suppress a variation in the characteristics of the TFT 27 which may occur when the semiconductor portion 27D is irradiated with light. The second metal film constitutes, in addition to constituting the gate wiring line 25, a lower layer side gate electrode 27A1 which is the gate electrode 27A. The third metal film constitutes an upper layer side gate electrode 27A2 which is the gate electrode 27A. The lower layer side gate electrode 27A1 and the upper layer side gate electrode 27A2 are disposed overlapping each other and overlapping the semiconductor portion 27D. As described above, the gate electrode 27A includes the lower layer side gate electrode 27A1 and the upper layer side gate electrode 27A2. That is, the TFT 27 according to the present embodiment has a double gate structure. The fourth metal film constitutes the source wiring line 26. The fifth metal film constitutes a light blocking portion 43 which will be described in detail later. The first transparent electrode film, the second transparent electrode film, the third transparent electrode film, and the fourth transparent electrode film are made of a transparent electrode material such as indium tin oxide (ITO), indium zinc oxide (IZO), or the like. Among them, the first transparent electrode film constitutes a lower layer side wiring line 41. One end side portion of the lower layer side wiring line 41 is connected to the drain electrode 27C. The second transparent electrode film constitutes an upper layer side wiring line 42. The upper layer side wiring line 42 has one end side portion connected to the other end side portion of the lower layer side wiring line 41, and has the other end side portion connected to the pixel electrode 28. The drain electrode 27C and the pixel electrode 28 are connected to each other by the lower layer side wiring line 41 and the upper layer side wiring line 42. The third transparent electrode film constitutes the pixel electrode 28. The fourth transparent electrode film constitutes the common electrode 30.

The semiconductor film is made of an oxide semiconductor material. Specifically, the semiconductor film includes, for example, an oxide semiconductor thin film containing indium (In), gallium (Ga), and zinc (Zn) being a kind of oxide semiconductor. The oxide thin film containing indium (In), gallium (Ga), and zinc (Zn) is amorphous or crystalline. The oxide semiconductor material of the semiconductor film has characteristics of higher resistance value in a state in which no voltage is applied (off state) than the silicon semiconductor material. The oxide semiconductor material of the semiconductor film has higher electron mobility than an amorphous silicon semiconductor material.

The semiconductor film according to the present embodiment is subjected to a resistance reducing process, in the manufacturing process, to include a part having a reduced resistance, thus including a reduced resistance region and a non-reduced resistance region. Note that, in FIG. 7, the reduced resistance region of the semiconductor film is illustrated in a shaded manner. The non-reduced resistance region of the semiconductor film is capable of charge transfer only under specific conditions (when a scanning signal is supplied to the gate electrode 27A). The non-reduced resistance region of the semiconductor film constitutes the semiconductor portion 27D. The semiconductor portion 27D is sandwiched from below and above by the lower layer side gate electrode 27A1 and the upper layer side gate electrode 27A2. The reduced resistance region of the semiconductor film has an extremely low resistivity of, for example, about 1/10000000000 to 1/100 compared to the non-reduced resistance region, and because charges can constantly move, functions as a conductor. The reduced resistance region of the semiconductor film constitutes the source electrode 27B and the drain electrode 27C. The resistance reducing process for the semiconductor film is, in a manufacturing process for the array substrate 21, performed by forming the upper layer side gate electrode 27A2 including the third metal film and then using the upper layer side gate electrode 27A2 as a mask. The resistance reducing process is selectively performed on the portions (non-overlapping portions, exposed portions) of the semiconductor film not covered with the upper layer side gate electrode 27A2, and is not performed on the portions (overlapping portions, unexposed portions) covered with the upper layer side gate electrode 27A2. The resistance reducing process includes, for example, a plasma process or an annealing process using a gas such as $NH_3$, $H_2$, $N_2$, or He.

The first insulating film 31, the second insulating film 32, the third insulating film 33, the fourth insulating film 34, the fifth insulating film 35, and the eighth insulating film 38 are each made of silicon oxide ($SiO_2$), silicon nitride ($SiN_x$), or the like that are a kind of inorganic material (inorganic resin material). Among them, the first insulating film 31 is interposed between the lower layer side light blocking portion 40 and the gate wiring line 25 and lower layer side gate electrode 27A1 to keep them in an insulating state. The second insulating film 32 is interposed between the gate wiring line 25 and the lower layer side gate electrode 27A1 and the source electrode 27B, the drain electrode 27C, and the semiconductor portion 27D to keep them in an insulating state. The third insulating film 33 is interposed between the source electrode 27B, the drain electrode 27C, and the semiconductor portion 27D and the upper layer side gate electrode 27A2 to keep them in an insulating state. The fourth insulating film 34 is interposed between the upper layer side gate electrode 27A2 and the source wiring line 26 to keep them in an insulating state. The fifth insulating film 35 is interposed between the source wiring line 26 and the lower layer side wiring line 41 to keep them in an insulating state. Portions of the fourth insulating film 34 and the fifth insulating film 35 overlapping both the drain electrode 27C and the lower layer side wiring line 41, are provided with an open first contact hole 21CH1. The drain electrode 27C and the lower layer side wiring line 41 are connected through the first contact hole 21CH1. The eighth insulating film 38 is interposed between the pixel electrode 28 and the common electrode 30 to keep them in an insulating state.

The sixth insulating film 36 and the seventh insulating film 37 are each made of PMMA (acrylic resin), which is a kind of organic material (organic resin material), or the like. The sixth insulating film 36 and the seventh insulating film 37 made of the organic material usually have a larger film thickness than the first insulating film 31, the second insulating film 32, the third insulating film 33, the fourth insulating film 34, the fifth insulating film 35, and the eighth insulating film 38 made of the inorganic material. The sixth insulating film 36 is interposed between the lower layer side wiring line 41 and the upper layer side wiring line 42 together with the color filter 29 to keep them in an insulating state. Portions of the sixth insulating film 36 and the color filter 29 overlapping both the lower layer side wiring line 41 and the upper layer side wiring line 42, are provided with an open second contact hole 21CH2. The lower layer side wiring line 41 and the upper layer side wiring line 42 are connected through the second contact hole 21CH2. The seventh insulating film 37 is provided at a position overlapping the second contact hole 21CH2. Since the second contact hole 21CH2 is filled with the seventh insulating film 37, the pixel electrode 28 and the common electrode 30 located on the upper layer side of the seventh insulating film 37 are planarized. Since the seventh insulating film 37 is not interposed between the upper layer side wiring line 42 and the pixel electrode 28, the upper layer side wiring line 42 and the pixel electrode 28 are connected to each other through direct contact.

The alignment film 39 is made of an organic material such as polyimide, for example. The alignment film 39 includes an upper face, facing the liquid crystal layer 22, subjected to optical alignment treatment, and thus has a function of aligning liquid crystal molecules. An alignment film 20PI provided to the counter substrate 20 is the same as the alignment film 39 provided to the array substrate 21. In the present embodiment, the alignment direction of the liquid crystal molecules included in the liquid crystal layer 22 matches, for example, the Y-axis direction based on the optical alignment treatment performed on each of the alignment films 39 and 20PI. Here, the "alignment direction of liquid crystal molecules" is an axial direction of the liquid crystal molecules, in plan view of the liquid crystal molecules aligned so as to have a predetermined pretilt angle with respect to a main surface of each of the alignment films 39 and 20PI.

On the glass substrate 20GS of the counter substrate 20, a counter-side light blocking portion 20BM, an overcoat film 200C, and the counter-side alignment film 20PI are formed. The counter-side light blocking portion 20BM is made of a synthetic resin material or the like featuring excellent light-blocking properties, and is provided on the inner face of the glass substrate 20GS. The counter-side light blocking portion 20BM extends along the X-axis direction and is formed in a horizontal stripe shape in plan view so as to overlap the plurality of gate wiring lines 25 included in the array substrate 21. The overcoat film 200C is provided on the upper layer side of the counter-side light blocking portion 20BM, and is solidly arranged over substantially the entire region of the counter substrate 20. Thus, the counter substrate 20 can be planarized. The counter-side alignment film 20PI is provided on the upper layer side of the overcoat film 200C, and is arranged to face the liquid crystal layer 22.

Figure 8:
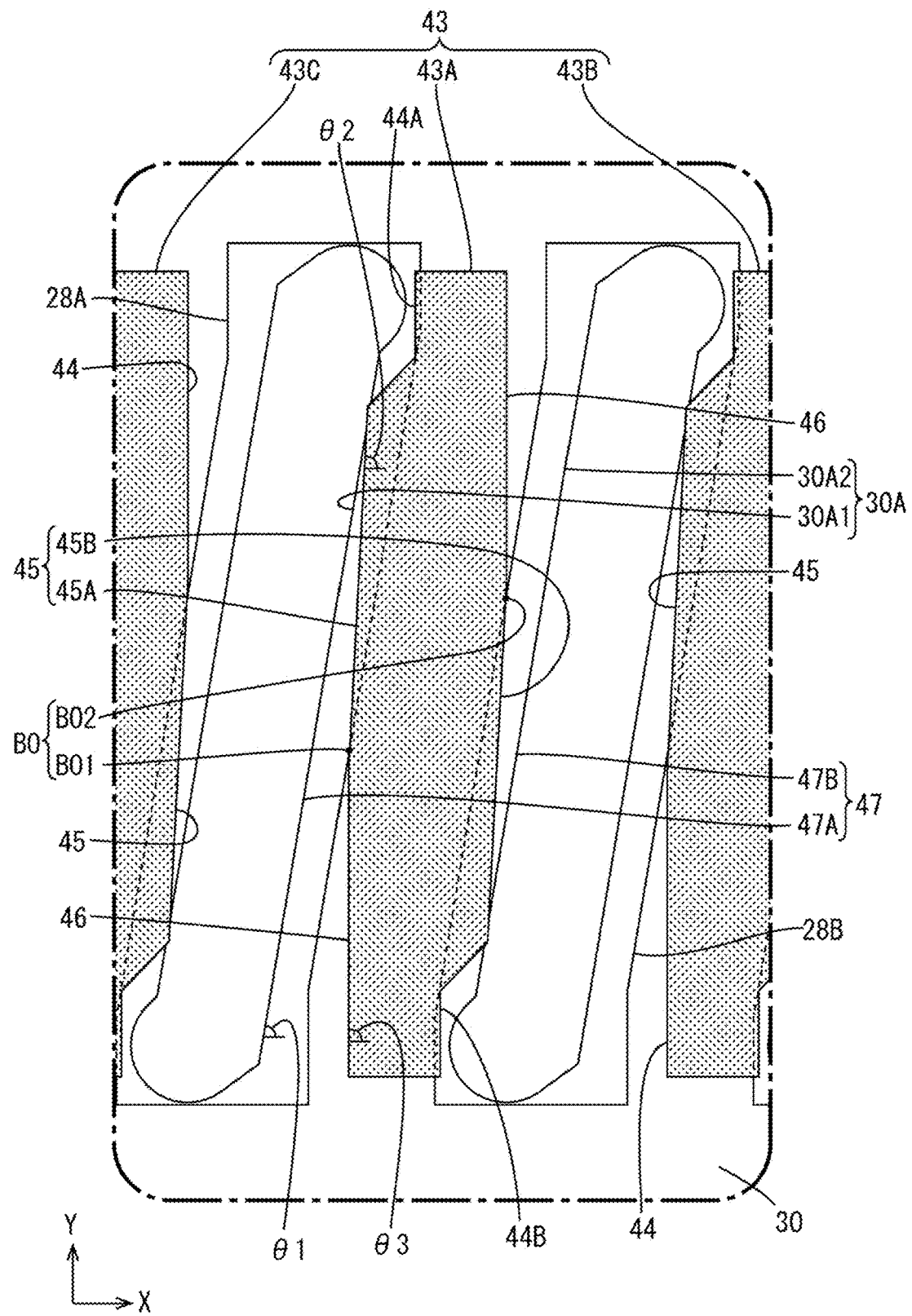
FIG. 8 is a plan view illustrating the pixel electrode and a relationship between a slit and a light blocking portion at a normal position in the display region of the liquid crystal panel according to the first embodiment.

The planar shapes of the pixel electrode 28 and the common electrode 30 will be described in detail with reference to FIG. 8. In FIG. 8, among the components of the array substrate 21, the pixel electrode 28, the common electrode 30, and the light blocking portion 43 are selectively illustrated, and in particular, the light blocking portion 43 is illustrated in a shaded manner. As illustrated in FIG. 8, the pixel electrode 28 has a vertically long substantially parallelogram shape in plan view, and most of both side edges on the longitudinal side extend along an oblique direction with respect to the X-axis direction and the Y-axis direction. Specifically, the pixel electrode 28 has a parallelogram shape with both end side portions in the Y-axis direction each having a square shape in plan view and with a center-side portion in the Y-axis direction extending along the oblique direction with a constant width. The oblique direction which is the extension direction of the center-side portion of the pixel electrode 28 in the Y-axis direction is a direction from the lower left to the upper right illustrated in FIG. 8, forms an angle of, for example, 80° with the X-axis direction, and forms an angle of, for example, 10° with the Y-axis direction. The pixel electrode 28 has a point-symmetric shape with its center in the X-axis direction and the Y-axis direction serving as the point of symmetry.

As illustrated in FIG. 8, the slit 30A of the common electrode 30 has a vertically long substantially parallelogram shape that is narrower than the pixel electrode 28 in plan view. Specifically, most of both side edges on the longitudinal side of the slit 30A extend along the oblique direction (second direction) with respect to the X-axis direction (first direction) and the Y-axis direction (fourth direction orthogonal to the first direction). The slit 30A has a parallelogram shape with both end side portions in the Y-axis direction each being substantially arc-shaped in plan view and with a center-side portion in the Y-axis direction extending along the oblique direction with a constant width. The slit 30A has an upper end side portion in the Y-axis direction protruding toward the right side in FIG. 8, and has a lower end side portion protruding toward the left side in FIG. 8. With the planar shape of both end side portions of the slit 30A in the Y-axis direction being substantially arc-shaped as described above, the alignment disturbance that may occur in the liquid crystal molecules can be limited to the both end side portions of the slit 30A in the Y-axis direction. Accordingly, the alignment disturbance of the liquid crystal molecules that may occur is less likely to affect the center-side portion of the slit 30A in the Y-axis direction, and is less likely to be visually recognized as a dark line. The extension direction of the center-side portion of the slit 30A in the Y-axis direction is substantially parallel to the extension direction of the center-side portion of the pixel electrode 28 in the Y-axis direction, forms an angle of, for example, 80° with respect to the X-axis direction, and forms an angle of, for example, 10° with respect to the Y-axis direction. Here, when the X-axis direction is defined as the "first direction", the extension direction of the slit 30A is defined as the "second direction", and the angle formed by the second direction with respect to the first direction is defined as the "first angle θ1", and the first angle θ1 is, for example, 80°. Similarly to the extension direction of the pixel electrode 28, the second direction is a direction from the lower left to the upper right in FIG. 8. When the second direction is decomposed into two vector components along the X-axis direction and the Y-axis direction, the vector component along the X-axis direction is rightward, and the vector component along the Y-axis direction is upward. The slit 30A has a point-symmetric shape with its center in the X-axis direction and the Y-axis direction serving as the point of symmetry. A dimension of the slit 30A in each of the X-axis direction and the Y-axis direction is smaller than a dimension of the pixel electrode 28 in the X-axis direction and the Y-axis direction, respectively.

The light blocking portion 43 will be described in detail with reference to FIG. 6 and FIG. 8. As illustrated in FIG. 6, the light blocking portion 43 is located more on the upper layer side (the side closer to the liquid crystal layer 22) than at least the color filter 29. In the present embodiment, the light blocking portion 43 includes the fifth metal film, is disposed on the upper layer side of the common electrode 30, and is in direct contact with the common electrode 30. Therefore, the light blocking portion 43 has the same potential (common potential) as the common electrode 30. The light blocking portion 43 can block light emitted from the backlight device 12 toward the liquid crystal panel 11 for example. As illustrated in FIG. 6 and FIG. 8, the light blocking portion 43 is disposed so as to partition the pixel electrodes 28 adjacent to each other in the X-axis direction. In other words, the light blocking portion 43 is disposed at a boundary between the color filters 29 that are adjacent to each other in the X-axis direction and exhibit colors different from each other. The light blocking portion 43 has a vertically long shape extending along the Y-axis direction, and is disposed overlapping part of the source wiring line 26 in plan view. Thus, the extension direction of the light blocking portion 43 is orthogonal to (intersects) the extension direction of the counter-side light blocking portion 20BM provided to the counter substrate 20.

As illustrated in FIG. 8, light blocking portions 43 are arranged regularly at intervals in both the X-axis direction and the Y-axis direction. An arrangement interval between the plurality of light blocking portions 43 in each of the X-axis direction and the Y-axis direction is substantially the same as an arrangement interval between the plurality of pixel electrodes 28 in the X-axis direction and the Y-axis direction, respectively. The dimension of the light blocking portion 43 in the Y-axis direction is slightly shorter than the dimension of the pixel electrode 28 in the Y-axis direction. The center position of the light blocking portion 43 in the Y-axis direction is substantially the same as the center position of the pixel electrode 28 in the Y-axis direction. The dimension of the light blocking portion 43 in the X-axis direction is smaller than the dimension of the pixel electrode 28 in the X-axis direction and larger than the dimension of the slit 30A in the X-axis direction. The dimension of the light blocking portion 43 in the Y-axis direction is smaller than any of the respective dimensions of the pixel electrode 28 and the slit 30A in the Y-axis direction.

As illustrated in FIG. 6 and FIG. 8, the plurality of light blocking portions 43 include a first light blocking portion 43A disposed at the boundary between the first color filter 29G and the second color filter 29B, a second light blocking portion 43B disposed at the boundary between the second color filter 29B and the third color filter 29R, and a third light blocking portion 43C disposed at the boundary between the first color filter 29G and the third color filter 29R. The first light blocking portion 43A partitions between the first pixel electrode 28A and the second pixel electrode 28B. Thus, the first light blocking portion 43A can block the light traveling toward the second pixel electrode 28B having passed through the first color filter 29G, and the light traveling toward the first pixel electrode 28A having passed through the second color filter 29B. The second light blocking portion 43B partitions between the second pixel electrode 28B and the third pixel electrode 28C. Thus, the second light blocking portion 43B can block the light traveling toward the third pixel electrode 28C having passed through the second color filter 29B, and the light traveling toward the second pixel electrode 28B having passed through the third color filter 29R. The third light blocking portion 43C partitions between the first pixel electrode 28A and the third pixel electrode 28C. Thus, the third light blocking portion 43C can block the light traveling toward the third pixel electrode 28C having passed through the first color filter 29G, and the light traveling toward the first pixel electrode 28A having passed through the third color filter 29R. Thus, with the light blocking portions 43A to 43C, color mixing is less likely to occur, whereby display independence among display by the first pixel electrode 28A (first pixel GPX), display by the second pixel electrode 28B (second pixel BPX), and display by the third pixel electrode 28C (third pixel RPX) is guaranteed. Since the light blocking portion 43 includes the fifth metal film and is disposed on the upper layer side of the common electrode 30, it is possible to block more light that may cause color mixing. Thus, a higher color mixing prevention function is achieved.

The detailed planar shape of the light blocking portion 43 will be described with reference to FIG. 8. As illustrated in FIG. 8, the light blocking portion 43 has a vertically long shape as a whole in plan view, and has a point-symmetric shape with its center in the X-axis direction and the Y-axis direction serving as the point of symmetry. The light blocking portion 43 has a shape in which both end side portions in the Y-axis direction are narrower than the center-side portion. Thus, the light blocking portion 43 is prevented from overlapping the end side portions, in the Y-axis direction, of the slits 30A adjacent on the left and right sides in the X-axis direction. In an outer peripheral end portion of the light blocking portion 43, each end portion 44 adjacent to each slit 30A in the X-axis direction includes an inclined portion 45 extending along an oblique direction (third direction) inclined with respect to the X-axis direction (first direction) and the Y-axis direction (fourth direction orthogonal to the first direction). Each end portion 44 of the light blocking portion 43 includes a straight portion (third angle portion) 46 extending substantially straight along the Y-axis direction.

As illustrated in FIG. 8, the inclined portion 45 extends along an oblique direction inclined toward the same side as the extension direction (second direction) of the slit 30A with respect to the X-axis direction. Here, the definition of "inclined toward the same side" will be described. Defining a coordinate system having an origin at a certain point on an edge portion 47 of the center-side portion (portion extending along the second direction) of the slit 30A as a first XY coordinate system, and a coordinate system having an origin at a certain point on the inclined portion 45 as a second XY coordinate system, the definition of being "inclined toward the same side" is that the slope of a linear function defined by the edge portion 47 in the center-side portion of the slits 30A in the first XY coordinate system and the slope of a linear function defined by the inclined portion 45 in the second XY coordinate system have the same positive or negative sign. The extension direction of the inclined portion 45 forms an angle of, for example, 87° with respect to the X-axis direction and forms an angle of, for example, 3° with respect to the Y-axis direction (alignment direction). Here, when the X-axis direction is defined as the "first direction", the extension direction of the inclined portion 45 is defined as the "third direction", and the angle formed by the third direction with respect to the first direction is defined as the "second angle θ2", and the second angle θ2 is, for example, 87°. As described above, the inclined portion 45 has the second angle θ2, which is formed between the first direction and the third direction that is the extension direction of the inclined portion 45, being larger than the first angle θ1, which is formed between the first direction and the second direction that is the extension direction of the slit 30A. In addition, the straight portion 46 forms a third angle θ3 larger than the second angle θ2, with respect to the X-axis direction. The third angle θ3 which is an angle formed by the straight portion 46 with respect to the X-axis direction is set to, for example, 90°.

Here, in the manufacturing process for the array substrate 21 constituting the liquid crystal panel 11, a so-called photolithography method is used, in which a film to be patterned (a metal film, a transparent electrode film, or the like) is formed, a photoresist film is formed, the photoresist film is exposed and developed using a photomask, and the film to be patterned is etched using the photoresist film as a mask, thereby forming wiring lines, electrodes, and the like. When the photomask used in the exposure step of the photoresist film is displaced, the displacement of the photomask is reflected in the formation position of the patterned wiring line, electrode, or the like. The term "displacement" used below means "displacement in a direction (including the X-axis direction and the Y-axis direction) along the main surface of the array substrate 21". In particular, in the liquid crystal panel 11 according to the present embodiment, since the pixel density is equal to or higher than 1000 ppi, meaning that the definition is extremely high, even a slight displacement of the photomask may significantly affect the display quality adversely. To be specific, when displacement occurs between the slit 30A of the common electrode 30 and the light blocking portion 43 in the X-axis direction and part of the light blocking portion 43 enters the slit 30A, since the light blocking portion 43 have the same potential as the common electrode 30, distortion or the like may occur in the electrical field generated between the common electrode 30 and the pixel electrode 28. When distortion or the like occurs in the electrical field, disturbance occurs in the alignment state of the liquid crystal molecules, which may cause a decrease in luminance.

In view of this, in the present embodiment, as illustrated in FIG. 8, the second angle θ2, which is formed between the first direction and the third direction that is the extension direction of the inclined portion 45, is set to be larger than the first angle θ1, which is formed between the first direction and the second direction that is the extension direction of the slits 30A, so that even when the common electrode 30 and the light blocking portion 43 are displaced in the X-axis direction, the end portion 44 of the light blocking portion 43 can be prevented from entering the slit 30A over the entire length as in the known configuration. Accordingly, distortion or the like is less likely to occur in the electrical field generated between the common electrode 30 and the pixel electrode 28, and thus a decrease in luminance is less likely to occur. In addition, compared with a case where the second angle θ2 is set to be smaller than the first angle θ1, the portion of the light blocking portion 43 including the inclined portion 45 can be guaranteed to be formed over a wide range in the X-axis direction. Accordingly, the color mixing prevention function can be guaranteed to be provided by the light blocking portion 43. Since the counter-side light blocking portion 20BM provided to the counter substrate 20 has a horizontally long shape extending along the X-axis direction, even when the counter substrate 20 is displaced in the X-axis direction with respect to the array substrate 21 at the time of bonding the substrates 20 and 21, it is possible to avoid a problem such as a decrease in aperture ratio caused by the counter-side light blocking portion 20BM.

As illustrated in FIG. 8, two inclined portions 45 are provided to one light blocking portion 43. The two inclined portions 45 will be described in detail with reference to the first light blocking portion 43A. To begin with, the slits 30A include the first slit 30A1 overlapping the first color filter 29G and the second slit 30A2 overlapping the second color filter 29B. The edge portion 47 of the center-side portion of the first slit 30A1 includes a first edge portion 47A which is adjacent to the first light blocking portion 43A in the X-axis direction. The edge portion 47 of the center-side portion of the second slit 30A2 includes a second edge portion 47B which is adjacent to the first light blocking portion 43A in the X-axis direction. An outer peripheral end portion of the first light blocking portion 43A includes a first end portion 44A adjacent to the first slit 30A1 in the X-axis direction and a second end portion 44B adjacent to the second slit 30A2 in the X-axis direction. The inclined portion 45 includes a first inclined portion 45A included in the first end portion 44A and a second inclined portion 45B included in the second end portion 44B. The first inclined portion 45A and the second inclined portion 45B are parallel to each other, and are disposed at point-symmetric positions with the center of the first light blocking portion 43A in the X-axis direction and the Y-axis direction serving as the point of symmetry.

Figure 9:
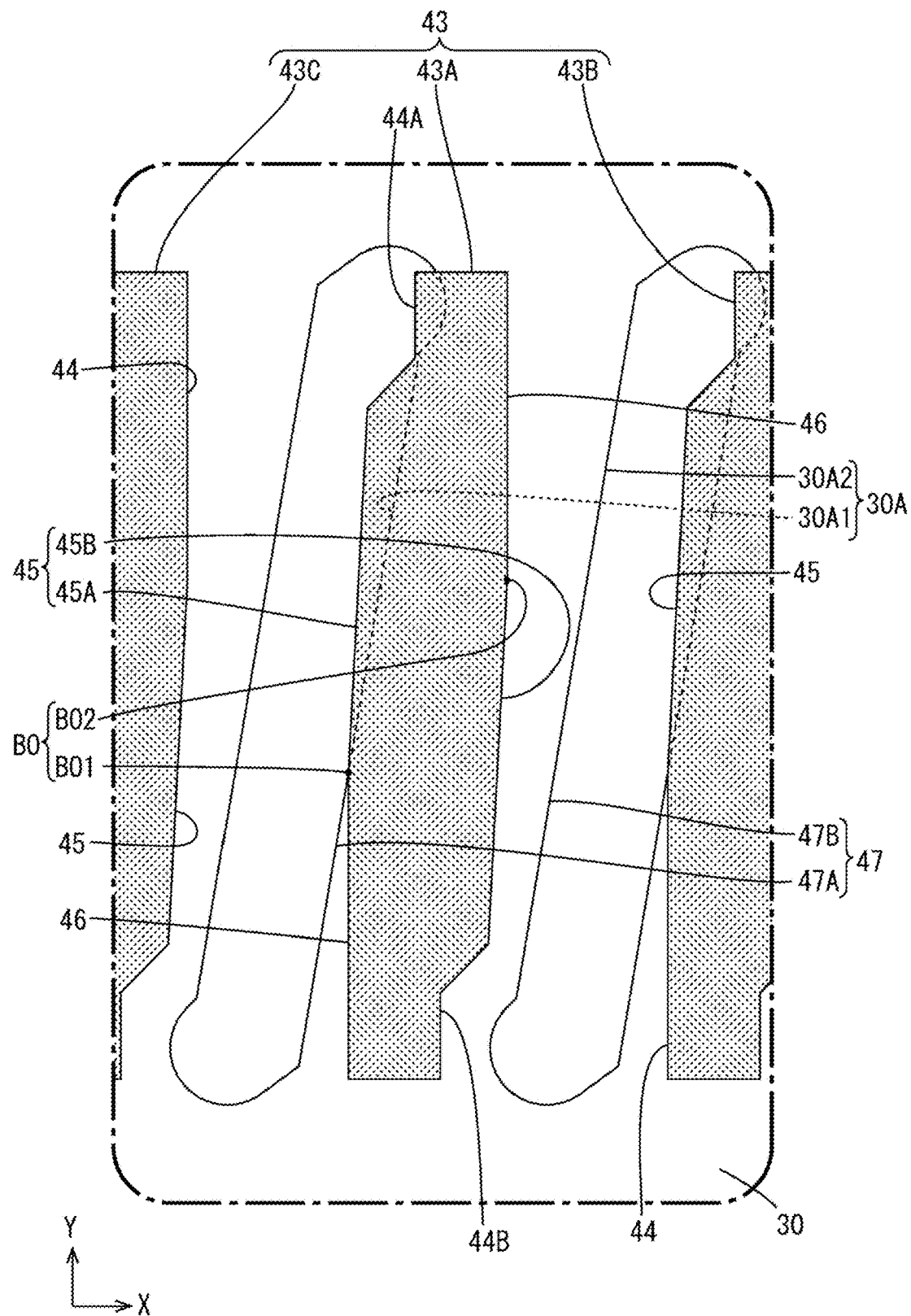
FIG. 9 is a plan view illustrating a relationship between the slit and the light blocking portion maximally displaced toward the left side, in the display region of the liquid crystal panel according to the first embodiment.
Figure 10:
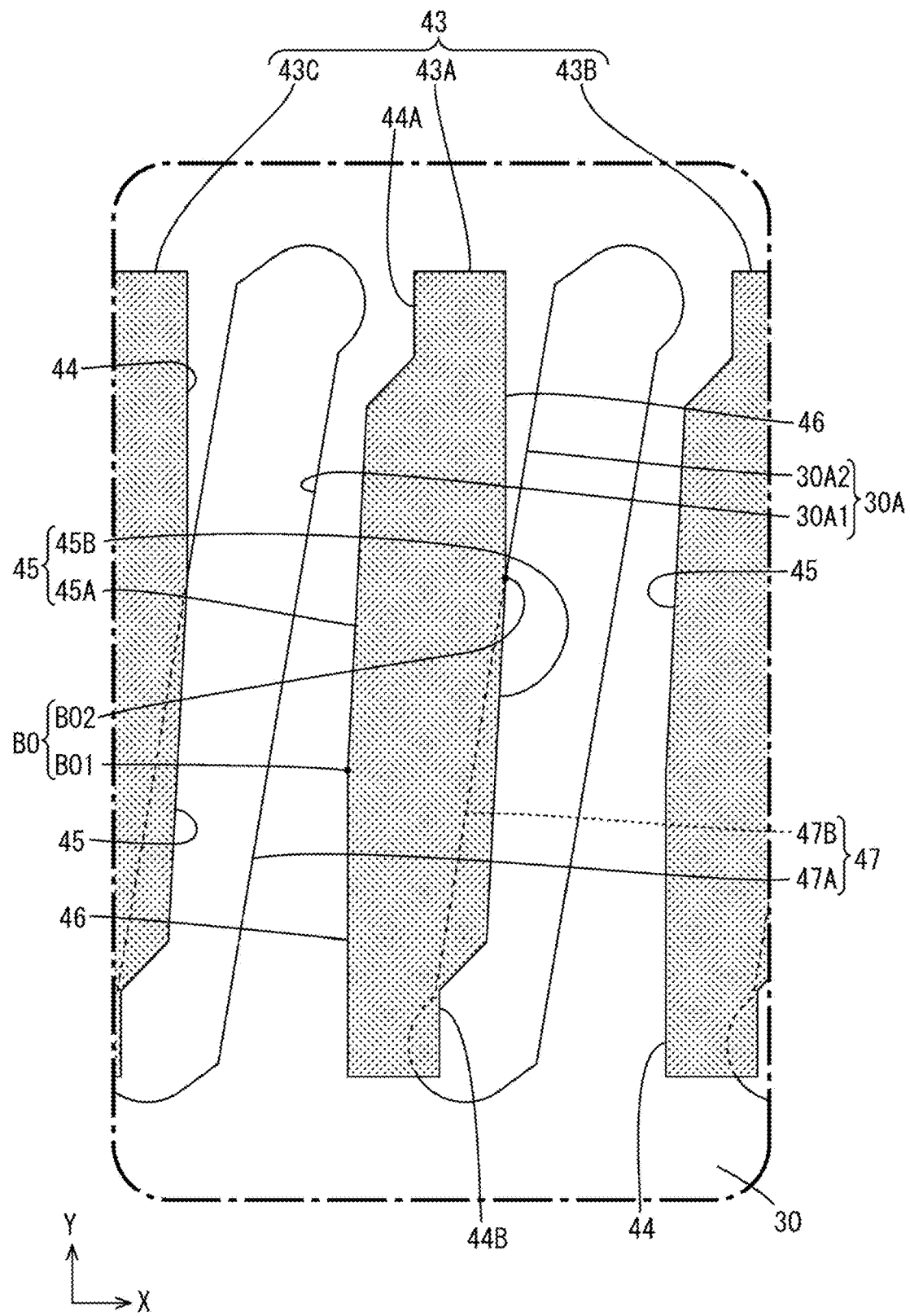
FIG. 10 is a plan view illustrating a relationship between the slit and the light blocking portion maximally displaced toward the right side, in the display region of the liquid crystal panel according to the first embodiment.

The displacement between the common electrode 30 and the first light blocking portion 43A in the X-axis direction may include the following two cases: a case in which the first end portions 43A of the first light blocking portion 44A move toward the first slit 30A1 and the second end portion 44B move away from the second slit 30A2 as illustrated in FIG. 9; and a case in which the second end portion 44B of the first light blocking portion 43A move toward the second slit 30A2 and the first end portion 44A move away from the first slit 30A1 as illustrated in FIG. 10. In FIG. 9 and FIG. 10, among the components of the array substrate 21, the common electrode 30, and the light blocking portion 43 are selectively illustrated, and in particular, the light blocking portion 43 is illustrated in a shaded manner. In the former case (see FIG. 9), since the first end portion 44A includes the first inclined portion 45A, the entrance of the first end portion 44A of the first light blocking portion 43A into the slit 30A over the entire length is avoided. In the latter case (see FIG. 10), since the second end portion 44B includes the second inclined portion 45B, the entrance of the second end portion 44B of the first light blocking portion 43A into the slit 30A over the entire length is avoided. As described above, in any case, the entrance of the left and right end portions 44A and 44B of the first light blocking portion 43A in the X-axis direction into the slit 30A over the entire length is avoided, thus a decrease in luminance due to the entrance is less likely to occur.

As illustrated in FIG. 8, the distance between the first edge portion 47A of the first slit 30A1 and the first inclined portion 45A decreases toward the upper end of the first slit 30A1 in FIG. 8 in the Y-axis direction. Similarly, the distance between the second edge portion 47B of the second slit 30A2 and the second inclined portion 45B decreases toward the lower end of the second slit 30A2 in FIG. 8 in the Y-axis direction. This is because the second angle θ2 is larger than the first angle θ1. The end portion of the inclined portion 45 on the side opposite to the straight portion 46 in the Y-axis direction enters the slit 30A. That is, the inclined portions 45A and 45B are disposed so as to intersect the edge portions 47A and 47B of the first slit 30A1 in the common electrode 30 extending along the second direction in plan view. With this configuration, the portion of the light blocking portion 43 including the inclined portion 45 can be guaranteed to be formed over a wide range in the X-axis direction, compared with a case where the inclined portion does not intersect with the edge portion 47 of the slit 30A of the common electrode 30 in plan view. Accordingly, the color mixing prevention function can be guaranteed to be provided by the light blocking portion 43.

Next, a boundary BO between the inclined portion 45 and the straight portion 46 in the end portion 44 of the light blocking portion 43 will be described in detail. As illustrated in FIGS. 8 to 10, the boundary BO between the inclined portion 45 and the straight portion 46 is set based on the expected maximum value of the displacement amount in the X-axis direction that may occur between the common electrode 30 and the light blocking portion 43. The "expected maximum value of the displacement amount in the X-axis direction" is the maximum displacement amount in the X-axis direction expected for the photomask used in the exposure step of the photoresist film in the manufacturing process for the array substrate 21. In the present embodiment, the expected maximum value of the displacement amount in the X-axis direction is, for example, about 0.8 μm. To be more specific, as illustrated in FIG. 9, when the light blocking portions 43 are maximally displaced toward the left side of FIG. 9 in the X-axis direction from the normal position (the position illustrated in FIG. 8) with respect to the common electrodes 30, the first end portion 44A of the first light blocking portion 43A intersects the first edge portion 47A of the first slit 30A1. This intersection matches a first boundary BO1 between the first inclined portion 45A of the first end portion 44A of the first light blocking portion 43A and the straight portion 46. On the other hand, as illustrated in FIG. 10, when the light blocking portions 43 are maximally displaced toward the right side of FIG. 10 in the X-axis direction from the normal position with respect to the common electrodes 30, the second end portion 44B of the first light blocking portion 43A intersects the second edge portion 47B of the second slit 30A2. This intersection matches a second boundary BO2 between the second inclined portion 45B of the second end portion 44B of the first light blocking portion 43A and the straight portion 46. With this configuration, the maximum expected displacement of the common electrode 30 and the light blocking portion 43 in the X-axis direction results in the inclined portion 45 being provided over the entire region of the portion of the end portion 44 of the light blocking portion 43 entering the slit 30A. Thus, the maximum expected displacement of the common electrode 30 and the light blocking portion 43 in the X-axis direction that may occur leads to a smaller area of the light blocking portion 43 overlapping the slit 30A, compared with the case where the boundary between the inclined portion 45 and the straight portion 46 is located in the slit 30A. Thus, the decrease in luminance is less likely to occur. On the other hand, the maximum expected displacement of the common electrode 30 and the light blocking portion 43 in the X-axis direction that may occur leads to a larger area of the light blocking portion 43, compared with the case where the boundary between the inclined portion 45 and the straight portion 46 is located outside the slit 30A. Accordingly, a high color mixing prevention function can be provided by the light blocking portion 43.

As illustrated in FIG. 8, the inclined portion 45 is provided with the second angle θ2 being in a range having an upper limit value of 87° and a lower limit value that is larger than the first angle θ1 by 3°. In the present embodiment, since the first angle θ1 is 80°, the angle range of the second angle θ2 is 83° to 87°. Specifically, in the present embodiment, the second angle θ2 is 87°, which is the upper limit value of the above-described angle range. With the upper limit value of the numerical value range including the second angle θ2 being 87°, the alignment angle of the liquid crystal molecules controlled using the electrical field generated between the common electrode 30 and the pixel electrode 28 for example can be more easily maintained, compared with a hypothetical case where the upper limit value exceeds 87°. Thus, the display quality can be maintained at a good level. With the lower limit value of the numerical value range including the second angle θ2 being "first angle θ1+3°", the color mixing prevention function can be more easily provided by the light blocking portion 43, compared with a hypothetical case where the lower limit value is smaller than "first angle θ1+3°".

Figure 11:
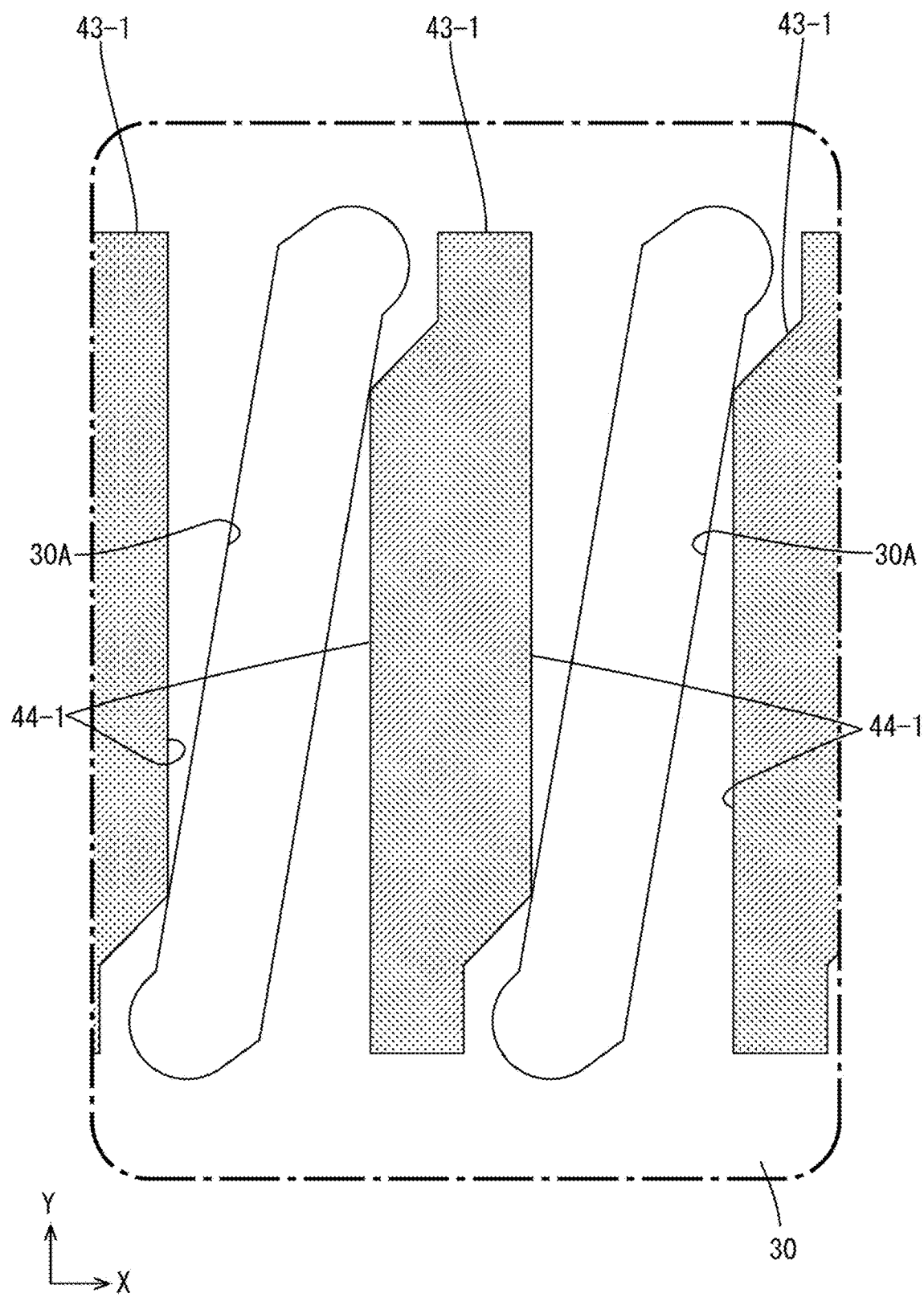
FIG. 11 is a plan view illustrating a relationship between the slit and the light blocking portion at the normal position in a display region of a liquid crystal panel according to Comparative Example 1 of Comparative Experiment 1 according to the first embodiment.
Figure 12:
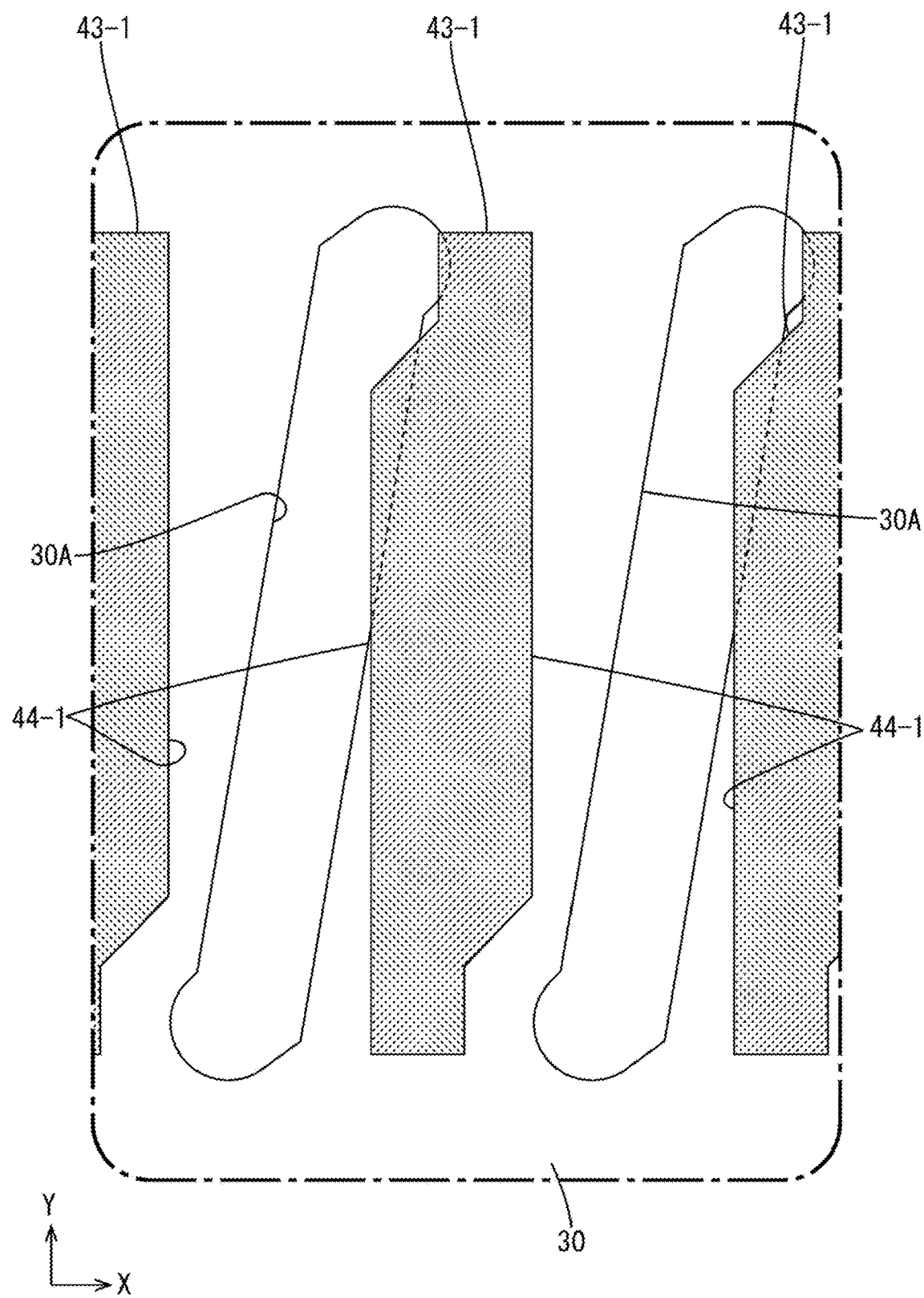
FIG. 12 is a plan view illustrating a relationship between the slit and the light blocking portion maximally displaced toward the left side, in the display region of the liquid crystal panel according to Comparative Example 1 of Comparative Experiment 1 according to the first embodiment.
Figure 13:
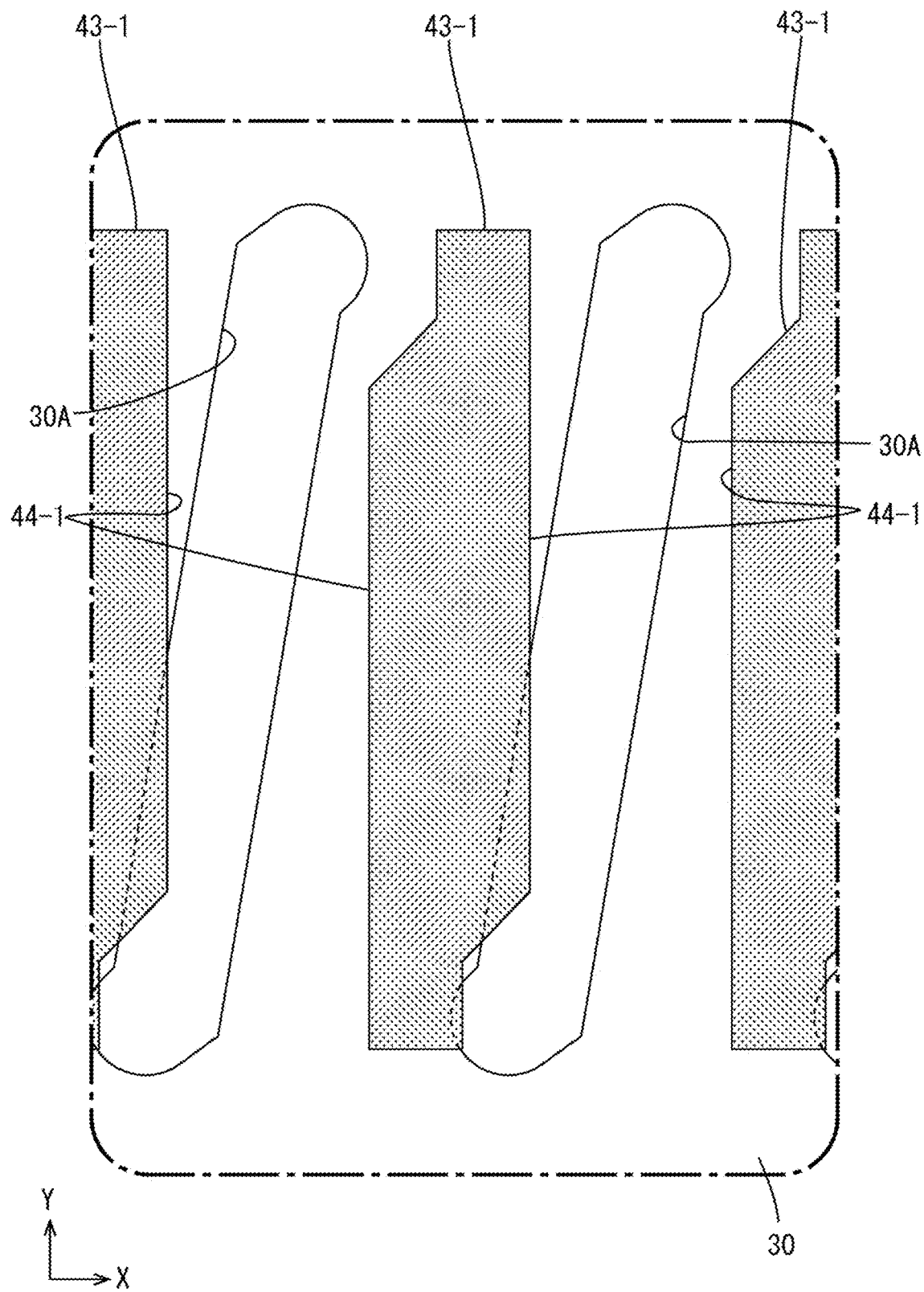
FIG. 13 is a plan view illustrating a relationship between the slit and the light blocking portion maximally displaced toward the right side, in the display region of the liquid crystal panel according to Comparative Example 1 of Comparative Experiment 1 according to the first embodiment.

Subsequently, in order to validate an advantage of the liquid crystal panel 11 according to the present embodiment, the following Comparative Experiments 1 and 2 were performed. First of all, a description will be given on Comparative Experiment 1. In Comparative Experiment 1, the liquid crystal panel 11 having the configuration described in the paragraph preceding Comparative Experiment 1 was defined as Example 1 (see FIG. 8 to FIG. 10), and a liquid crystal panel with a light blocking portion 43-1 having an alternative configuration was defined as Comparative Example 1. The light blocking portion 43-1 in the liquid crystal panel according to Comparative Example 1 is as illustrated in FIG. 11 to FIG. 13. FIG. 11 is a plan view in a case where the light blocking portion 43-1 is located at the normal position with respect to the common electrode 30. FIG. 12 is a plan view in a case where the light blocking portion 43-1 is maximally displaced toward the left side with respect to the common electrode 30. FIG. 13 is a plan view in a case where the light blocking portion 43-1 is maximally displaced toward the right side with respect to the common electrode 30. In FIG. 11 to FIG. 13, the light blocking portion 43-1 is illustrated in a shaded manner. As illustrated in FIG. 11, in the light blocking portion 43-1 according to Comparative Example 1, an end portion 44-1 adjacent to the slit 30A of the common electrode 30 in the X-axis direction does not include the inclined portion 45 as in Example 1, and extends substantially linearly along the Y-axis direction. The maximum dimension of the light blocking portion 43-1 in the X-axis direction in Comparative Example 1 is the same as the maximum dimension of the light blocking portion 43 in the X-axis direction in Example 1. Therefore, the light blocking portion 43-1 in Comparative Example 1 has an area in plan view that is twice as large as the area of the right-angled triangle having the inclined portion 45 as the hypotenuse in the light blocking portion 43 in Example 1. The expected maximum value of the displacement amount of the light blocking portion 43-1 in the X-axis direction in Comparative Example 1 is, for example, about 0.8 µm.

Figure 14:
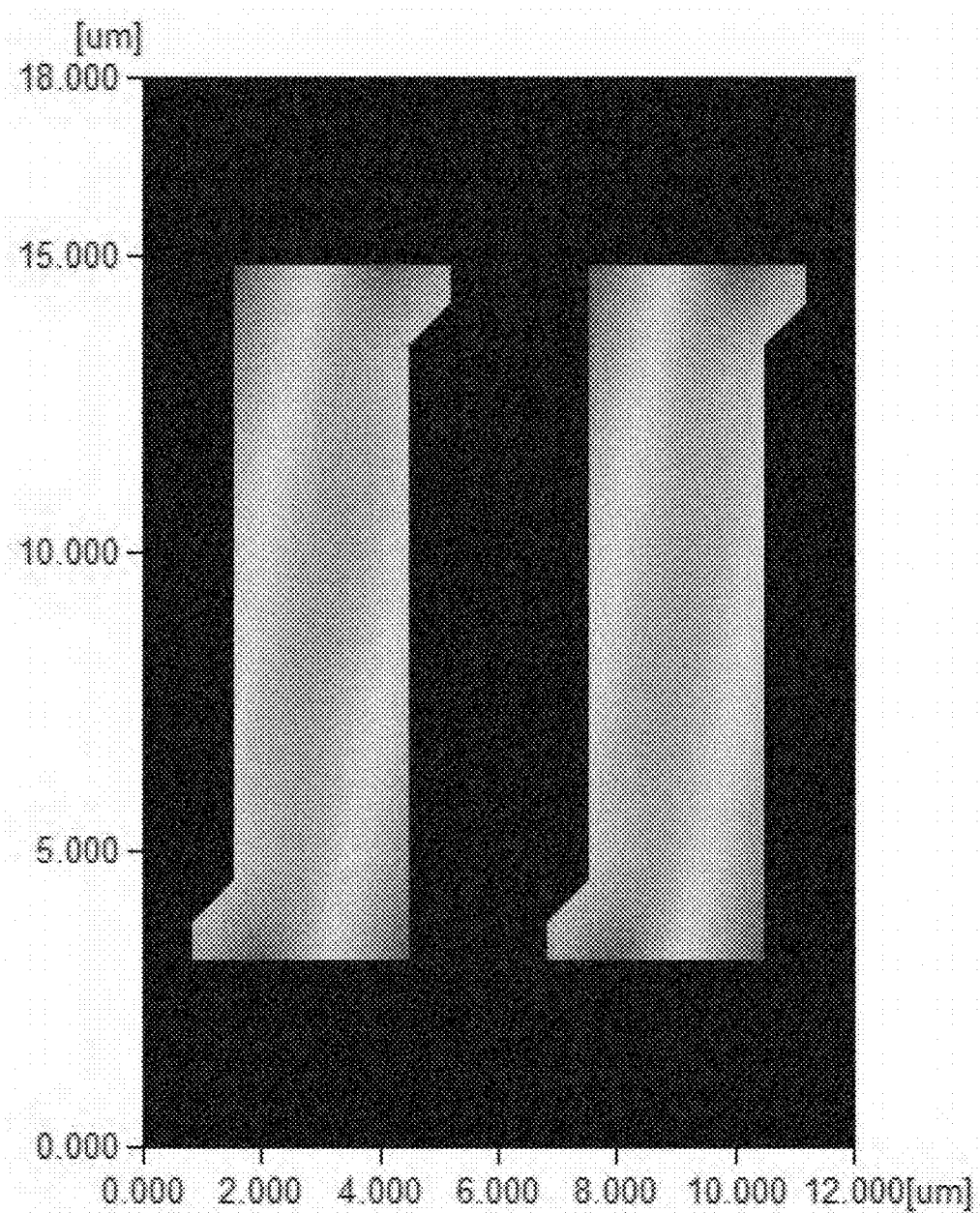
FIG. 14 is a diagram illustrating a transmittance distribution in a case where the light blocking portion is at the normal position, which is an experimental result of Comparative Example 1 of Comparative Experiment 1 according to the first embodiment.
Figure 15:
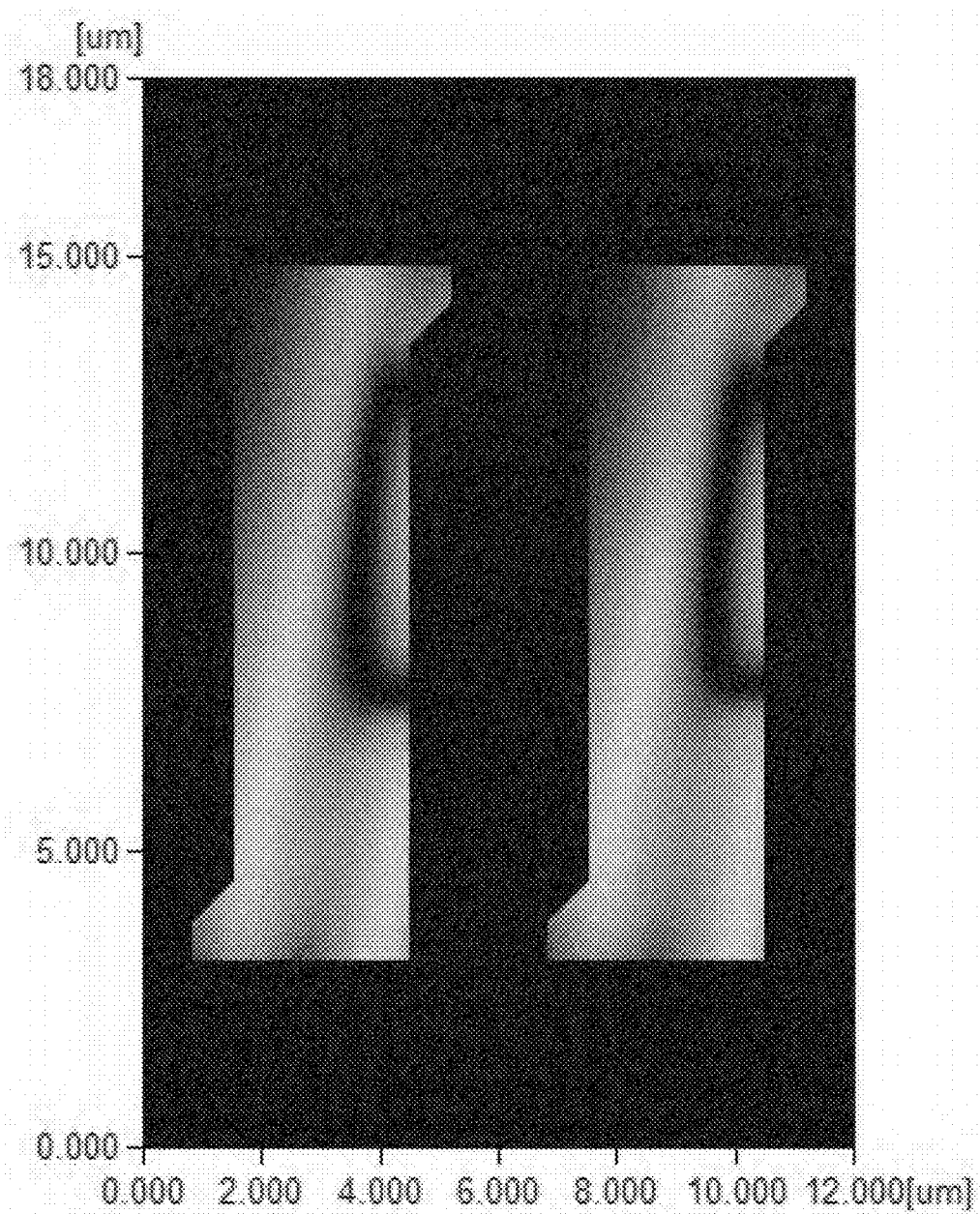
FIG. 15 is a diagram illustrating a transmittance distribution in a case where the light blocking portion is maximally displaced toward the left side, which is an experimental result of Comparative Example 1 of Comparative Experiment 1 according to the first embodiment.
Figure 16:
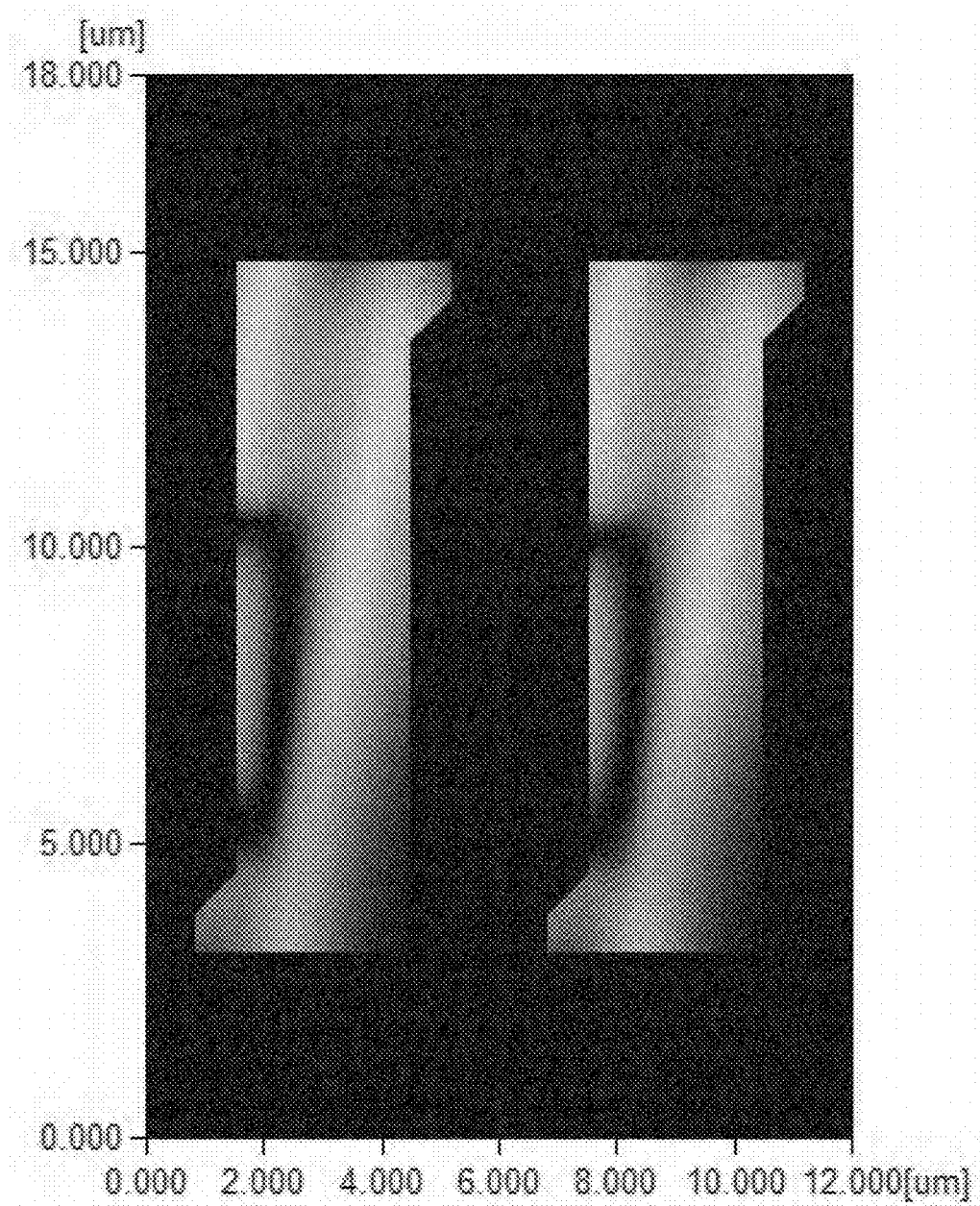
FIG. 16 is a diagram illustrating a transmittance distribution in a case where the light blocking portion is maximally displaced toward the right side, which is an experimental result of Comparative Example 1 of Comparative Experiment 1 according to the first embodiment.
Figure 17:
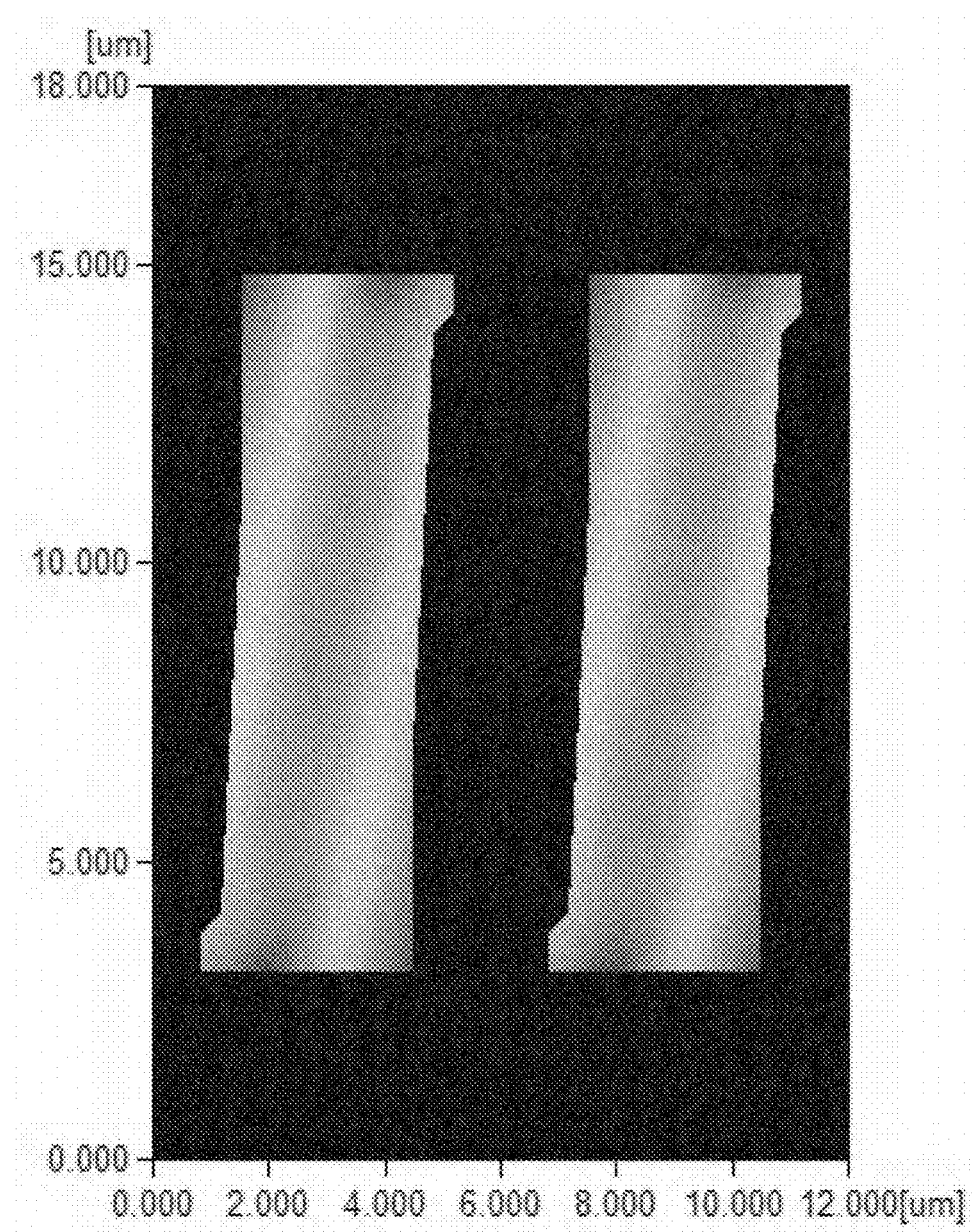
FIG. 17 is a diagram illustrating a transmittance distribution in a case where the light blocking portion is at the normal position, which is an experimental result of Example 1 of Comparative Experiment 1 according to the first embodiment.
Figure 18:
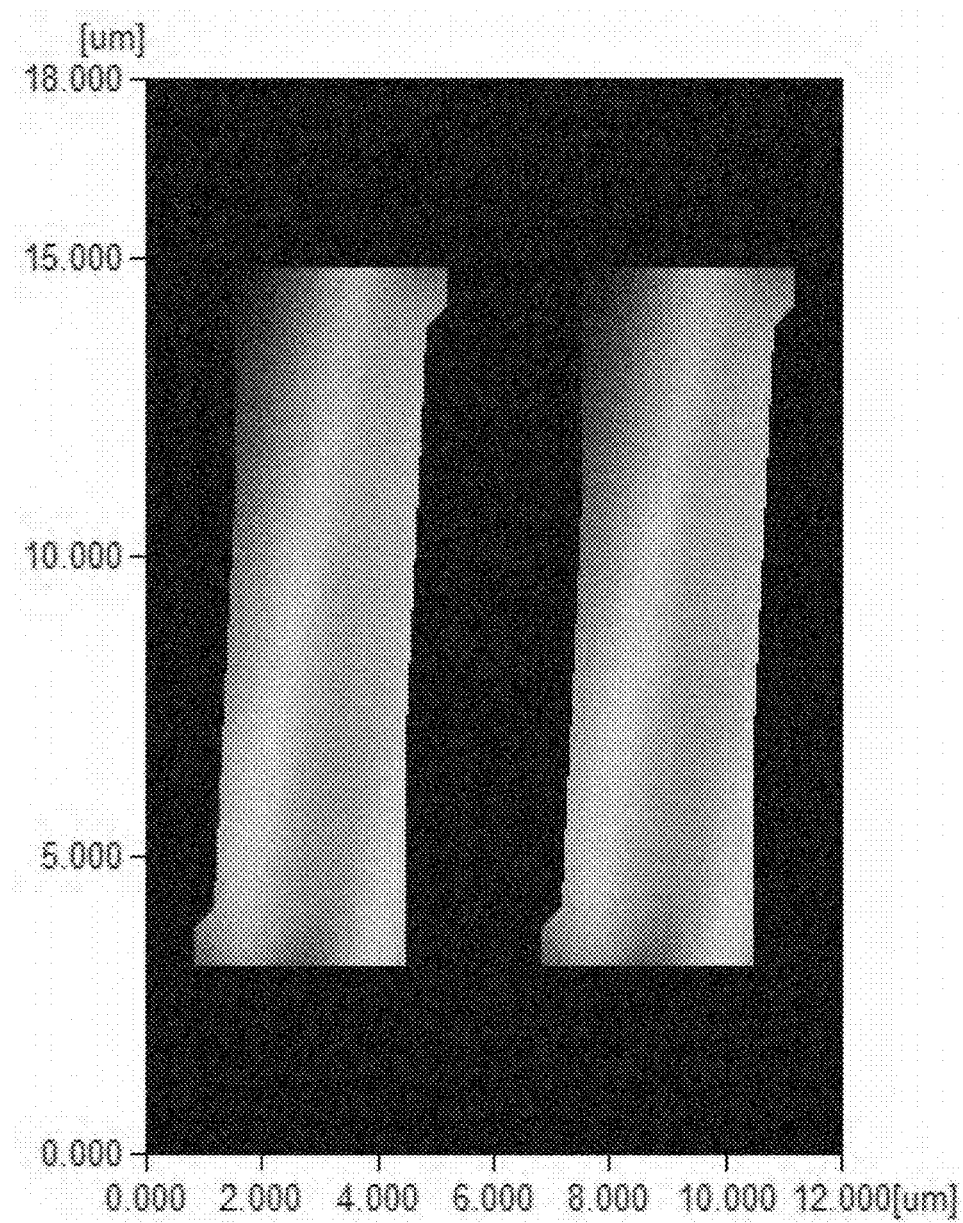
FIG. 18 is a diagram illustrating a transmittance distribution in a case where the light blocking portion is maximally displaced toward the left side, which is an experimental result of Example 1 of Comparative Experiment 1 according to the first embodiment.
Figure 19:
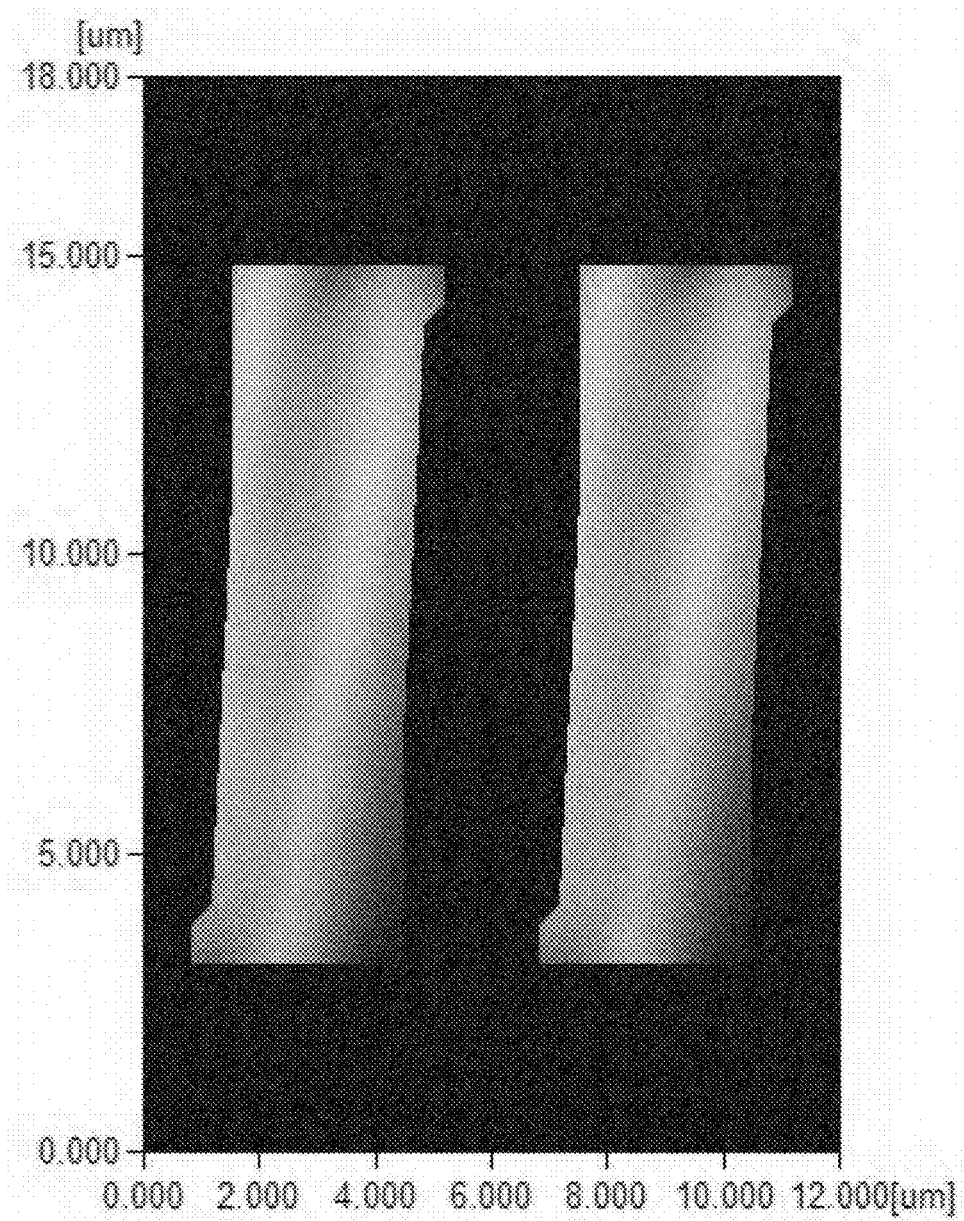
FIG. 19 is a diagram illustrating a transmittance distribution in a case where the light blocking portion is maximally displaced toward the right side, which is an experimental result of Example 1 of Comparative Experiment 1 according to the first embodiment.

In Comparative Experiment 1, for each of the liquid crystal panels according to Comparative Example 1 and Example 1 configured as described above, the amount of transmitted light was measured to create transmittance distributions, with white display (maximum gradation display) on the entire screen under each of the following conditions: the light blocking portion 43, 43-1 not being displaced in the X-axis direction with respect to the common electrode 30; the light blocking portion 43, 43-1 being maximally displaced toward the left side (one side) in the X-axis direction with respect to the common electrode 30; the light blocking portion 43, 43-1 being maximally displaced toward the right side (the other side) in the X-axis direction with respect to the common electrode 30. The transmittance distribution according to Comparative Example 1 is illustrated in FIG. 14 to FIG. 16. The transmittance distribution according to Example 1 is illustrated in FIG. 17 to FIG. 19. FIG. 14 and FIG. 17 illustrate transmittance distributions under the condition that the light blocking portion 43, 43-1 is not displaced with respect to the common electrode 30. FIG. 15 and FIG. 18 illustrate transmittance distributions under the condition that the light blocking portion 43, 43-1 is maximally displaced toward the left side with respect to the common electrode 30. FIG. 16 and FIG. 19 illustrate transmittance distributions under the condition that the light blocking portion 43, 43-1 is maximally displaced toward the right side with respect to the common electrode 30. In the transmittance distributions illustrated in FIG. 14 to FIG. 19, the level of transmittance is expressed by the gray scale level. A higher transmittance (brighter) tends to be lighter, and a lower transmittance (darker) tends to be darker. FIG. 14 to FIG. 19 illustrate transmittance distributions in two pixels GPX and BPX continuously arranged side by side along the X-axis direction.

The experimental result of Comparative Experiment 1 will be described. When the light blocking portion 43, 43-1 is not displaced with respect to the common electrode 30 in the X-axis direction, as illustrated in FIG. 14 and FIG. 17, there is almost no difference in the transmittance distribution between Comparative Example 1 and Example 1. When the light blocking portion 43, 43-1 is maximally displaced toward the left side or the right side in the X-axis direction with respect to the common electrode 30, as illustrated in FIGS. 15, 16, 18, and 19, the transmittance distribution of Example 1 has a smaller dark portion than that of Comparative Example 1. Specifically, in Comparative Example 1, when the light blocking portion 43-1 is maximally displaced toward the left side in the X-axis direction with respect to the common electrode 30, as illustrated in FIG. 15, a dark line extending along the Y-axis direction is generated on the right side portion of the pixels GPX, BPX, and RPX, and luminance reduction occurs near the upper left corner portion of the pixels GPX, BPX, and RPX. In Comparative Example 1, when the light blocking portion 43-1 is maximally displaced toward the right side in the X-axis direction with respect to the common electrode 30, as illustrated in FIG. 16, a dark line extending along the Y-axis direction is generated on the left side portion of the pixels GPX, BPX, and RPX, and luminance reduction occurs near the lower right corner portion of the pixels GPX, BPX, and RPX. As described above, in Comparative Example 1, when the light blocking portion 43-1 is displaced, the dark line extending along the Y-axis direction is likely to be visually recognized. On the other hand, in Example 1, when the light blocking portion 43 is maximally displaced toward the left side in the X-axis direction with respect to the common electrode 30, as illustrated in FIG. 18, while a decrease in luminance occurs near the upper left corner portions of the pixels GPX, BPX, and RPX, the decrease is hardly visually recognized as a dark line. In Example 1, when the light blocking portion 43 is maximally displaced toward the right side in the X-axis direction with respect to the common electrode 30, as illustrated in FIG. 19, while a decrease in luminance occurs near the lower right corner portions of the pixels GPX, BPX, and RPX, the decrease is hardly visually recognized as a dark line. As described above, in Example 1, as compared with Comparative Example 1, a decrease in luminance that may occur when the light blocking portion 43 is displaced is suppressed, and a dark line is less likely to be visually recognized.

Figure 20:
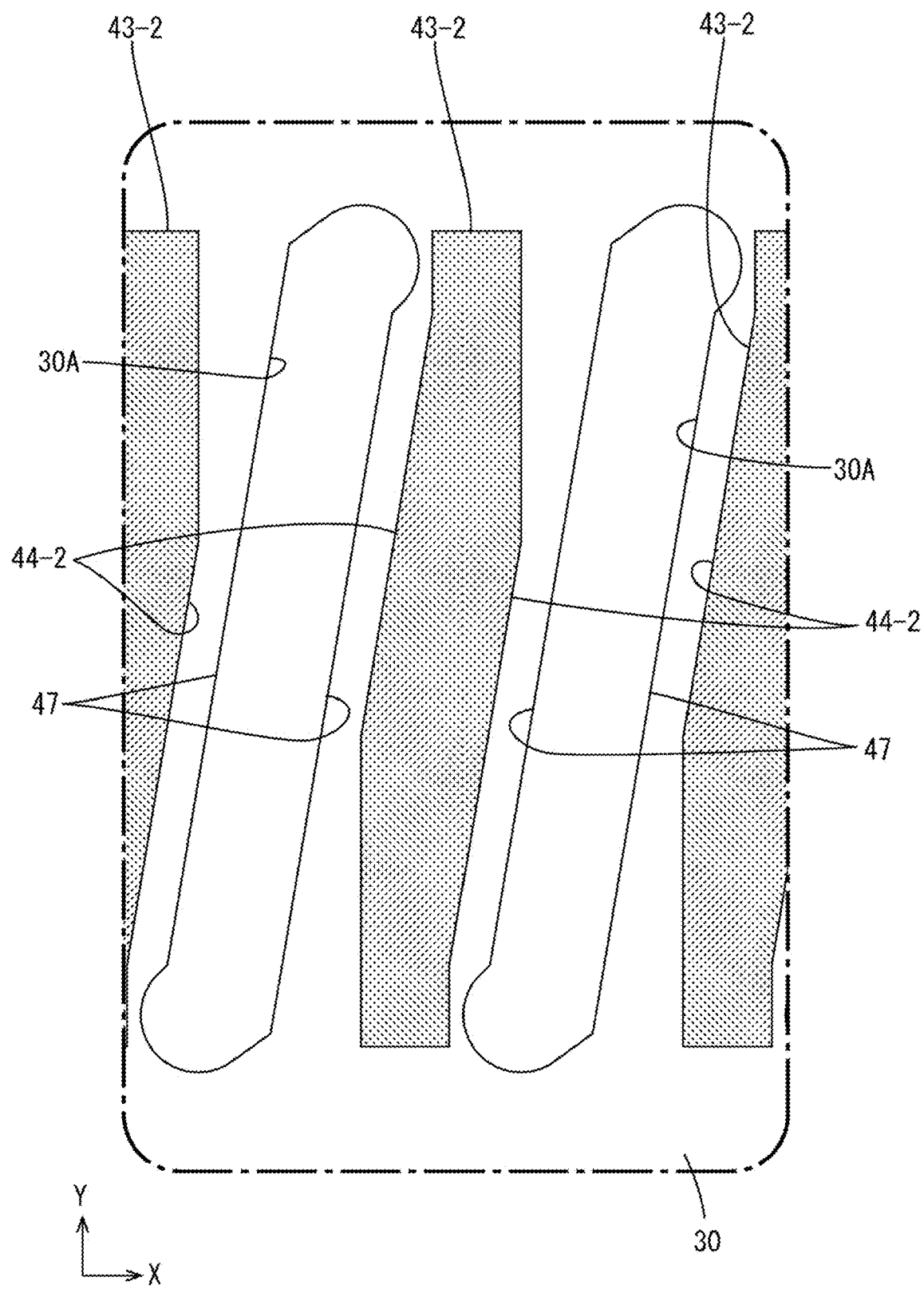
FIG. 20 is a plan view illustrating a relationship between the slit and the light blocking portion at the normal position in a display region of a liquid crystal panel according to Comparative Example 2 of Comparative Experiment 2 according to the first embodiment.
Figure 21:
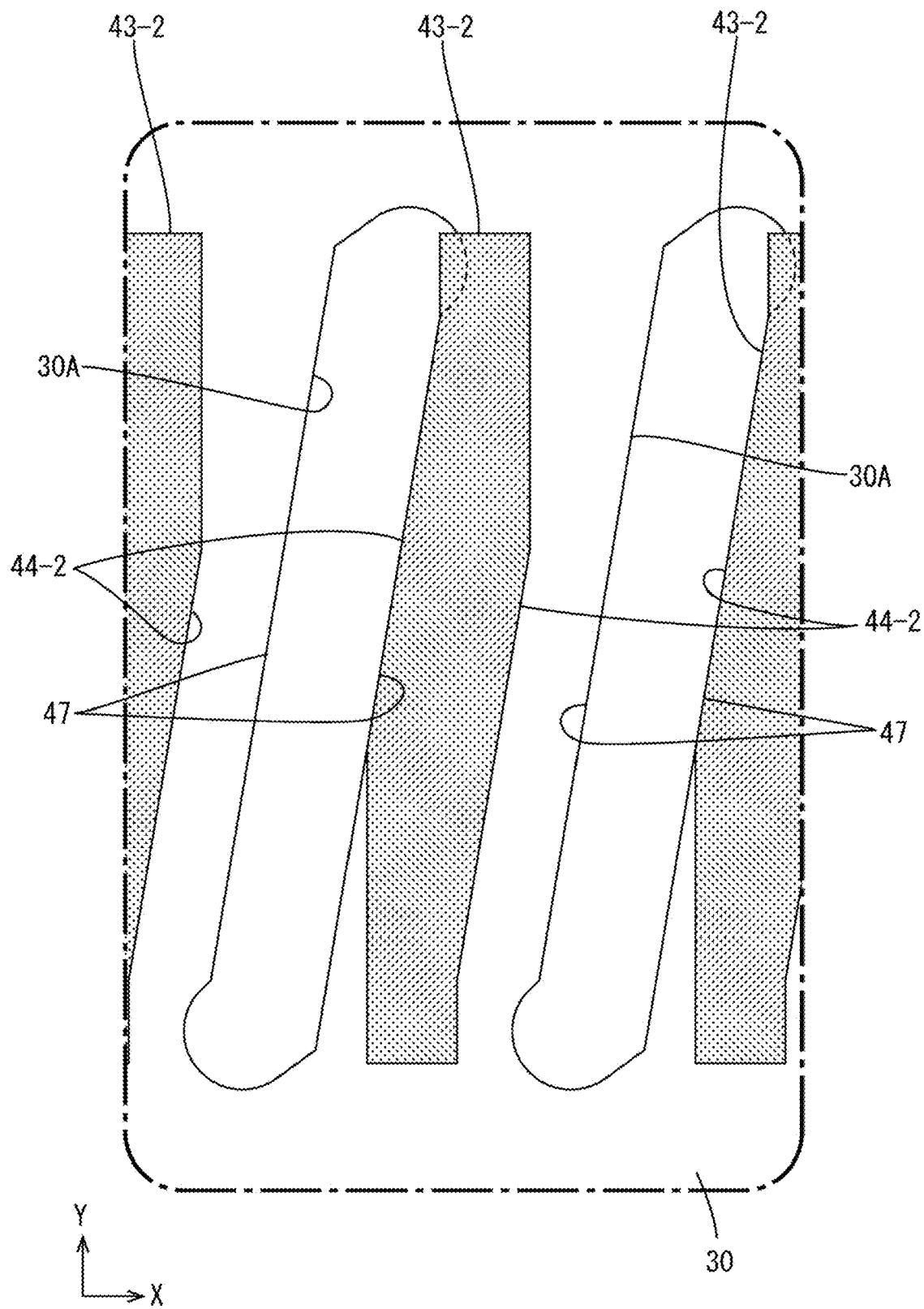
FIG. 21 is a plan view illustrating a relationship between the slit and the light blocking portion maximally displaced toward the left side, in the display region of the liquid crystal panel according to Comparative Example 2 of Comparative Experiment 2 according to the first embodiment.
Figure 22:
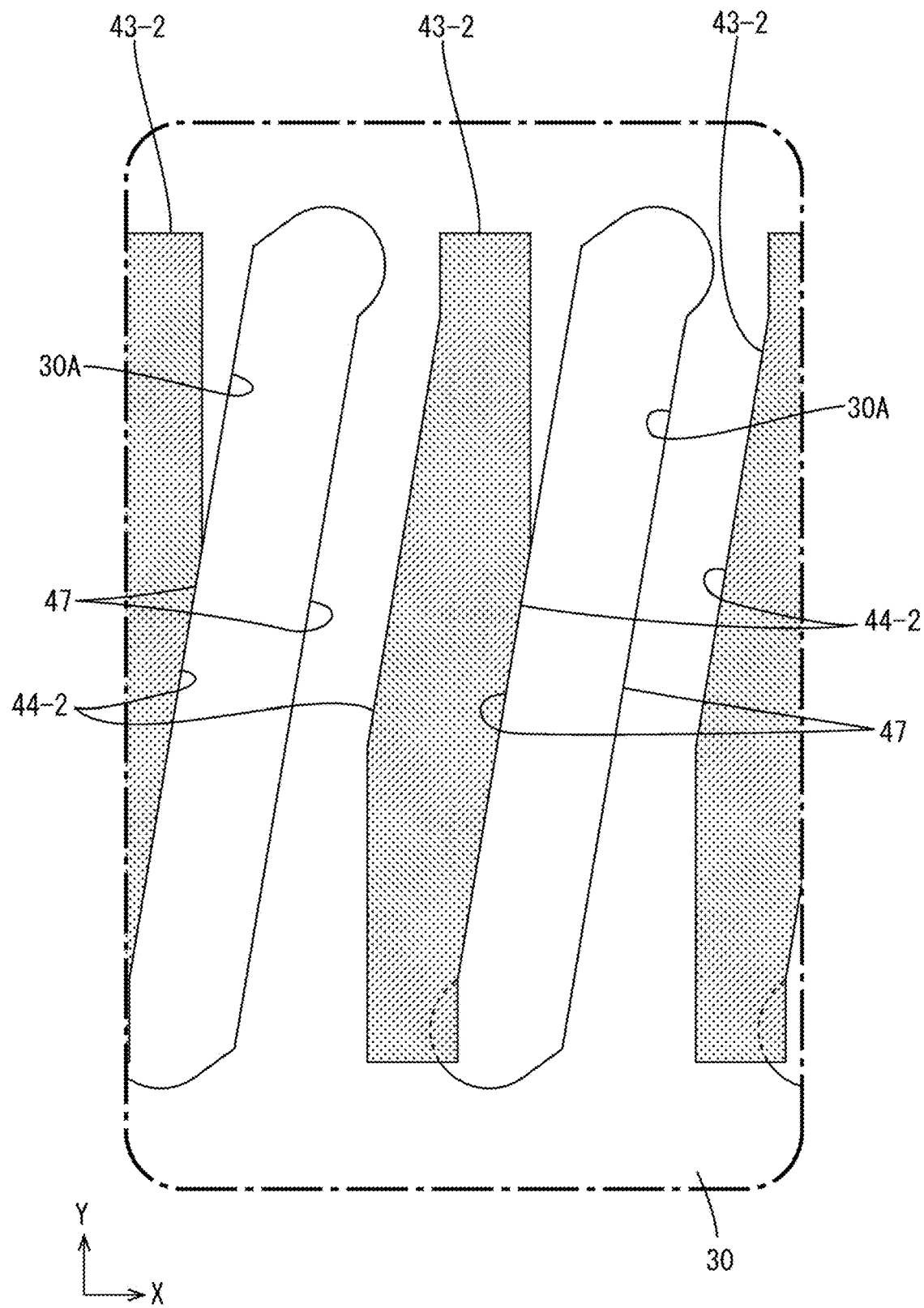
FIG. 22 is a plan view illustrating a relationship between the slit and the light blocking portion maximally displaced toward the right side, in the display region of the liquid crystal panel according to Comparative Example 2 of Comparative Experiment 2 according to the first embodiment.

Next, a description will be given on Comparative Experiment 2. In Comparative Experiment 2, the liquid crystal panel 11 according to Example 1 described in Comparative Experiment 1 and a liquid crystal panel with a light blocking portion 43-2 having an alternative configuration according to Comparative Example 2 were used. The light blocking portion 43-2 in the liquid crystal panel according to Comparative Example 2 is as illustrated in FIG. 20 to FIG. 22. FIG. 20 is a plan view in a case where the light blocking portion 43-2 is located at the normal position with respect to the common electrode 30. FIG. 21 is a plan view in a case where the light blocking portion 43-2 is maximally displaced toward the left side with respect to the common electrode 30. FIG. 22 is a plan view in a case where the light blocking portion 43-2 is maximally displaced toward the right side with respect to the common electrode 30. In FIG. 20 to FIG. 22, the light blocking portion 43-2 is illustrated in a shaded manner. As illustrated in FIG. 20, in the light blocking portion 43-2 according to Comparative Example 2, an end portion 44-2 adjacent to the slit 30A of the common electrode 30 in the X-axis direction extends in parallel with the slit 30A. As illustrated in FIG. 21 and FIG. 22, the light blocking portion 43-2 according to Comparative Example 2 is formed in such a manner that the left and right end portions 44-2 match the edge portion 47 of each slit 30A in plan view, upon being maximally displaced toward each of the left and right sides with respect to the common electrode 30, respectively. Thus, the light blocking portion 43-2 in Comparative Example 2 is designed to not overlap the slits 30A even when being maximally displaced toward each of the left and right sides with respect to the common electrode 30. Thus, the light blocking portion 43-2 in Comparative Example 2 has a smaller area in plan view than the light blocking portion 43 in Example 1. The maximum dimension of the light blocking portion 43-2 in the X-axis direction in Comparative Example 2 is smaller than the maximum dimension of the light blocking portion 43 in the X-axis direction in Example 1. The expected maximum value of the displacement amount of the light blocking portion 43-2 in the X-axis direction in Comparative Example 2 is, for example, about 0.8 μm.

Figure 23:
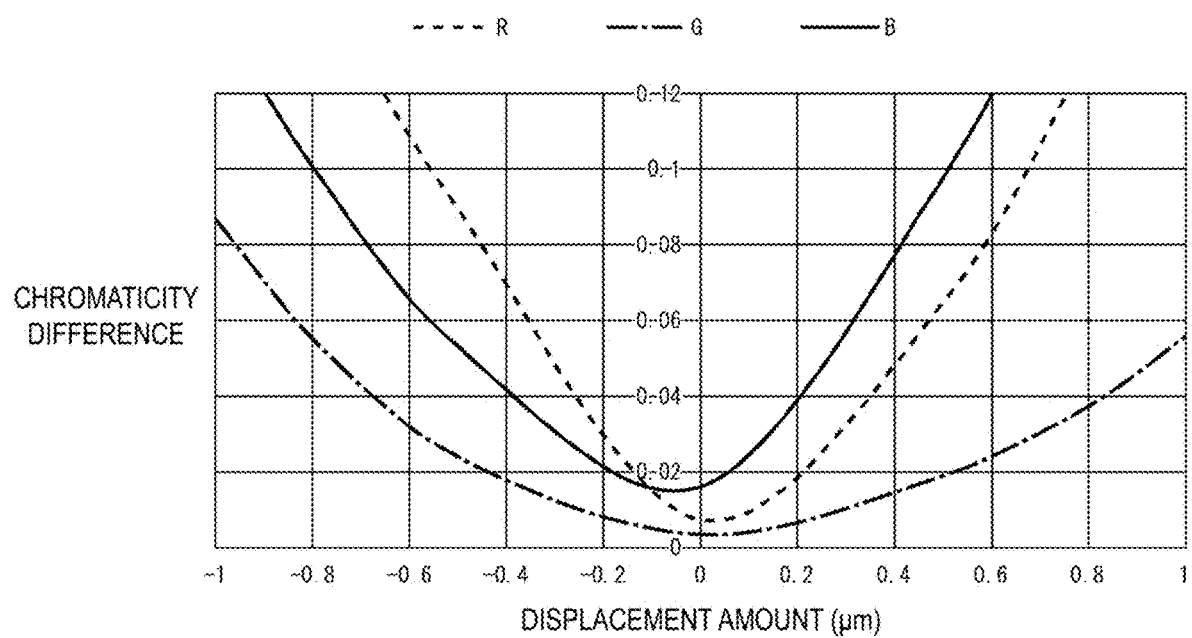
FIG. 23 is a graph illustrating a relationship between a displacement amount of the light blocking portion in the X-axis direction and a chromaticity difference generated in each pixel due to the displacement of the light blocking portion, which is an experimental result of Comparative Example 2 of Comparative Experiment 2 according to the first embodiment.
Figure 24:
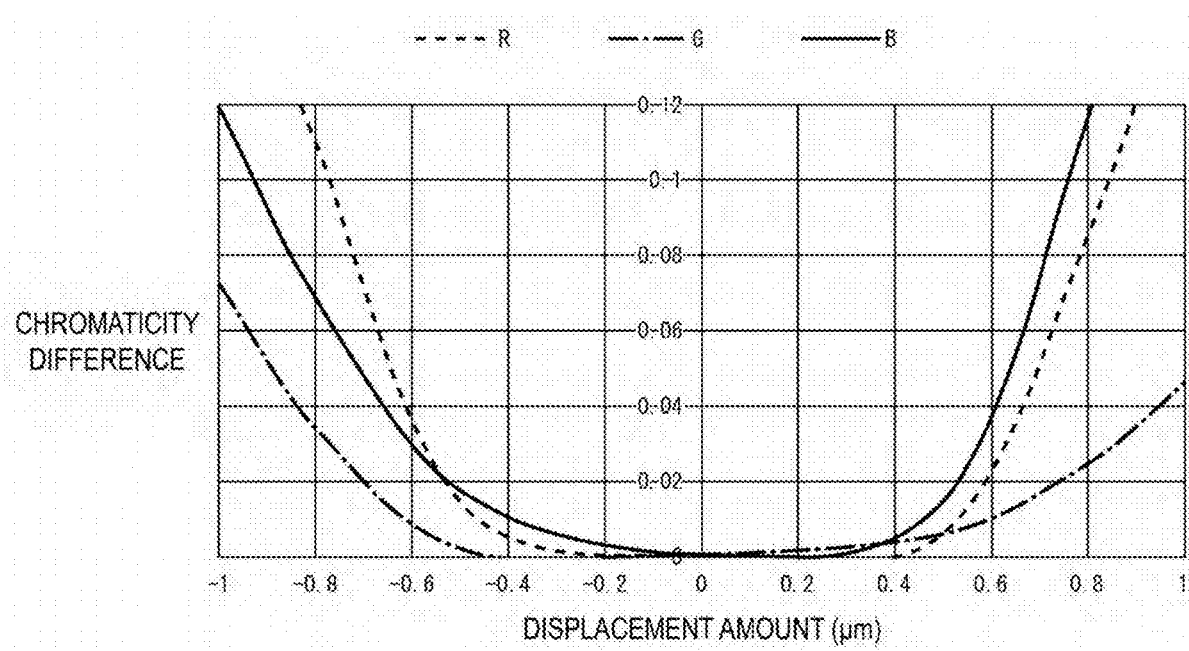
FIG. 24 is a graph illustrating a relationship between a displacement amount of the light blocking portion in the X-axis direction and a chromaticity difference generated in each pixel due to the displacement of the light blocking portion, which is an experimental result of Example 1 of Comparative Experiment 2 according to the first embodiment.

In Comparative Experiment 2, using the liquid crystal panels according to Comparative Example 2 and Example 1, the relationship between the displacement amount of the light blocking portion 43, 43-2 in the X-axis direction and the chromaticity difference generated in each of the pixels GPX, BPX, and RPX due to the displacement of the light blocking portion 43, 43-2 was examined. Specifically, in Comparative Experiment 2, in each of the liquid crystal panels according to Comparative Example 2 and Example 1, the chromaticity of transmitted light was measured with green, blue, and red each displayed monochromatically on the entire screen. The chromaticity of the transmitted light was measured at a position at an angle of 30° toward the right side and at a position at an angle of 30° toward the left side with respect to the front direction of each liquid crystal panel. Thus, the chromaticity of the transmitted light was measured with each liquid crystal panel obliquely viewed at each of angles of ±30° with respect to the front direction. The measurement result is as illustrated in FIGS. 23 and 24. FIG. 23 illustrates the experimental result of Comparative Example 2. FIG. 24 illustrates the experimental result of Example 1. The vertical axis in FIGS. 23 and 24 represents the chromaticity difference of the transmitted light. The chromaticity difference is an amount of change in chromaticity based on the chromaticity measured at a position in the front direction when the light blocking portion 43, 43-2 is not displaced in the X-axis direction. In particular, the chromaticity difference is a Euclidian distance Δu',Δv' that is the amount of change of coordinates u',v' in the u'v' orthogonal coordinates in the International Commission on Illumination (Commission Internationale de l'Eclairage (CIE)) 1976 L*u*v* color space, as in the following Equation (1) defining "Δu'v'".

$$\Delta u'v' = ((\Delta u')^2 + (\Delta v')^2)^{1/2} \quad (1)$$

The horizontal axis of each of FIGS. 23 and 24 represents the displacement amount (in μm) of the light blocking portion 43, 43-2 in the X-axis direction. A positive sign illustrated on the horizontal axis in FIGS. 23 and 24 indicates the displacement toward the right side in FIGS. 8 to 10 and 20 to 22, and a negative sign illustrated on the horizontal axis in FIGS. 23 and 24 indicates the displacement toward the left side in FIGS. 8 to 10 and 20 to 22. Data on the right side with respect to the vertical axis in FIGS. 23 and 24 is data measured at a position at an angle of 30° (+30°) toward the right side with respect to the front direction of each liquid crystal panel according to Comparative Example 2 and Example 1. Data on the left side with respect to the vertical axis in FIGS. 23 and 24 is data measured at a position at an angle of 30° (−30°) toward the left side with respect to the front direction of each liquid crystal panel. The symbol "G" illustrated in the legends of FIGS. 23 and 24 indicates a case of monochrome display of green (maximum gradation display of only the first pixel GPX). The symbol "B" illustrated in the legends of FIGS. 23 and 24 indicates a case of monochrome display of blue (maximum gradation display of only the second pixel BPX). The symbol "R" illustrated in the legends of FIGS. 23 and 24 indicates a case of monochrome display of red (maximum gradation display of only the third pixel RPX).

The experimental result of Comparative Experiment 2 will be described. According to FIG. 23, it can be seen that in Comparative Example 2, only a slight displacement of about ±0.1 μm has led to a large change in chromaticity. In Comparative Example 2, a chromaticity difference occurs even with no displacement (a state where the displacement amount is 0 μm). Thus, it can be said that the light blocking portion 43-2 in Comparative Example 2 cannot sufficiently exhibit the color mixing prevention function. On the other hand, according to FIG. 24, in Example 1, the chromaticity is hardly changed by displacement of about ±0.2 μm, and the change rate of the chromaticity is kept sufficiently low from about ±0.2 μm to about ±0.5 μm. Thus, it can be said that the light blocking portion 43 in Example 1 can sufficiently exhibit the color mixing prevention function.

As described above, the liquid crystal panel (display device) 11 according to the present embodiment includes: the first color filter 29G; the second color filter 29B arranged side by side with the first color filter 29G in the same layer, and exhibiting a color different from a color exhibited by the first color filter 29G; the first pixel electrode 28A disposed on an upper layer side of the first color filter 29G and disposed overlapping the first color filter 29G; the second pixel electrode 28B disposed on the upper layer side of the second color filter 29B and disposed overlapping the second color filter 29B; the common electrode 30 disposed on the upper layer side or a lower layer side of the first pixel electrode 28A and the second pixel electrode 28B and disposed overlapping the first pixel electrode 28A and the second pixel electrode 28B; the eighth insulating film (insulating film) 38 interposed between the first pixel electrode 28A and the second pixel electrode 28B, and the common electrode 30; and the first light blocking portion (light blocking portion) 43A disposed at a boundary between the first color filter 29G and the second color filter 29B, on the upper layer side of the first color filter 29G and the second color filter 29B, wherein among the first pixel electrode 28A, the second pixel electrode 28B, and the common electrode 30, the common electrode (electrode) 30 located on the upper layer side of the eighth insulating film 38 is an upper layer electrode, and a pixel electrode (electrode) 28 located on the lower layer side of the eighth insulating film 38 is a lower layer electrode, an arrangement direction of the first color filter 29G and the second color filter 29B is a first direction, a portion of the common electrode 30 that is the upper layer electrode overlapping the pixel electrode 28 that is the lower layer electrode is provided with the slit 30A extending along a second direction inclined with respect to the first direction, the inclined portion 45 extending along a third direction inclined toward the same side as the second direction with respect to the first direction is included in the end portion 44, of outer peripheral end portions of the first light blocking portion 43A, adjacent to the slit 30A in the first direction, and the second angle θ2 of the inclined portion 45 that is an angle formed by the third direction with respect to the first direction is larger than the first angle θ1 that is an angle formed by the second direction with respect to the first direction.

An image can be displayed by utilizing an electrical field generated between the opening edge of the slit 30A in the common electrode 30 that is the upper layer electrode and the pixel electrode 28 that is the lower layer electrode. The first light blocking portion 43A can block the light traveling toward the second pixel electrode 28B having passed through the first color filter 29G, and the light traveling toward the first pixel electrode 28A having passed through the second color filter 29B. As a result, color mixing is less likely to occur, and thus display by the first pixel electrode 28A and display by the second pixel electrode 28B are each appropriately performed.

When the display device is manufactured, the common electrode 30, which is the upper layer electrode including the slit 30A, and the first light blocking portion 43A may be displaced in the first direction. When part of the first light blocking portion 43A enters the slit 30A due to the displacement, the luminance may be reduced by distortion or the like of the electrical field generated between the common electrode 30 that is the upper layer electrode and the pixel electrode 28 that is the lower layer electrode.

In view of this, the second angle θ2, which is an angle formed between the first direction and the third direction that is the extension direction of the inclined portion 45 included in the end portion 44 of the first light blocking portion 43A, is set to be larger than the first angle θ1, which is an angle formed between the first direction and the second direction that is the extension direction of the slits 30A, so that even when the common electrode 30 that is the upper layer electrode and the first light blocking portion 43A are displaced in the first direction, the end portion 44 of the first light blocking portion 43A can be prevented from entering the slit 30A over the entire length as known. Accordingly, distortion or the like is less likely to occur in the electrical field generated between the common electrode 30 that is the upper layer electrode and the pixel electrode 28 that is the lower layer electrode, and thus a decrease in luminance is less likely to occur. In addition, compared with a case where the second angle is set to be smaller than the first angle θ1, the portion of the first light blocking portion 43A including the inclined portion 45 can be guaranteed to be formed over a wide range in the first direction. Accordingly, the color mixing prevention function can be guaranteed to be provided by the first light blocking portion 43A.

In addition, the inclined portion 45 is disposed so as to intersect the edge portion 47 of the slit 30A of the common electrode 30 that is the upper layer electrode, in plan view. The portion of the first light blocking portion 43A including the inclined portion 45 can be guaranteed to be formed over a wide range in the first direction, compared with a hypothetical case where the inclined portion does not intersect with the edge portion 47 of the slit 30A of the common electrode 30 that is the upper layer electrode in plan view. Accordingly, the color mixing prevention function can be guaranteed to be provided by the first light blocking portion 43A.

The end portion 44 of the first light blocking portion 43A includes the straight portion (third angle portion) 46 forming the third angle θ3, larger than the second angle θ2, with respect to the first direction. The inclined portion 45 is provided in such a manner that the boundary BO with the straight portion 46 matches the intersection between the edge portion 47 of the slit 30A and the end portion 44, as a result of the expected maximum displacement of the common electrode 30 that is the upper layer electrode and the first light blocking portion 43A in the first direction. The maximum expected displacement of the common electrode 30 that is the upper layer electrode and the first light blocking portion 43A in the first direction that may occur leads to a smaller area of the first light blocking portion 43A overlapping the slit 30A, compared with the case where the boundary between the inclined portion 45 and the straight portion 46 is located in the slit 30A. Thus, the luminance is less likely to be reduced. The maximum expected displacement of the common electrode 30 that is the upper layer electrode and the first light blocking portion 43A in the first direction that may occur leads to a large area of the first light blocking portion 43A, compared with the case where the boundary between the inclined portion 45 and the straight portion 46 is located outside the slit 30A. Thus, a high color mixing prevention function is provided by the first light blocking portion 43A.

The inclined portion 45 is provided with the second angle θ2 being in a range having an upper limit value of 87° and a lower limit value that is larger than the first angle θ1 by 3°. Specifically, for example, when the first angle θ1 is 80°, the inclined portion 45 is provided with the second angle θ2 being in a range of 83° to 87°. With the upper limit value of the numerical value range including the second angle θ2 being 87°, the alignment angle of the liquid crystal molecules can be more easily maintained in a case where the alignment state of the liquid crystal molecules is controlled using the electrical field generated between the common electrode 30 that is the upper layer electrode and the pixel electrode 28 that is the lower layer electrode for example, compared with a hypothetical case where the upper limit value exceeds 87°. Thus, the display quality can be maintained at a good level. With the lower limit value of the numerical value range including the second angle θ2 being "first angle θ1+3°", the color mixing prevention function can be more easily provided by the first light blocking portion 43A, compared with a hypothetical case where the lower limit value is smaller than "first angle θ1+3°".

The slit 30A includes the first slit 30A1 overlapping the first color filter 29G and the second slit 30A2 overlapping the second color filter 29B, the outer peripheral end portion of the first light blocking portion 43A includes the first end portion 44A adjacent to the first slit 30A1 in the first direction and the second end portion 44B adjacent to the second slit 30A2 in the first direction, and the inclined portion 45 includes the first inclined portion 45A included in the first end portion 44A and the second inclined portion 45B included in the second end portion 44B. The displacement between the common electrode 30 that is the upper layer electrode and the first light blocking portion 43A in the first direction may include the following two cases: a case in which the first end portions 43A of the first light blocking portion 44A move toward the first slit 30A1 and the second end portion 44B move away from the second slit 30A2; and a case in which the second end portion 44B of the first light blocking portion 43A move toward the second slit 30A2 and the first end portion 44A move away from the first slit 30A1. In the former case, since the first end portion 44A includes the first inclined portion 45A, the entrance of the first end portion 44A of the first light blocking portion 43A into the slit 30A over the entire length is avoided. In the latter case, since the second end portion 44B includes the second inclined portion 45B, the entrance of the second end portion 44B of the first light blocking portion 43A into the slit 30A over the entire length is avoided. As described above, in any case, the entrance of the end portion 44 of the first light blocking portion 43A into the slit 30A over the entire length is avoided, thus a decrease in luminance due to the entrance is less likely to occur.

The first light blocking portion 43A is disposed on the upper layer side of the common electrode 30 that is the upper layer electrode. With this configuration, as compared with the case where the first light blocking portion 43A is disposed on the lower layer side of the common electrode 30 that is the upper layer electrode, the light blocking film included in the first light blocking portion 43A can block more light that may otherwise travel between the first color filter 29G and the second color filter 29B. As a result, color mixing is even less likely to occur, and thus display by the first pixel electrode 28A and display by the second pixel electrode 28B are each more appropriately performed.

The upper layer electrode is the common electrode 30, and the first light blocking portion 43A is directly layered on the common electrode 30. When the first light blocking portion 43A has conductivity, the first light blocking portion 43A have the same potential as the common electrode 30. Thus, when the common electrode 30 and the first light blocking portion 43A are displaced in the first direction and the first light blocking portion 43A enters the slit 30A, the electrical field generated between the common electrode 30 and each pixel electrode 28 might be more largely affected. In this regard, even when the common electrode 30 and the first light blocking portion 43A are displaced in the first direction, the first light blocking portion 43A is prevented from entering the slit 30A of the common electrode 30 over the entire length. Thus, the influence on the electrical field can be sufficiently suppressed. Thus, reduction in luminance can be effectively prevented.

Second Embodiment

A second embodiment will be described with reference to FIGS. 25 to 31. In this second embodiment, an alternative configuration with a light blocking portion 143 will be described. Further, repetitive descriptions of structures, actions, and effects similar to those of the first embodiment described above will be omitted.

Figure 25:
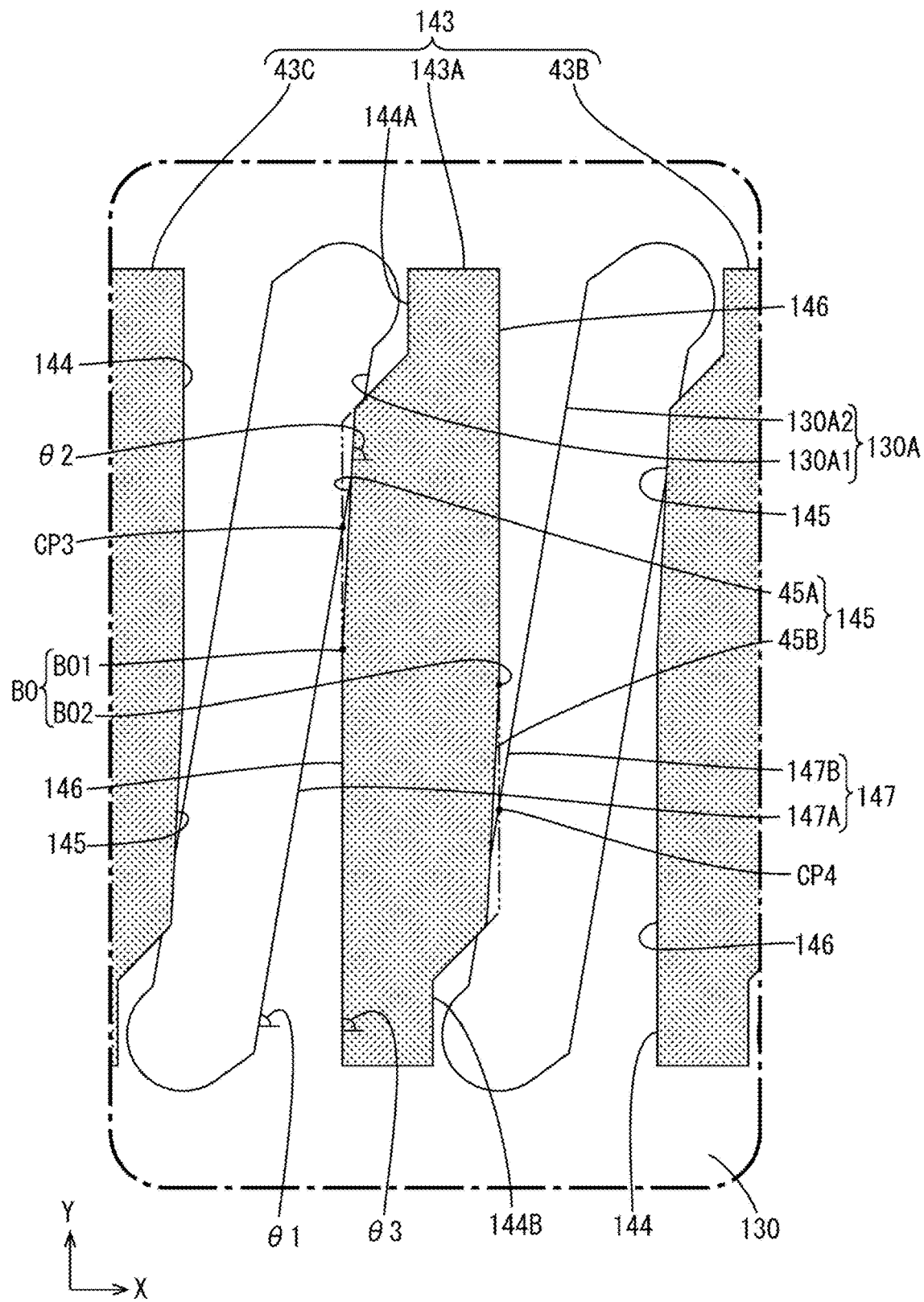
FIG. 25 is a plan view illustrating a relationship between a slit and a light blocking portion at a normal position in a display region of a liquid crystal panel according to a second embodiment.
Figure 26:
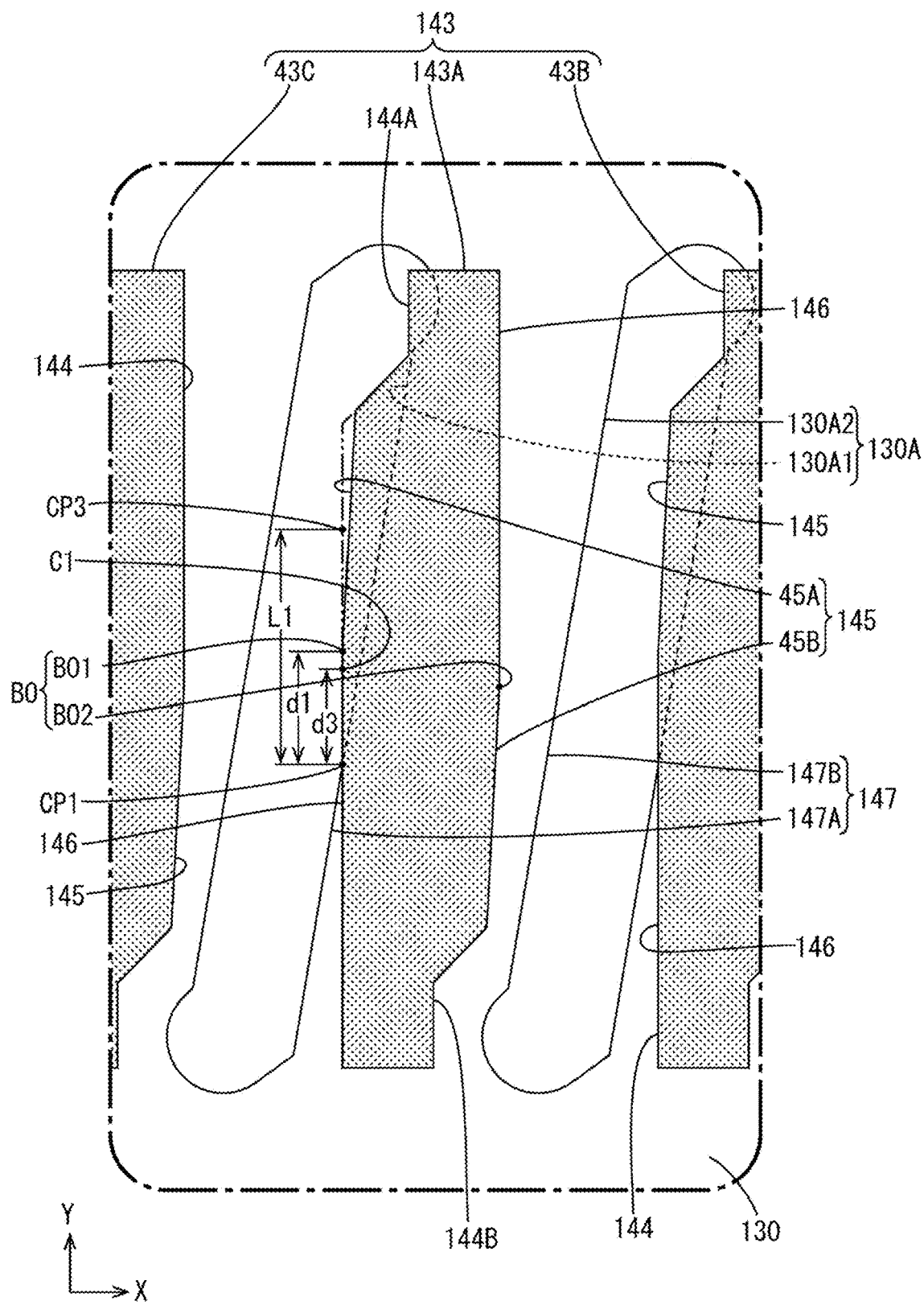
FIG. 26 is a plan view illustrating a relationship between the slit and the light blocking portion maximally displaced toward the left side, in the display region of the liquid crystal panel according to the second embodiment.
Figure 27:
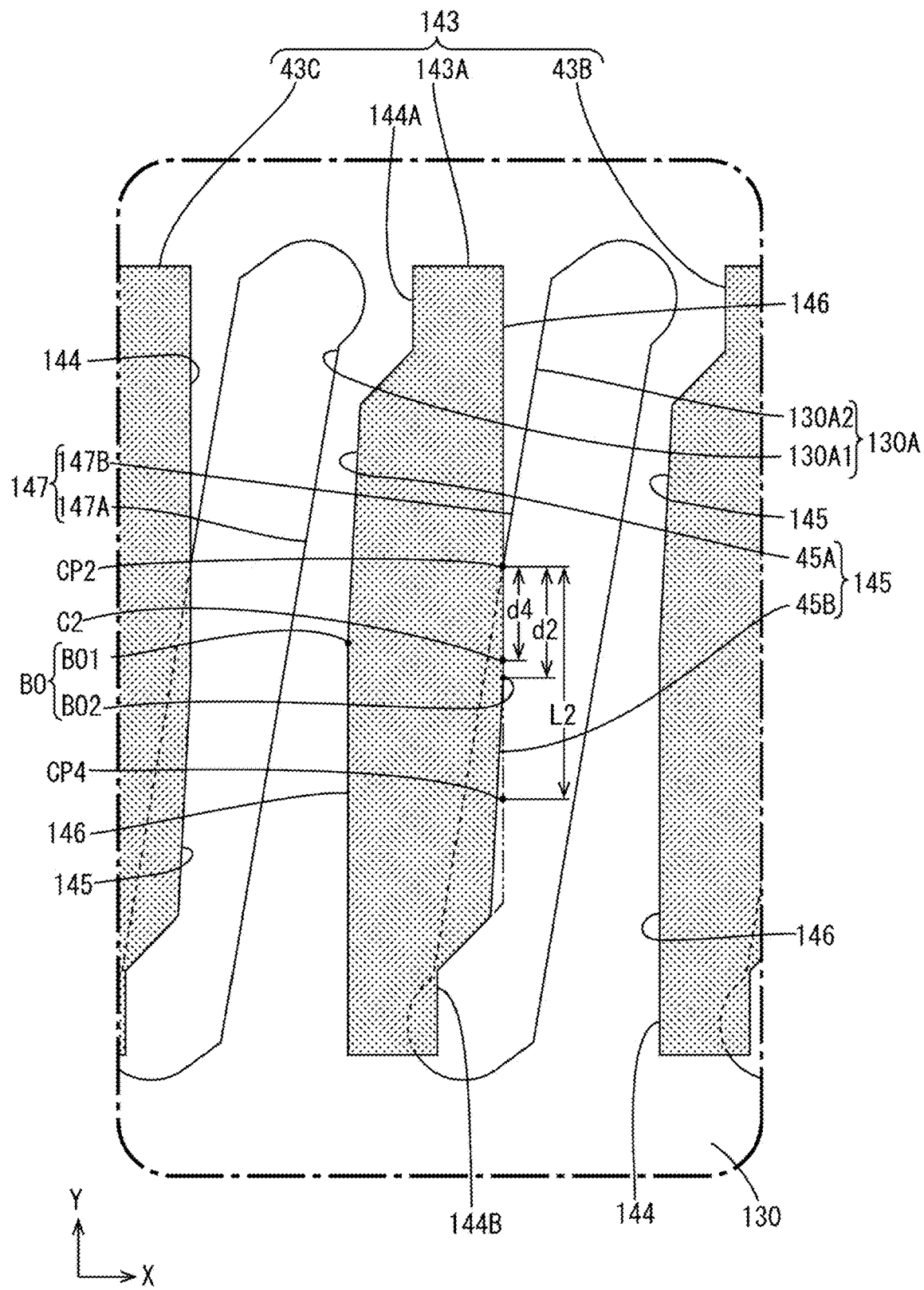
FIG. 27 is a plan view illustrating a relationship between the slit and the light blocking portion maximally displaced toward the right side, in the display region of the liquid crystal panel according to the second embodiment.

In the light blocking portion 143 according to the present embodiment, as illustrated in FIG. 25, the ratio of the length of an inclined portion 145 to the length of an end portion 144 is lower than that of the inclined portion 45 according to the first embodiment described above. Therefore, in the present embodiment, the ratio of the length of a straight portion 146 to the length of the end portion 144 is higher than that of the straight portion 46 according to the first embodiment described above. As illustrated in FIGS. 26 and 27, the light blocking portion 143 is provided in such a manner that the maximum displacement thereof toward each of the left and right sides in the X-axis direction from the normal position (position illustrated in FIG. 25) with respect to a common electrode 130 results in the boundary BO between the inclined portion 145 and the straight portion 146 included in the end portion 144 being located in a slit 130A. The maximum displacement of the light blocking portion 143 toward each of the left and right sides in the X-axis direction results in the straight portion 146 intersecting an edge portion 147 of the slit 130A. Intersections CP1 and CP2 between the straight portions 146 and the edge portions 147A and 147B of the slits 130A1 and 130A2 are located in the slits 130A1 and 130A2. With this configuration, the maximum expected displacement of the common electrode 130 and the first light blocking portion 143 in the X-axis direction that may occur leads to a large area of a first light blocking portion 143A, compared with the case where the boundary between the inclined portion 145 and the straight portion 146 is located outside the slit 130A and the case where the boundary matches the intersection CP1, CP2 between the edge portion 147 of the slit 130A and the end portion 144. Thus, a high color mixing prevention function is provided by the first light blocking portion 143.

The design of the boundary BO at the end portion 144 of the inclined portion 145 will be described in detail. In order to describe the design, in FIGS. 25 to 27, the configuration according to Comparative Example 1 described in Comparative Experiment 1 is added using a two-dot chain line, and a reference numeral "44-1" of an end portion is added. As illustrated in FIG. 25, intersections at which the end portions 44-1 intersect edge portions 147A and 147B of the slits 130A1 and 130A2 in a state where the light blocking portion 143 is at the normal position with respect to the common electrode 130 are referred to as "third intersection CP3" and "fourth intersection CP4". Next, as illustrated in FIG. 26, L1 denotes a distance in the Y-axis direction from the first intersection CP1 between the straight portion 146 and the first edge portion 147A of the first slit 130A1 to the third intersection CP3 in the Y-axis direction, in a state where the light blocking portion 143 is maximally displaced toward the left side in the X-axis direction with respect to the common electrode 130. A distance d1 in the Y-axis direction from the first boundary BO1 at a first end portion 144A of the inclined portion 145 to the first intersection CP1 in the Y-axis direction matches "L1/2". Similarly, as illustrated in FIG. 27, L2 denotes a distance in the Y-axis direction from the second intersection CP2 between the straight portion 146 and the second edge portion 147B of the second slit 130A2 to the fourth intersection CP4 in the Y-axis direction, in a state where the light blocking portion 143 is maximally displaced toward the left side in the X-axis direction with respect to the common electrode 130. A distance d2 in the Y-axis direction from the second boundary BO2 at a second end portion 144B of the inclined portion 145 to the second intersection CP2 in the Y-axis direction matches "L2/2".

As described above, the inclined portion 145 according to the present embodiment is designed in such a manner that as illustrated in FIG. 26, the expected leftward maximum displacement of the common electrode 130 and the light blocking portion 143 in the X-axis direction results in the distance d1 between the first boundary BO1 and the first intersection CP1 between the first edge portion 147A of the first slit 130A1 and the first end portion 144A being longer than a distance d3 between a center position C1 of the first end portion 144A in a length direction and the first intersection CPL. With this configuration, the inclined portion 145 is formed in a wider range compared with a case where the distance between the first intersection CP1 and the first boundary BO1 is equal to or shorter than the distance d3 between the center position C1 and the first intersection CP1. As a result, the area of the light blocking portion 143 overlapping the slit 130A is kept small, whereby the luminance is less likely to decrease. Similarly, the inclined portion 145 is designed in such a manner that as illustrated in FIG. 27, the expected rightward maximum displacement of the common electrode 130 and the light blocking portion 143 in the X-axis direction results in the distance d2 between the second boundary BO2 and the second intersection CP2 between the second edge portion 147B of the second slit 130A2 and the second end portion 144B being longer than a distance d4 between a center position C2 of the second end portion 144B in a length direction and the second intersection CP2. With this configuration, the inclined portion 145 is formed in a wider range compared with a case where the distance between the second intersection CP2 and the second boundary BO2 is equal to or shorter than the distance d4 between the center position C2 and the second intersection CP2. As a result, the area of the light blocking portion 143 overlapping the slit 130A is kept small, whereby the luminance is less likely to decrease.

Figure 28:
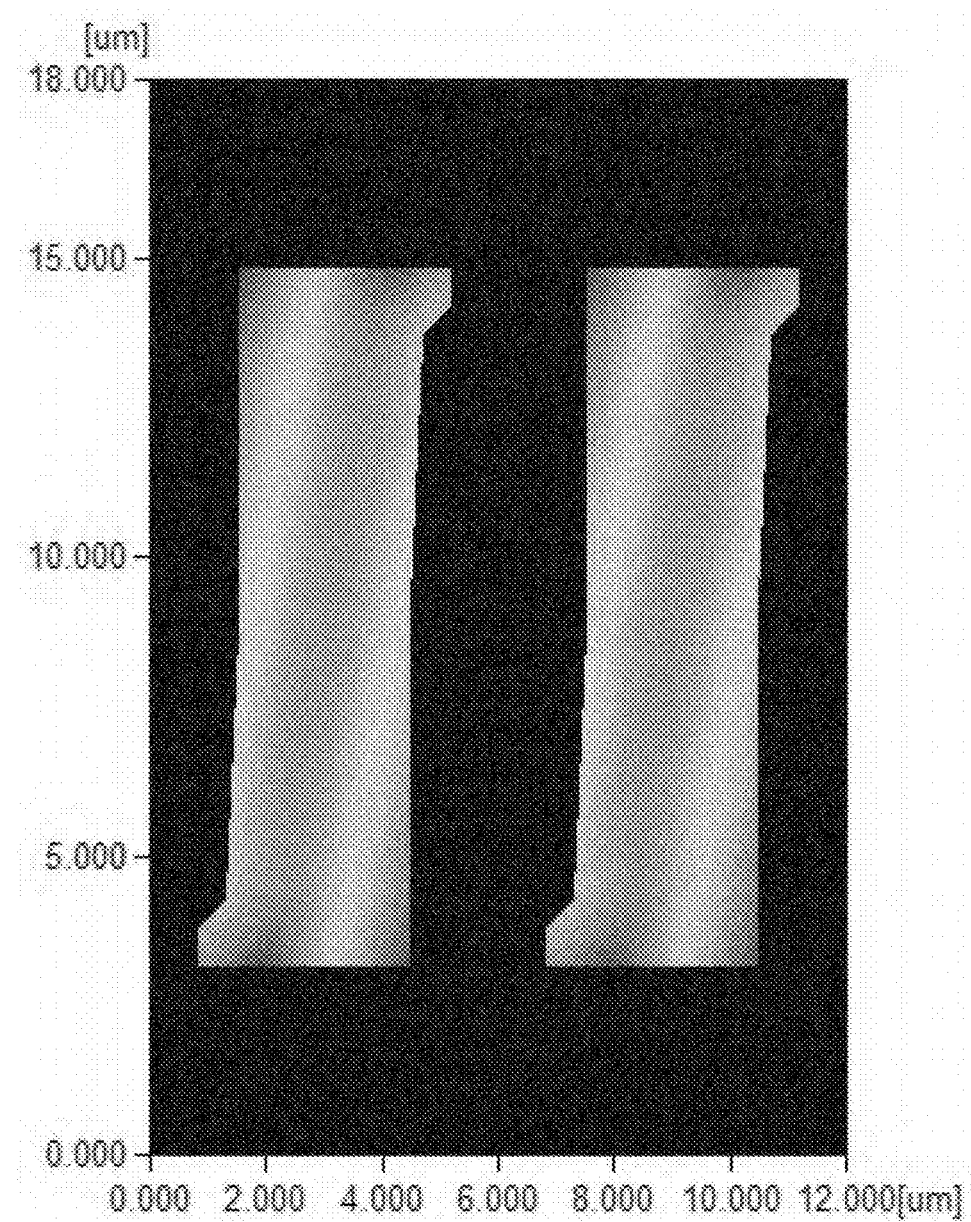
FIG. 28 is a diagram illustrating a transmittance distribution in a case where the light blocking portion is at the normal position, which is an experimental result of Example 2 of Comparative Experiment 3 according to the second embodiment.
Figure 29:
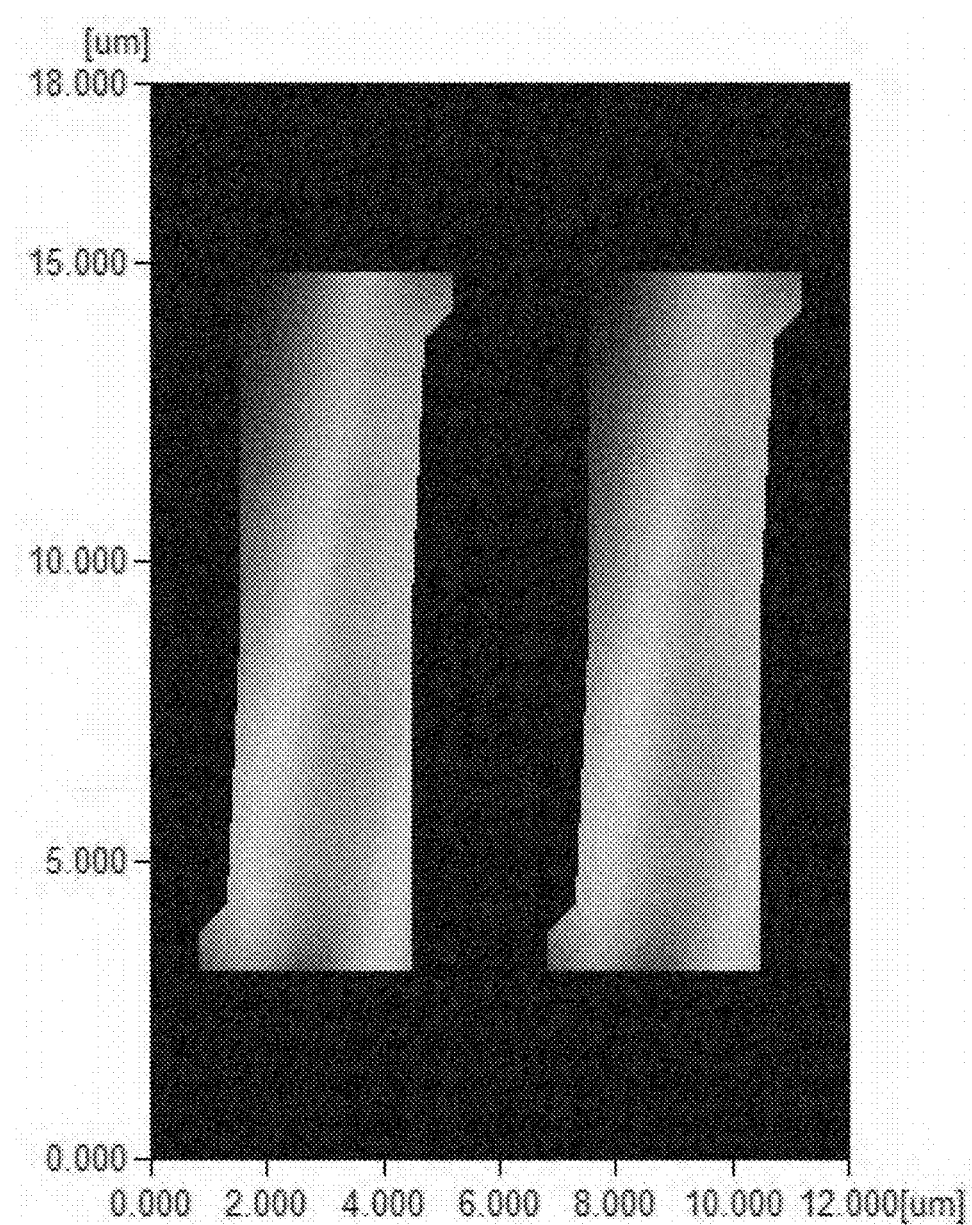
FIG. 29 is a diagram illustrating a transmittance distribution in a case where the light blocking portion is maximally displaced toward the left side, which is an experimental result of Example 2 of Comparative Experiment 3 according to the second embodiment.
Figure 30:
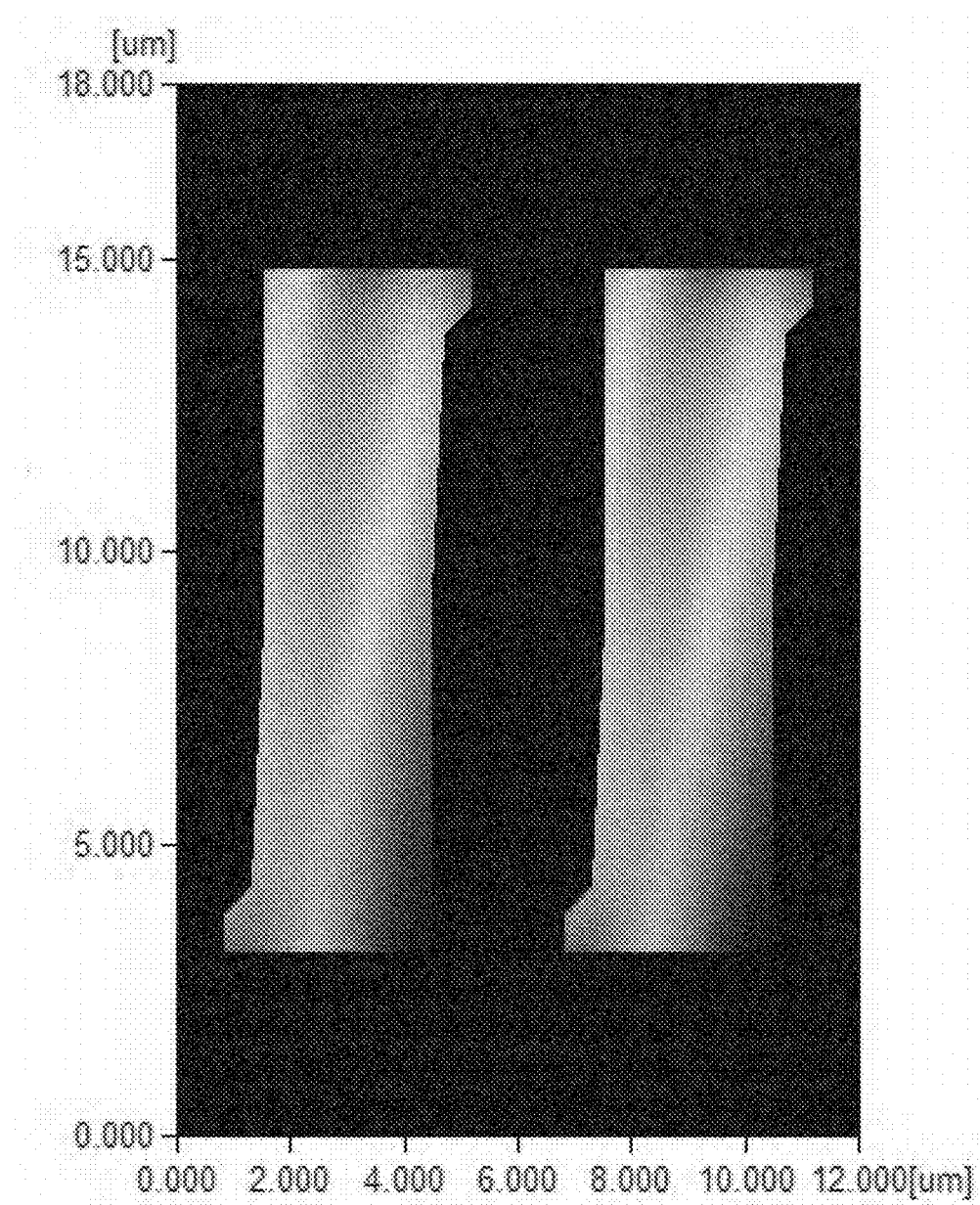
FIG. 30 is a diagram illustrating a transmittance distribution in a case where the light blocking portion is maximally displaced toward the right side, which is an experimental result of Example 2 of Comparative Experiment 3 according to the second embodiment.

Subsequently, in order to validate an advantage of the liquid crystal panel according to the present embodiment, the following Comparative Experiments 3 and 4 were performed. First of all, a description will be given on Comparative Experiment 3. Comparative Experiment 3 is similar to Comparative Experiment 1 described in the first embodiment, and the liquid crystal panel having the configuration described in the paragraph preceding Comparative Experiment 3 is used as Example 2 (see FIGS. 25 to 27). The experimental method in Comparative Experiment 3 is as described in Comparative Experiment 1. The experimental result is as illustrated in FIG. 28 to FIG. 30. FIG. 28 illustrates a transmittance distribution under the condition that the light blocking portion 143 is not displaced with respect to the common electrode 130. FIG. 29 illustrates a transmittance distribution under the condition that the light blocking portion 143 is maximally displaced toward the left side with respect to the common electrode 130. FIG. 30 illustrates a transmittance distribution under the condition that the light blocking portion 143 is maximally displaced toward the right side with respect to the common electrode 130. The transmittance distributions illustrated in FIGS. 28 to 30 are similar to the transmittance distributions illustrated in FIGS. 14 to 19.

The experimental results of Comparative Experiment 3 will be described. In Example 2, when the light blocking portion 143 is maximally displaced toward the left side in the X-axis direction with respect to the common electrode 130, as illustrated in FIG. 29, while a decrease in luminance occurs near the upper left corner portions of the pixels GPX, BPX, and RPX, the decrease is hardly visually recognized as a dark line. In Example 2, when the light blocking portion 143 is maximally displaced toward the right side in the X-axis direction with respect to the common electrode 130, as illustrated in FIG. 30, while a decrease in luminance occurs near the lower right corner portions of the pixels GPX, BPX, and RPX, the decrease is hardly visually recognized as a dark line. As described above, according to FIGS. 28 to 30, in Example 2, the decrease in luminance is suppressed to a degree equivalent to that in Example 1 (FIGS. 17 to 19) of Comparative Experiment 1 described in the first embodiment, and the dark line is sufficiently less likely to be visually recognized.

Figure 31:
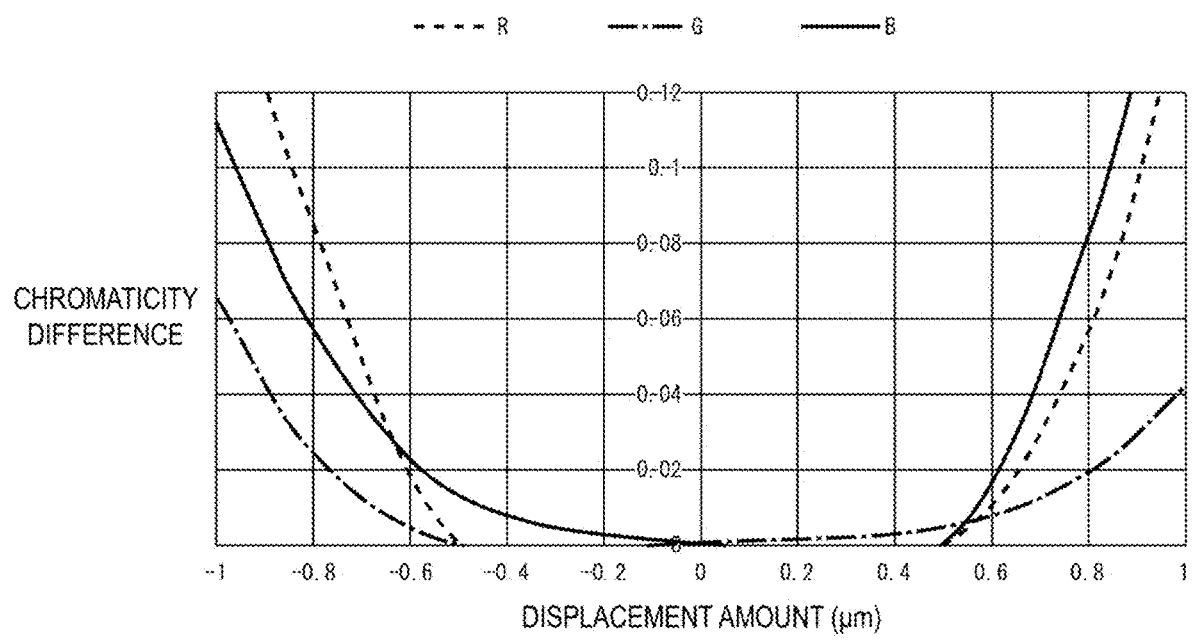
FIG. 31 is a graph illustrating a relationship between a displacement amount of the light blocking portion in the X-axis direction and a chromaticity difference generated in each pixel due to the displacement of the light blocking portion, which is an experimental result of Example 2 of Comparative Experiment 4 according to the second embodiment.

Next, a description will be given on Comparative Experiment 4. In Comparative Experiment 4, using the liquid crystal panel according to Example 2 described in Comparative Experiment 3 described above, the relationship between the displacement amount of the light blocking portion 143 in the X-axis direction and the chromaticity difference generated in each of the pixels GPX, BPX, and RPX due to the displacement of the light blocking portion 143 was examined, as in Comparative Experiment 2 described in the first embodiment described above. The experimental method in Comparative Experiment 4 is as described in Comparative Experiment 2. The experimental result is as illustrated in FIG. 31. The graph illustrated in FIG. 31 is similar to the graphs illustrated in FIGS. 23 and 24.

The experimental results of Comparative Experiment 4 will be described. According to FIG. 31, in Example 2, the chromaticity is hardly changed by displacement of about ±0.3 μm, and the change rate of the chromaticity is kept sufficiently low from about ±0.3 μm to about ±0.6 μm. Thus, it can be said that the light blocking portion 143 in Example 2 can sufficiently exhibit the color mixing prevention function. Comparison between Example 2 and Example 1 (FIG. 24) of Comparative Experiment 2 described in the first embodiment described above indicates that the chromaticity difference is suppressed to be even smaller. Thus, it can be said that a higher color mixing prevention function can be provided in Example 2, compared with that provided in Example 1.

As described above in the present embodiment, the end portion 144 of the first light blocking portion 143A includes the straight portion 146 forming the third angle θ3, larger than the second angle θ2, with respect to the first direction. The inclined portion 145 is provided in such a manner that the boundary BO with the straight portion 146 is located in the slit 130A, as a result of the expected maximum displacement of the common electrode 130 that is the upper layer electrode and the first light blocking portion 143A in the first direction. The maximum expected displacement of the common electrode 130 that is the upper layer electrode and the first light blocking portion 143A in the first direction that may occur leads to a large area of a first light blocking portion 143A, compared with the case where the boundary between the inclined portion 145 and the straight portion 146 is located outside the slit 130A and the case where the boundary matches the intersection between the edge portion 147 of the slit 130A and the end portion 144. Thus, a high color mixing prevention function is provided by the first light blocking portion 143A.

The inclined portion 145 is designed in such a manner that the expected maximum displacement of the common electrode 130 that is the upper layer electrode and the first light blocking portion 143A in the first direction results in the distance d1, d2 between the boundary BO1, BO2 and the intersection CP1, CP2 between the edge portion 147 of the slit 130A and the end portion 144 being longer than the distance d3, d4 between the center position C1, C2 of the end portion 144 in a length direction and the intersection CP1, CP2. The inclined portion 145 is formed in a wider range compared with a case where the distance between the intersection CP1, CP2 and the boundary BO1, BO2 is equal to or shorter than the distance d3, d4 between the center position C1, C2 and the intersection CP1, CP2. As a result, the area of the first light blocking portion 143A overlapping the slit 130A is kept small, whereby the luminance is less likely to decrease.

Third Embodiment

A third embodiment will be described with reference to FIGS. 32 to 38. This third embodiment illustrates a case with a light blocking portion 243 with a configuration changed from that in the second embodiment described above. Further, repetitive descriptions of structures, actions, and effects similar to those of the second embodiment described above will be omitted.

Figure 32:
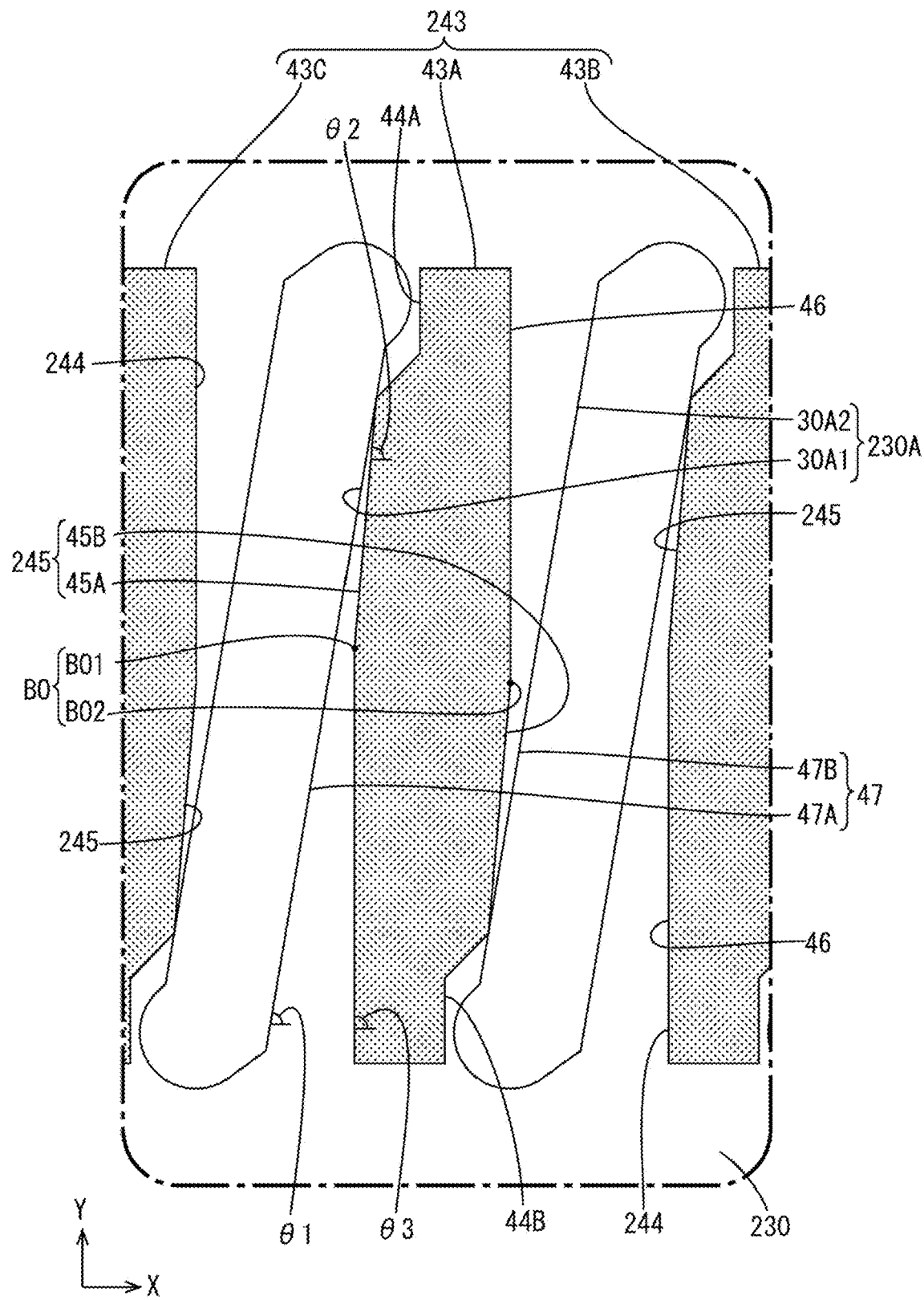
FIG. 32 is a plan view illustrating a relationship between a slit and a light blocking portion at a normal position in a display region of a liquid crystal panel according to a third embodiment.
Figure 33:
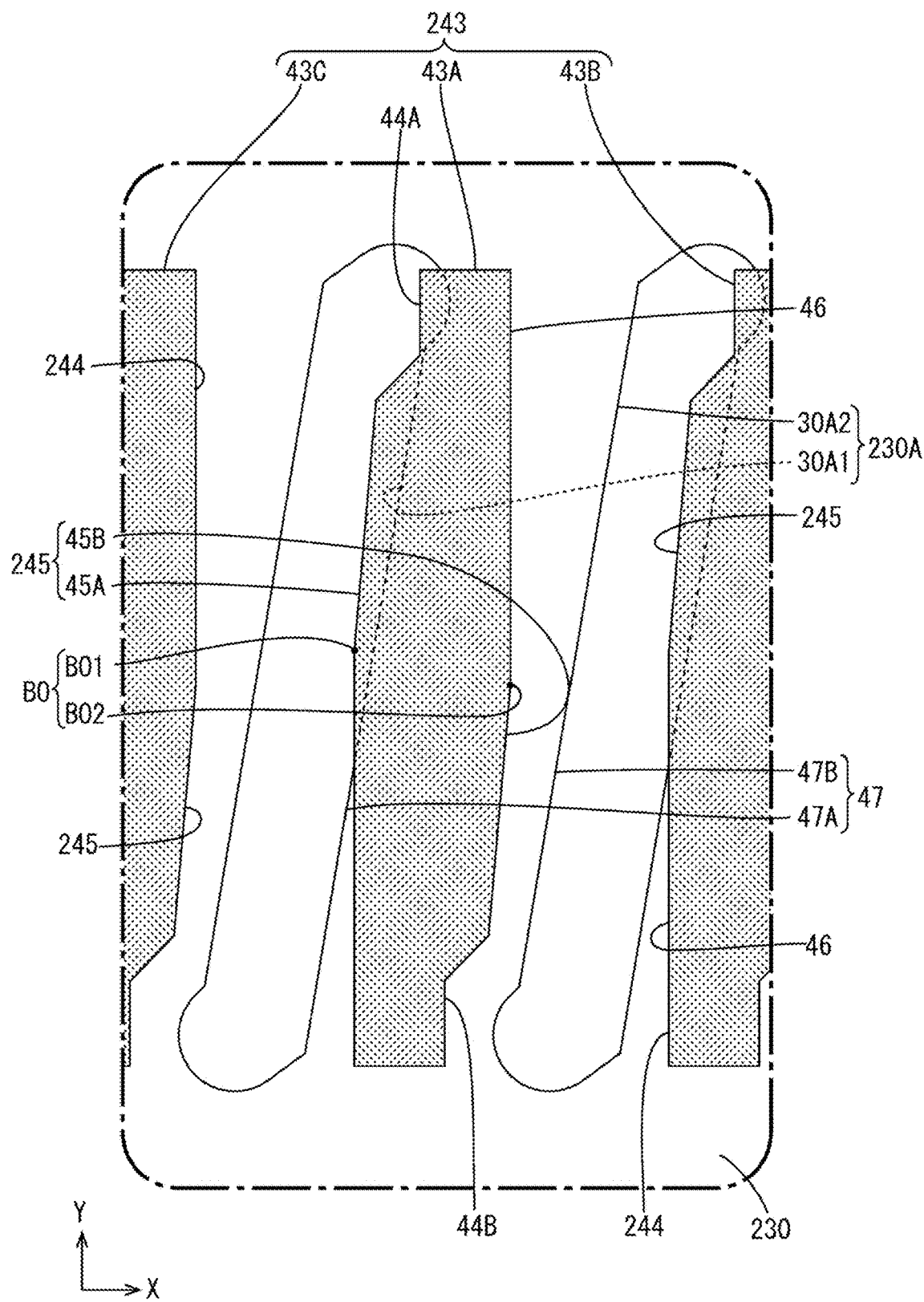
FIG. 33 is a plan view illustrating a relationship between the slit and the light blocking portion maximally displaced toward the left side, in the display region of the liquid crystal panel according to the third embodiment.
Figure 34:
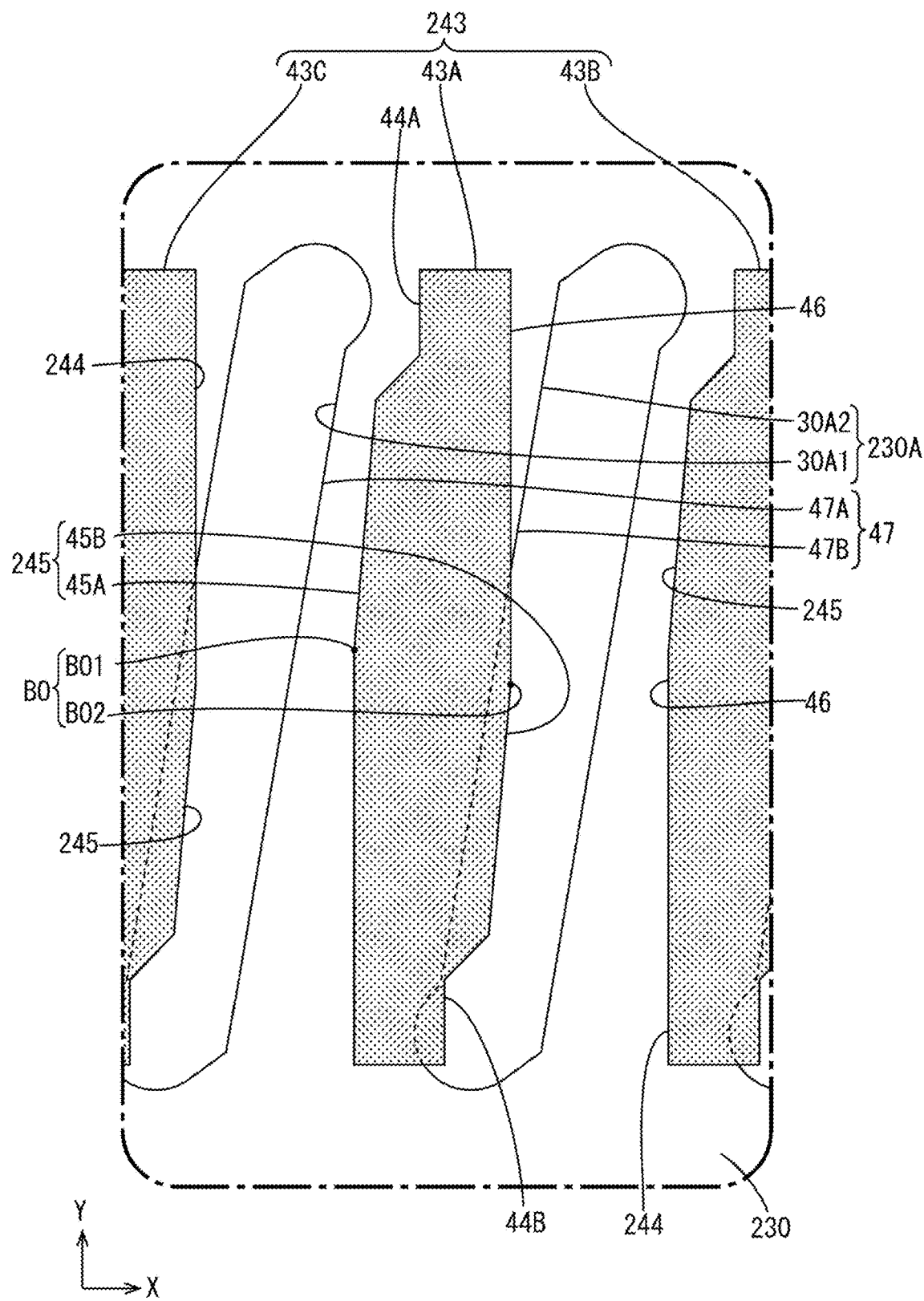
FIG. 34 is a plan view illustrating a relationship between the slit and the light blocking portion maximally displaced toward the right side, in the display region of the liquid crystal panel according to the third embodiment.

As illustrated in FIG. 32, an inclined portion 245 included in an end portion 244 of the light blocking portion 243 according to the present embodiment is inclined at an angle of, for example, 85° with respect to the X-axis direction and at an angle of, for example, 5° with respect to the Y-axis direction. In other words, the inclined portion 245 according to the present embodiment has the second angle θ2 being, for example, 85°, which is larger than 80° as the first angle θ1, but is smaller than 87° as the second angle θ2 of the inclined portions 45 and 145 according to the first and the second embodiments. The maximum dimension of the light blocking portion 243 of the present embodiment in the X-axis direction is the same as the maximum dimension of the light blocking portion 143, described in the second embodiment, in the X-axis direction. Therefore, the area of the light blocking portion 243 according to the present embodiment is smaller than the area of the light blocking portion 143 described in the second embodiment. As illustrated in FIGS. 33 and 34, the area of the light blocking portion 243 overlapping a slit 230A as a result of the leftward or rightward maximum displacement of the light blocking portion 243 in the X-axis direction with respect to a common electrode 230 is smaller than that of the light blocking portion 143 described in the second embodiment (see FIG. 26 and FIG. 27). Therefore, according to the present embodiment, it is possible to further suppress a decrease in luminance that may occur due to the displacement of the light blocking portion 243 in the X-axis direction, compared with the second embodiment.

Figure 35:
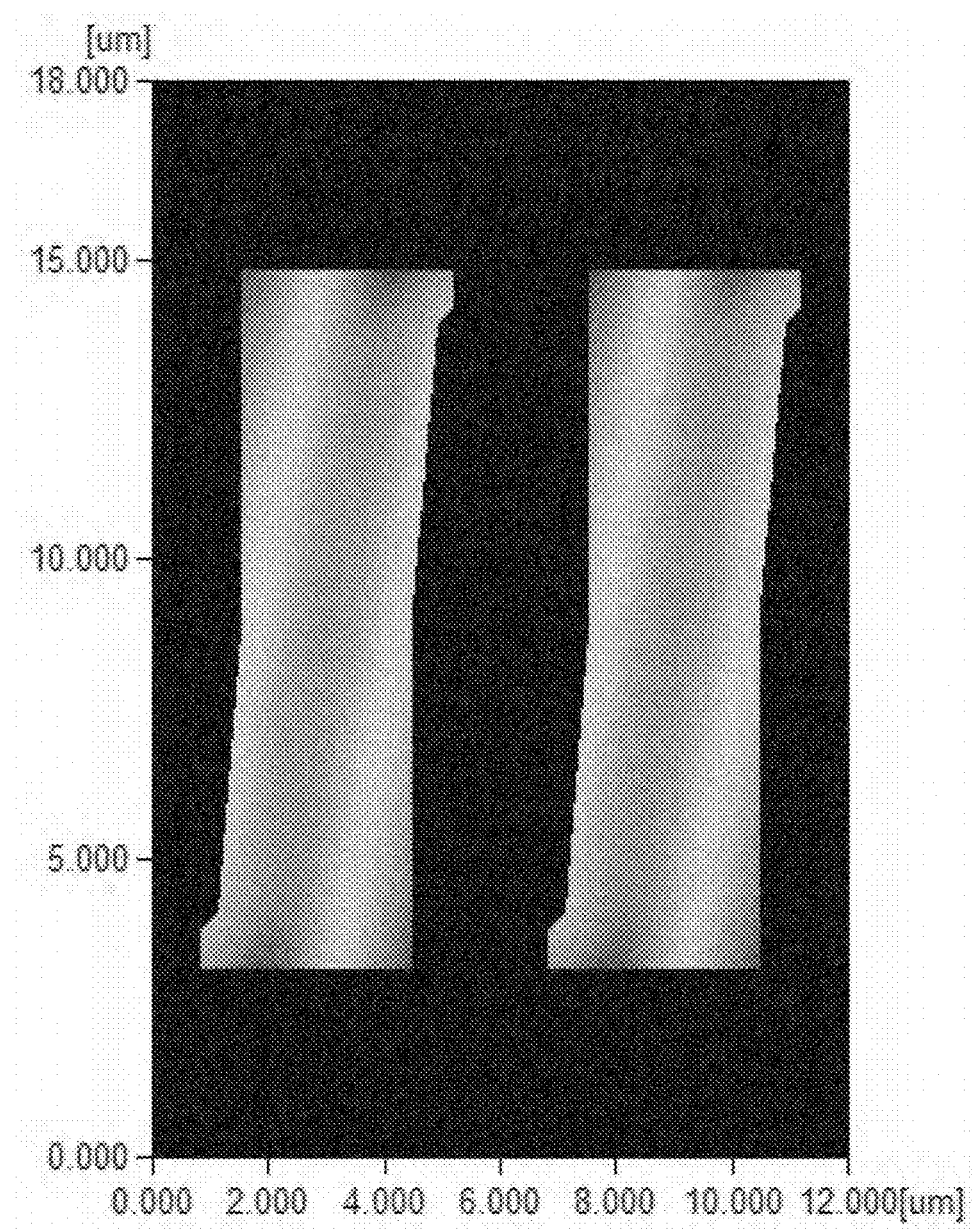
FIG. 35 is a diagram illustrating a transmittance distribution in a case where the light blocking portion is at the normal position, which is an experimental result of Example 3 of Comparative Experiment 5 according to the third embodiment.
Figure 36:
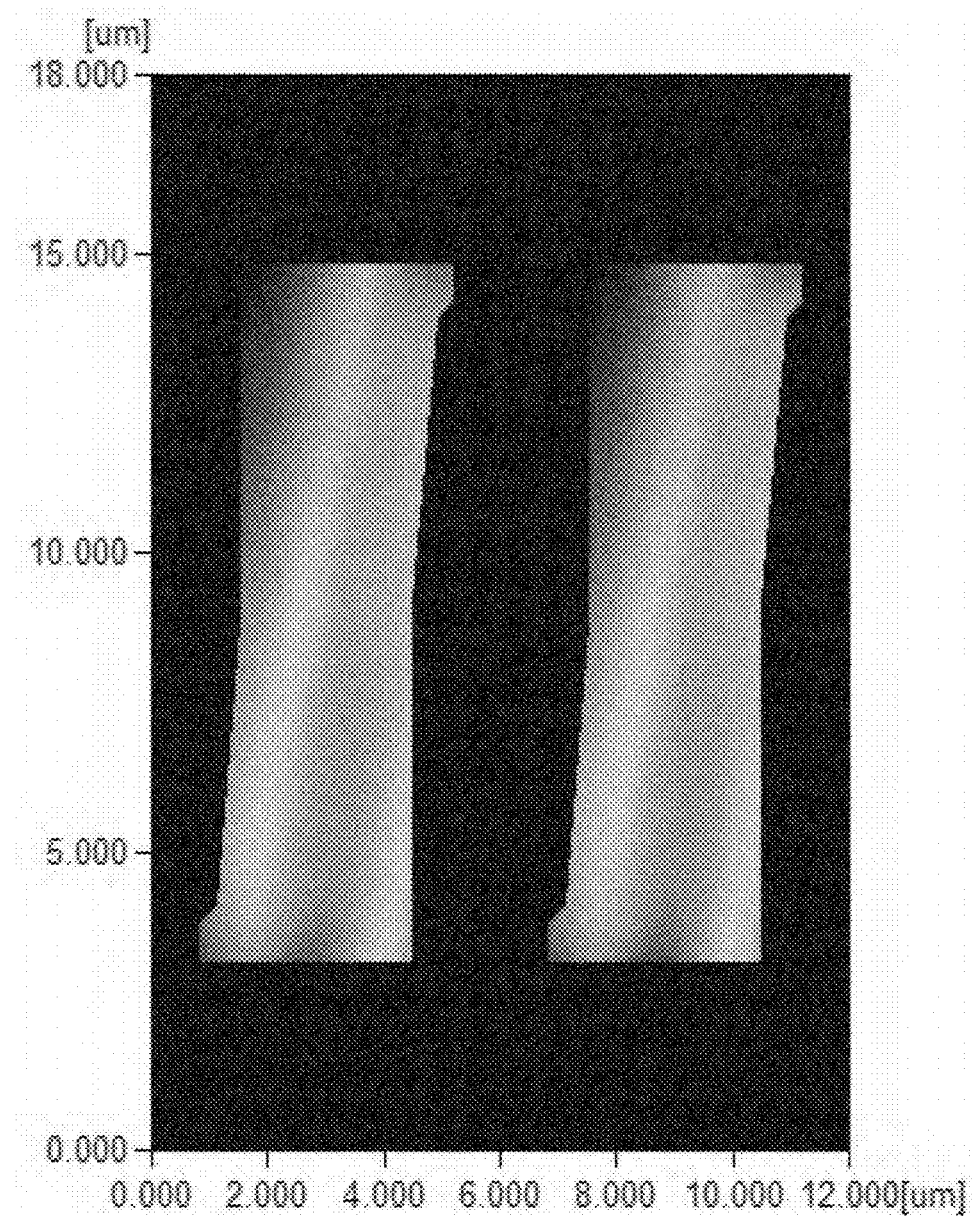
FIG. 36 is a diagram illustrating a transmittance distribution in a case where the light blocking portion is maximally displaced toward the left side, which is an experimental result of Example 3 of Comparative Experiment 5 according to the third embodiment.
Figure 37:
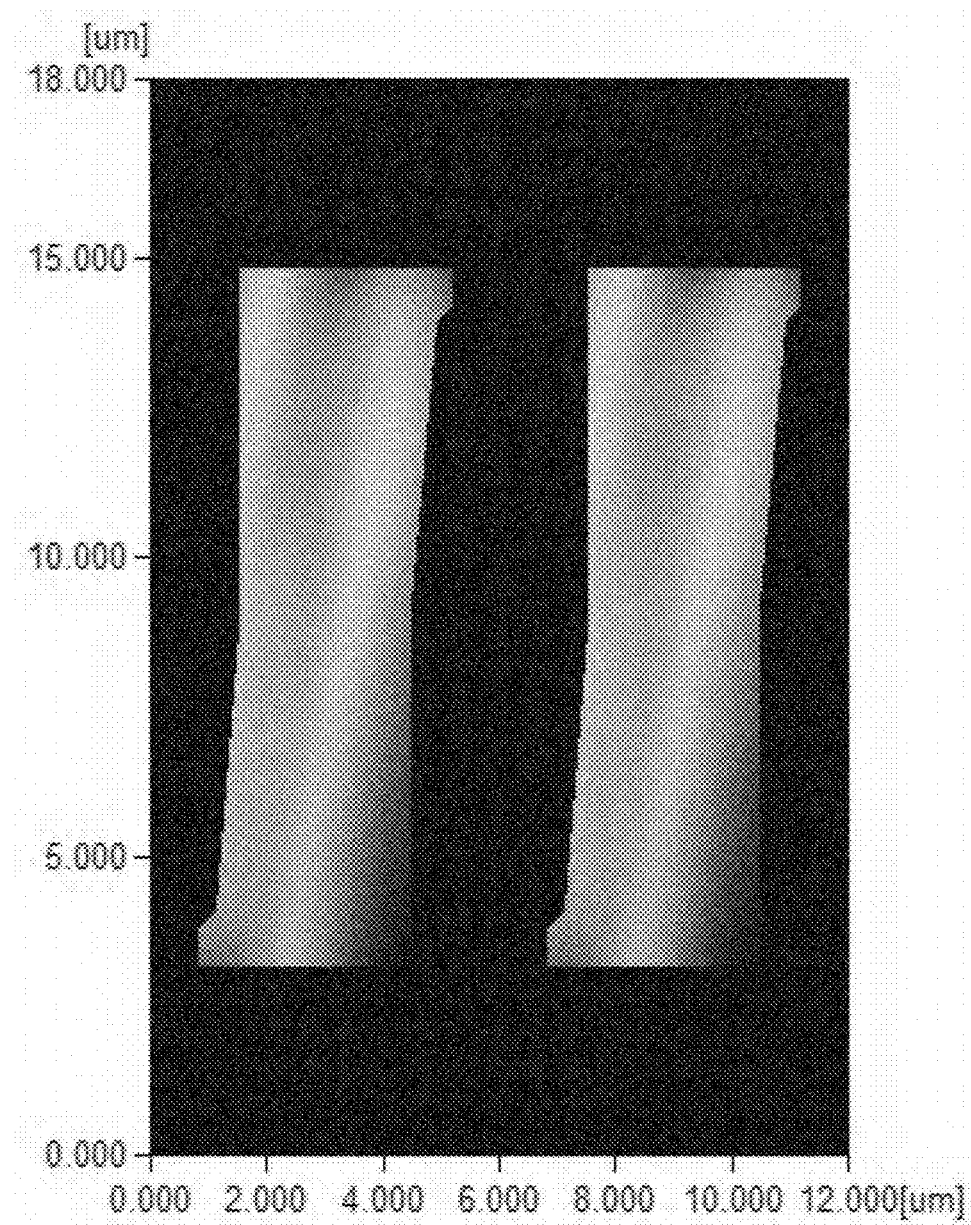
FIG. 37 is a diagram illustrating a transmittance distribution in a case where the light blocking portion is maximally displaced toward the right side, which is an experimental result of Example 3 of Comparative Experiment 5 according to the third embodiment.

Subsequently, in order to validate an advantage of the liquid crystal panel according to the present embodiment, the following Comparative Experiments 5 and 6 were performed. First of all, a description will be given on Comparative Experiment 5. Comparative Experiment 5 is similar to Comparative Experiment 1 described in the first embodiment, and the liquid crystal panel having the configuration described in the paragraph preceding Comparative Experiment 5 is used as Example 3 (see FIGS. 32 to 34). The experimental method in Comparative Experiment 5 is as described in Comparative Experiment 1. The experimental result is as illustrated in FIG. 35 to FIG. 37. FIG. 35 illustrates a transmittance distribution under the condition that the light blocking portion 243 is not displaced with respect to the common electrode 230. FIG. 36 illustrates a transmittance distribution under the condition that the light blocking portion 243 is maximally displaced toward the left side with respect to the common electrode 230. FIG. 37 illustrates a transmittance distribution under the condition that the light blocking portion 243 is maximally displaced toward the right side with respect to the common electrode 230. The transmittance distributions illustrated in FIGS. 35 to 37 are similar to the transmittance distributions illustrated in FIGS. 14 to 19.

The experimental results of Comparative Experiment 5 will be described. In Example 3, when the light blocking portion 243 is maximally displaced toward the left side in the X-axis direction with respect to the common electrode 230, as illustrated in FIG. 36, while a decrease in luminance occurs near the upper left corner portions of the pixels GPX, BPX, and RPX, the decrease is hardly visually recognized as a dark line. In Example 3, when the light blocking portion 243 is maximally displaced toward the right side in the X-axis direction with respect to the common electrode 230, as illustrated in FIG. 37, while a decrease in luminance occurs near the lower right corner portions of the pixels GPX, BPX, and RPX, the decrease is hardly visually recognized as a dark line. As described above, according to FIG. 35 to FIG. 37, in Example 3, a portion (in the vicinity of the upper left corner portion of the pixels GPX, BPX, and RPX in FIG. 36, and in the vicinity of the lower right corner portion of the pixels GPX, BPX, and RPX in FIG. 37) in which luminance is lowered due to the displacement of the light blocking portion 243 is bright compared with Example 2 (FIG. 28 to FIG. 30) of Comparative Experiment 3 described in the above-described second embodiment. That is, it can be said that the decrease in luminance due to the displacement of the light blocking portion 243 is more effectively suppressed in Example 3 than in Example 2.

Figure 38:
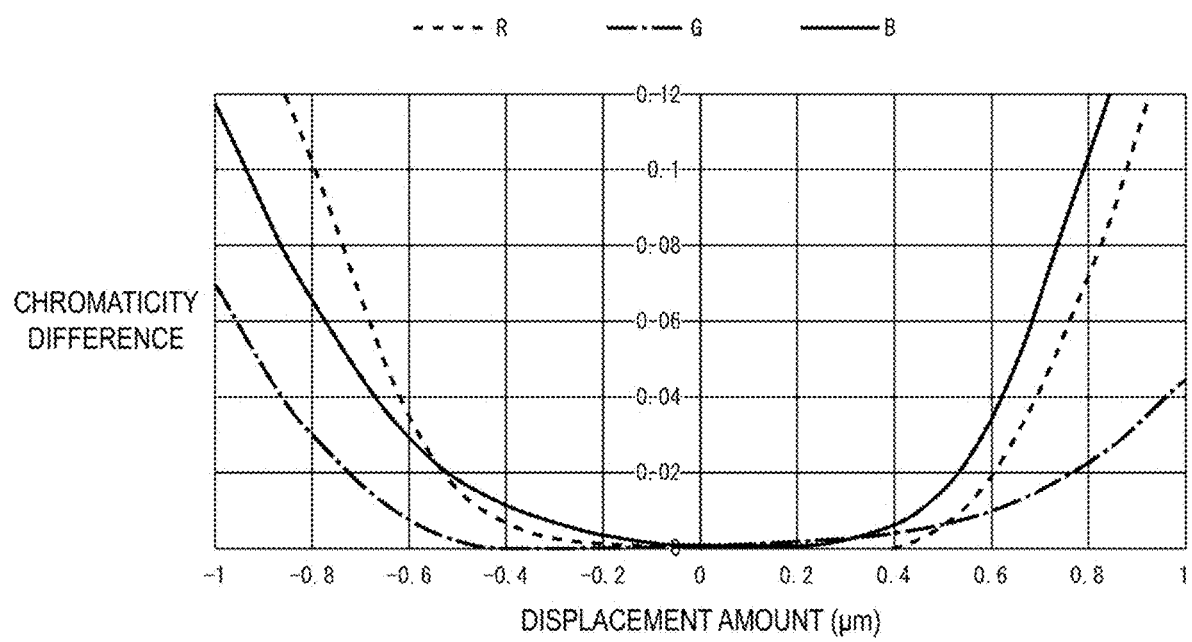
FIG. 38 is a graph illustrating a relationship between a displacement amount of the light blocking portion in the X-axis direction and a chromaticity difference generated in each pixel due to the displacement of the light blocking portion, which is an experimental result of Example 3 of Comparative Experiment 6 according to the third embodiment.

Next, a description will be given on Comparative Experiment 6. In Comparative Experiment 6, using the liquid crystal panel according to Example 3 described in Comparative Experiment 5 described above, the relationship between the displacement amount of the light blocking portion 243 in the X-axis direction and the chromaticity difference generated in each of the pixels GPX, BPX, and RPX due to the displacement of the light blocking portion 243 was examined, as in Comparative Experiment 2 described in the first embodiment described above. The experimental method in Comparative Experiment 6 is as described in Comparative Experiment 2. The experimental result is as illustrated in FIG. 38. The graph illustrated in FIG. 38 is similar to the graphs illustrated in FIGS. 23 and 24.

The experimental results of Comparative Experiment 6 will be described. According to FIG. 38, in Example 3, the chromaticity is hardly changed by displacement of about ±0.2 μm, and the change rate of the chromaticity is kept sufficiently low from about ±0.2 μm to about ±0.5 μm. Thus, it can be said that the light blocking portion 243 in Example 3 can sufficiently exhibit the color mixing prevention function. The color mixing prevention function provided in Example 3 is slightly lower than that provided in Example 2 (FIG. 31) of Comparative Experiment 4 described in the above-described second embodiment. Still, the color mixing prevention function provided in Example 3 is equivalent to that in Example 1 (FIG. 24) of Comparative Experiment 2 described in the first embodiment. Thus, it can be said that Example 3 can provide a color mixing prevention function that is lower than that in Example 2, but is equivalent to that in Example 1.

Fourth Embodiment

A fourth embodiment will be described with reference to FIGS. 39 to 45. This fourth embodiment illustrates a case with a light blocking portion 343 with a configuration changed from that in the second embodiment described above. Further, repetitive descriptions of structures, actions, and effects similar to those of the second embodiment described above will be omitted.

Figure 39:
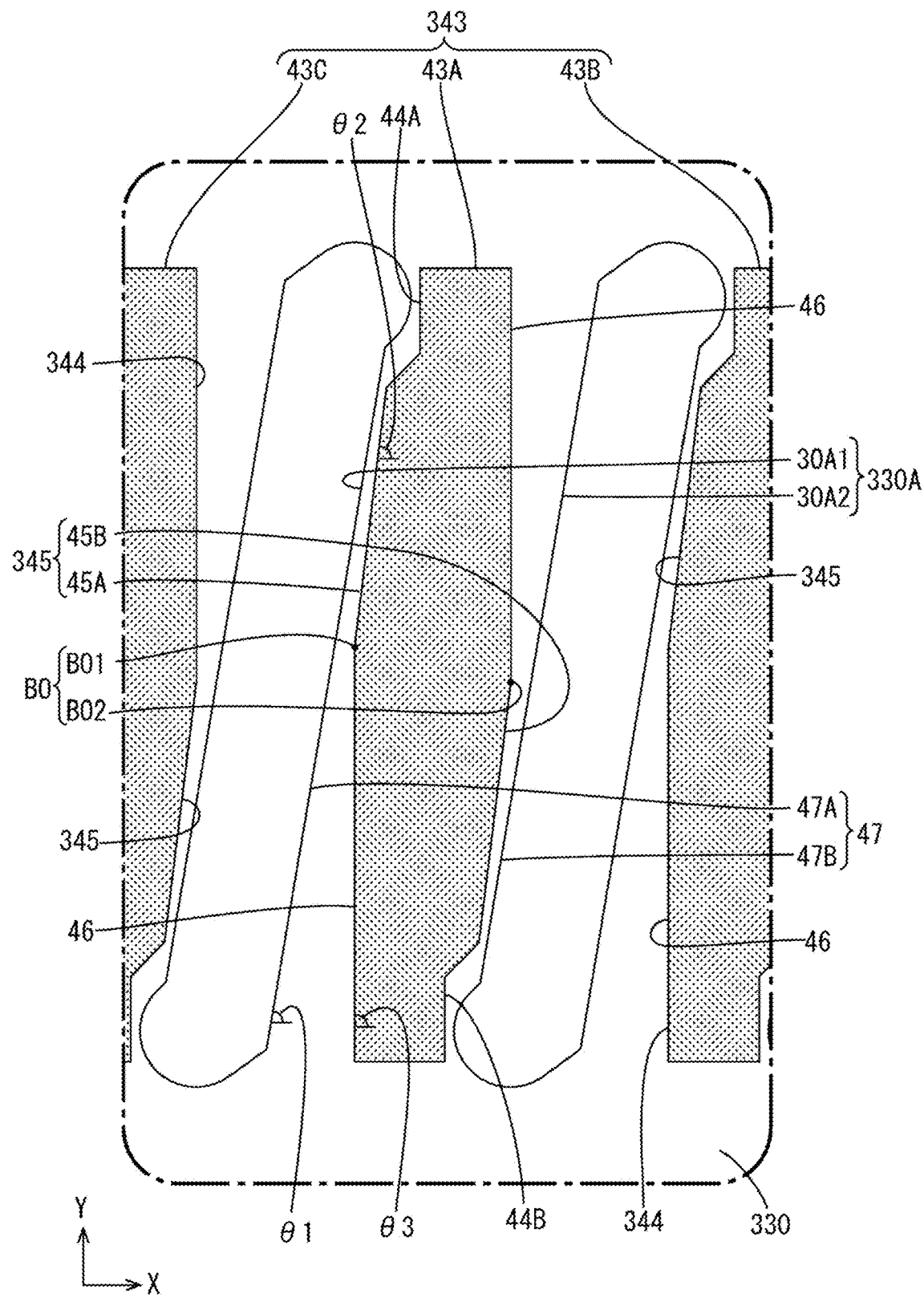
FIG. 39 is a plan view illustrating a relationship between a slit and a light blocking portion at a normal position in a display region of a liquid crystal panel according to a fourth embodiment.
Figure 40:
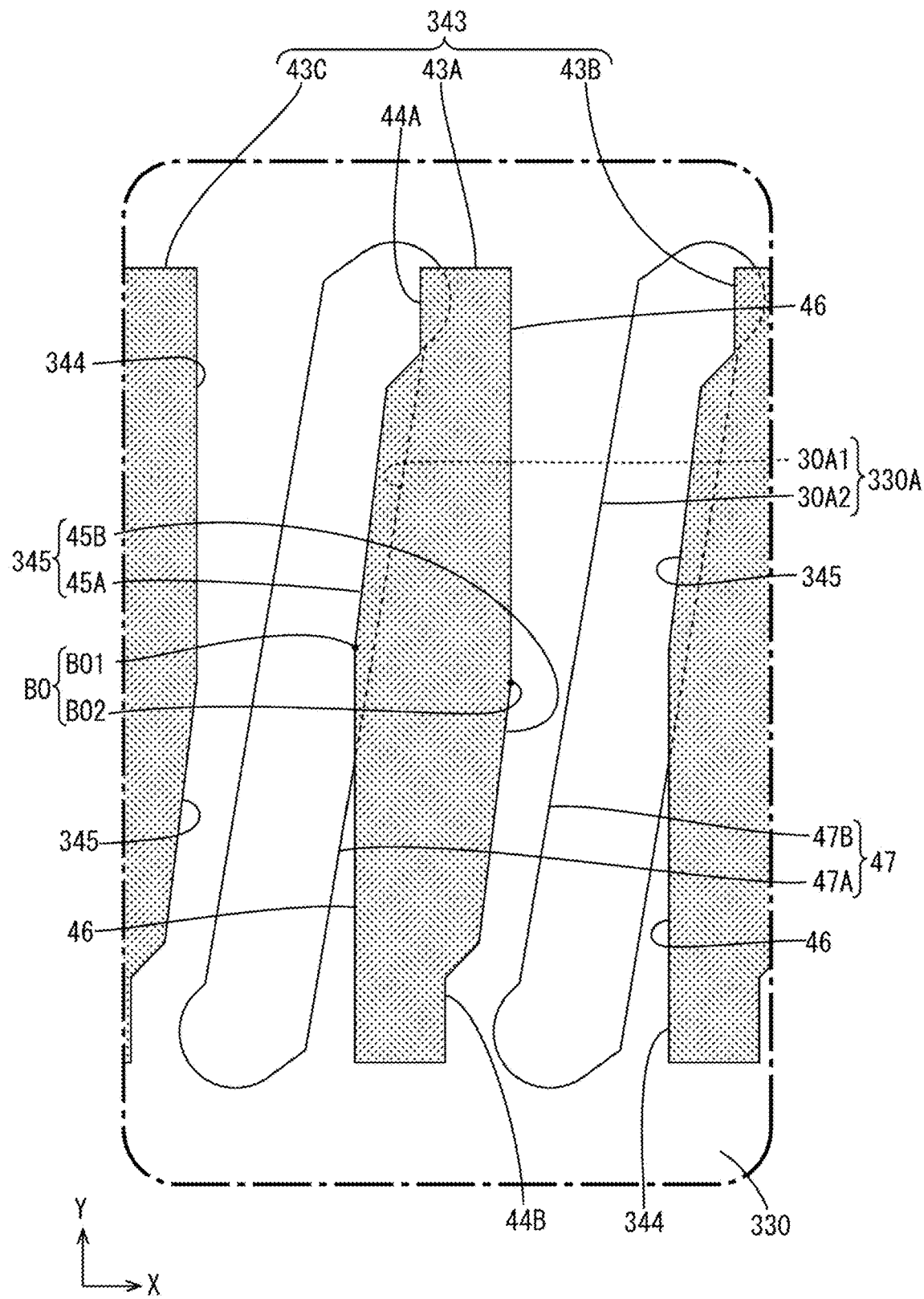
FIG. 40 is a plan view illustrating a relationship between the slit and the light blocking portion maximally displaced toward the left side, in the display region of the liquid crystal panel according to the fourth embodiment.
Figure 41:
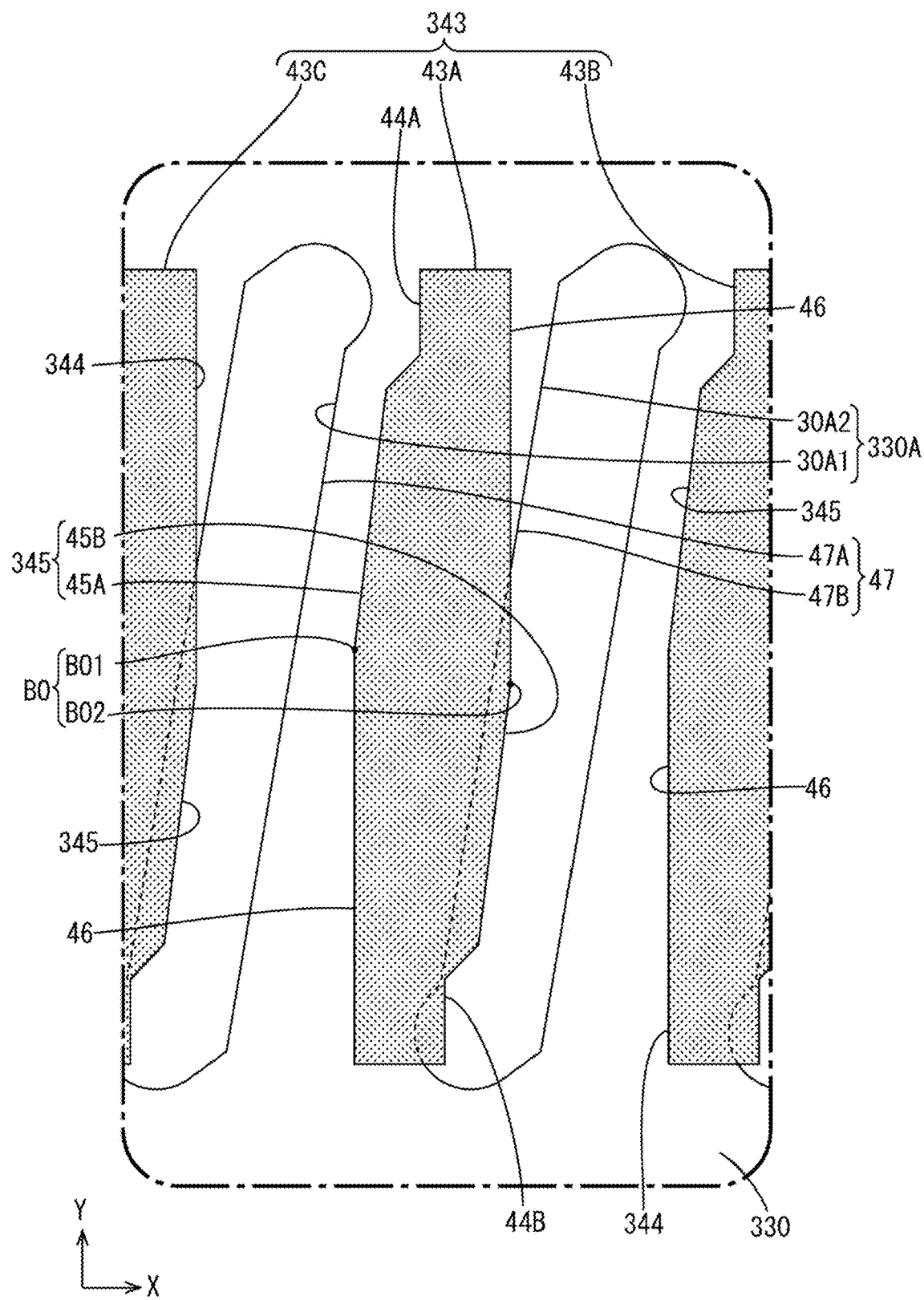
FIG. 41 is a plan view illustrating a relationship between the slit and the light blocking portion maximally displaced toward the right side, in the display region of the liquid crystal panel according to the fourth embodiment.

As illustrated in FIG. 39, an inclined portion 345 included in an end portion 344 of the light blocking portion 343 according to the present embodiment is inclined at an angle of, for example, 83° with respect to the X-axis direction and at an angle of, for example, 7° with respect to the Y-axis direction. In other words, the inclined portion 345 according to the present embodiment has the second angle θ2 being, for example, 83°, which is larger than 80° as the first angle θ1, but is smaller than 85° as the second angle θ2 of the inclined portion 245 according to the third embodiment. The maximum dimension of the light blocking portion 343 according to the present embodiment in the X-axis direction is the same as the maximum dimensions of the light blocking portions 143 and 243, described in the second and the third embodiments, in the X-axis direction. Therefore, the area of the light blocking portion 343 according to the present embodiment is smaller than the area of the light blocking portion 243 described in the third embodiment. As illustrated in FIGS. 40 and 41, the area of the light blocking portion 343 overlapping a slit 330A as a result of the leftward or rightward maximum displacement of the light blocking portion 343 in the X-axis direction with respect to a common electrode 330 is smaller than that of the light blocking portion 243 described in the third embodiment (see FIG. 33 and FIG. 34). Therefore, according to the present embodiment, it is possible to further suppress a decrease in luminance that may occur due to the displacement of the light blocking portion 343 in the X-axis direction, compared with the third embodiment.

Figure 42:
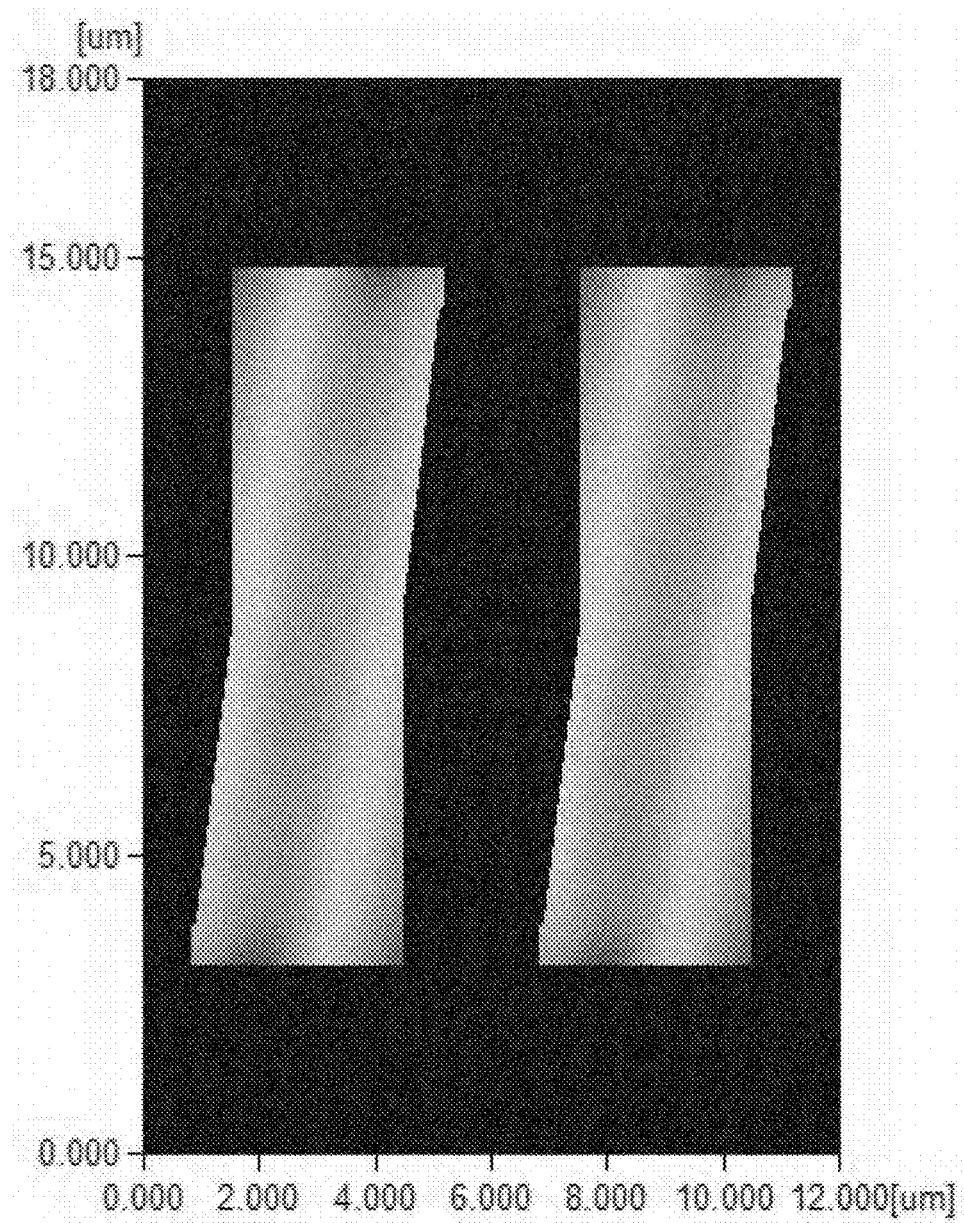
FIG. 42 is a diagram illustrating a transmittance distribution in a case where the light blocking portion is at the normal position, which is an experimental result of Example 4 of Comparative Experiment 7 according to the fourth embodiment.
Figure 43:
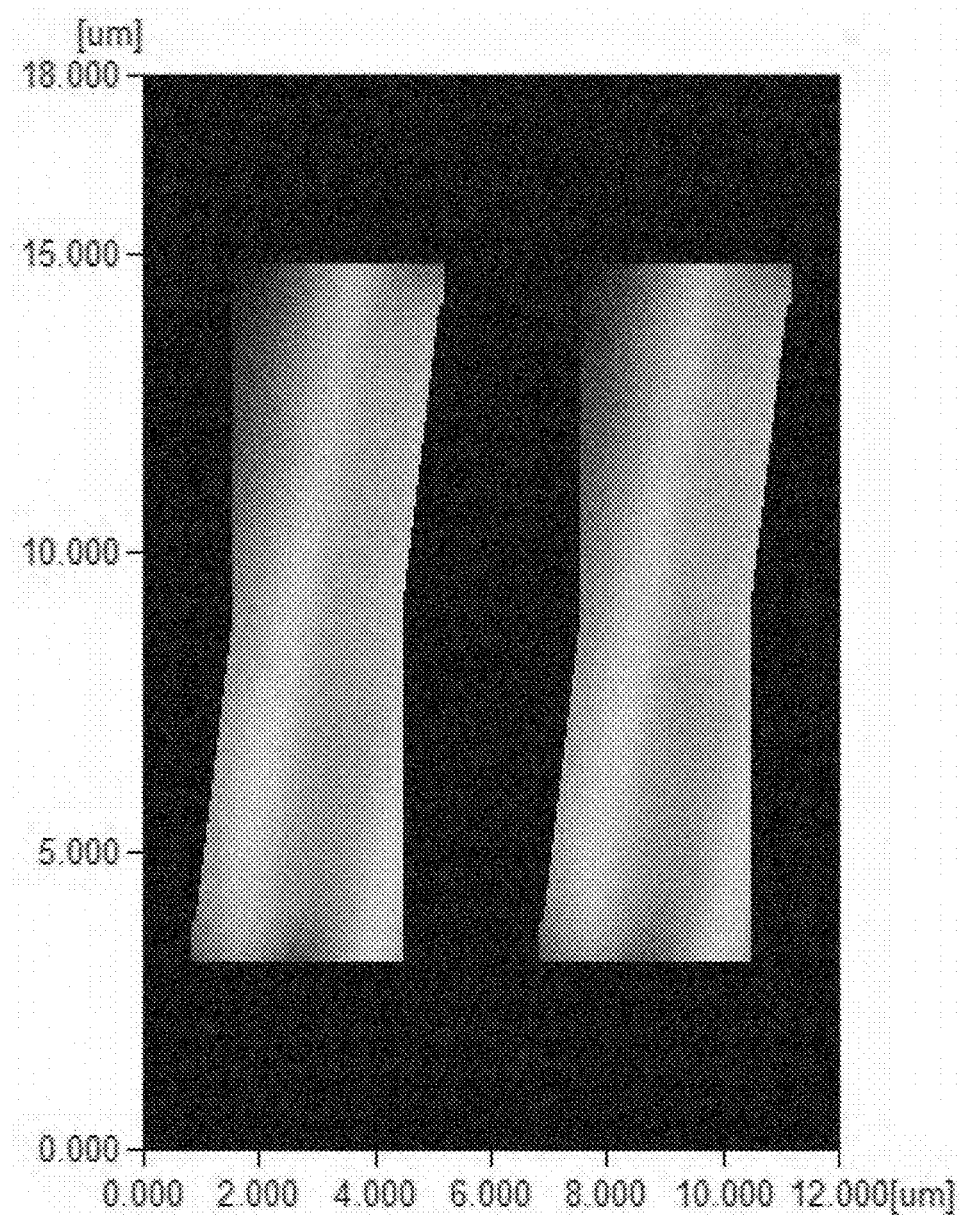
FIG. 43 is a diagram illustrating a transmittance distribution in a case where the light blocking portion is maximally displaced toward the left side, which is an experimental result of Example 4 of Comparative Experiment 7 according to the fourth embodiment.
Figure 44:
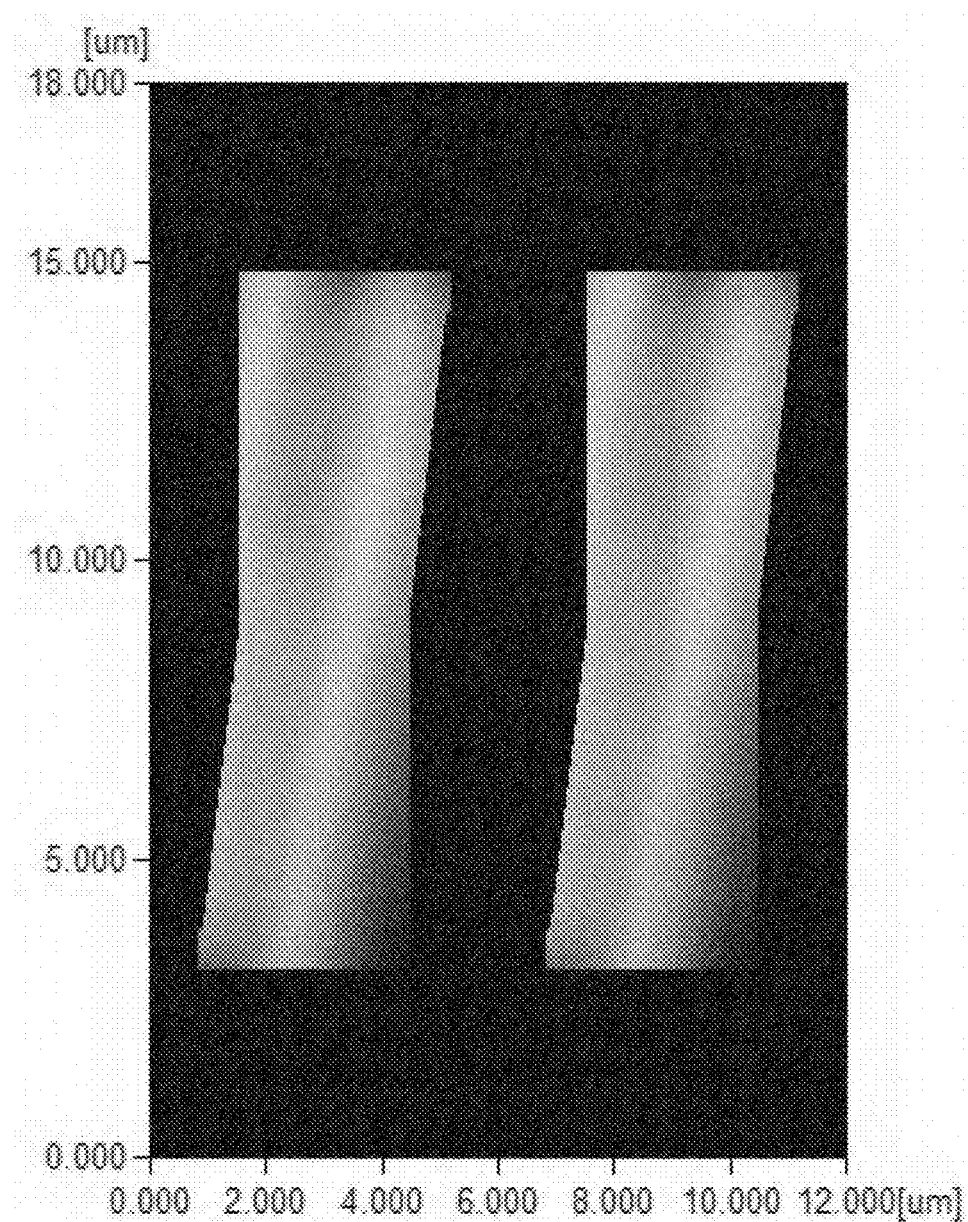
FIG. 44 is a diagram illustrating a transmittance distribution in a case where the light blocking portion is maximally displaced toward the right side, which is an experimental result of Example 4 of Comparative Experiment 7 according to the fourth embodiment.

Subsequently, in order to validate an advantage of the liquid crystal panel according to the present embodiment, the following Comparative Experiments 7 and 8 were performed. First of all, a description will be given on Comparative Experiment 7. Comparative Experiment 7 is similar to Comparative Experiment 1 described in the first embodiment, and the liquid crystal panel having the configuration described in the paragraph preceding Comparative Experiment 7 is used as Example 4 (see FIGS. 39 to 41). The experimental method in Comparative Experiment 7 is as described in Comparative Experiment 1. The experimental result is as illustrated in FIG. 42 to FIG. 44. FIG. 42 illustrates a transmittance distribution under the condition that the light blocking portion 343 is not displaced with respect to the common electrode 330. FIG. 43 illustrates a transmittance distribution under the condition that the light blocking portion 343 is maximally displaced toward the left side with respect to the common electrode 330. FIG. 44 illustrates a transmittance distribution under the condition that the light blocking portion 343 is maximally displaced toward the right side with respect to the common electrode 330. The transmittance distributions illustrated in FIGS. 42 to 44 are similar to the transmittance distributions illustrated in FIGS. 14 to 19.

The experimental results of Comparative Experiment 7 will be described. In Example 4, when the light blocking portion 343 is maximally displaced toward the left side in the X-axis direction with respect to the common electrode 330, as illustrated in FIG. 43, while a decrease in luminance occurs near the upper left corner portions of the pixels GPX, BPX, and RPX, the decrease is hardly visually recognized as a dark line. In Example 4, when the light blocking portion 343 is maximally displaced toward the right side in the X-axis direction with respect to the common electrode 330, as illustrated in FIG. 44, while a decrease in luminance occurs near the lower right corner portions of the pixels GPX, BPX, and RPX, the decrease is hardly visually recognized as a dark line. As described above, according to FIG. 42 to FIG. 44, in Example 4, a portion (in the vicinity of the upper left corner portion of the pixels GPX, BPX, and RPX in FIG. 43, and in the vicinity of the lower right corner portion of the pixels GPX, BPX, and RPX in FIG. 44) in which luminance is lowered due to the displacement of the light blocking portion 343 is bright compared with Example 3 (FIG. 35 to FIG. 37) of Comparative Experiment 5 described in the above-described third embodiment. That is, it can be said that the decrease in luminance due to the displacement of the light blocking portion 343 is more effectively suppressed in Example 4 than in Example 3.

Figure 45:
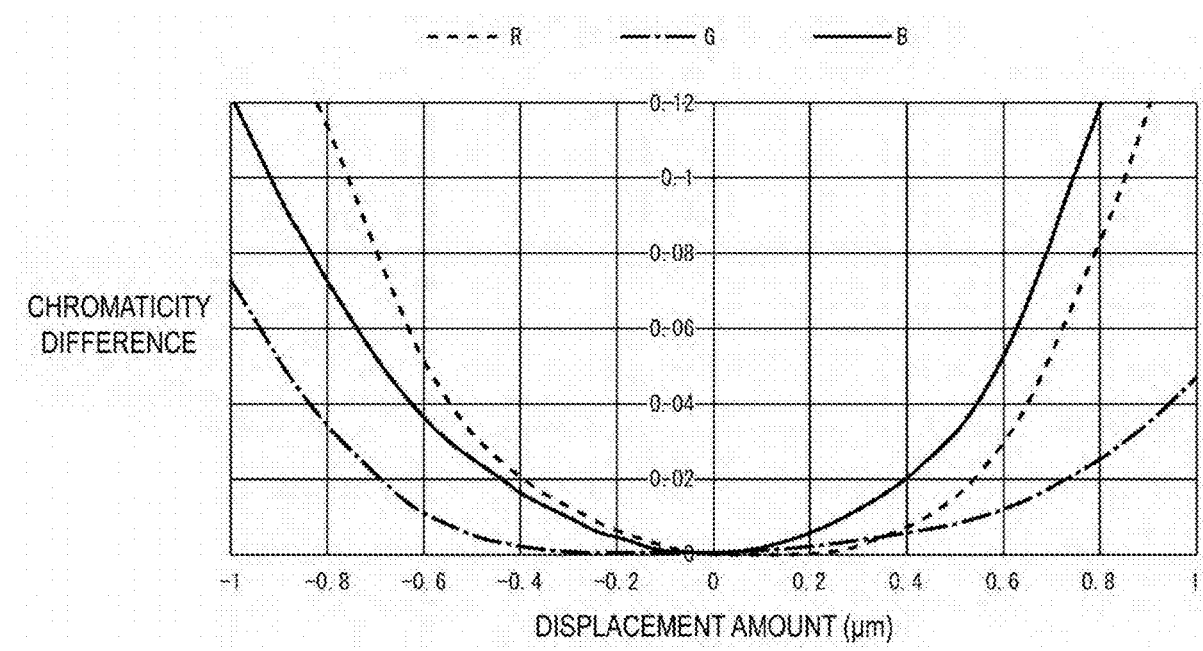
FIG. 45 is a graph illustrating a relationship between a displacement amount of the light blocking portion in the X-axis direction and a chromaticity difference generated in each pixel due to the displacement of the light blocking portion, which is an experimental result of Example 4 of Comparative Experiment 8 according to the fourth embodiment.

Next, a description will be given on Comparative Experiment 8. In Comparative Experiment 8, using the liquid crystal panel according to Example 4 described in Comparative Experiment 7 described above, the relationship between the displacement amount of the light blocking portion 343 in the X-axis direction and the chromaticity difference generated in each of the pixels GPX, BPX, and RPX due to the displacement of the light blocking portion 343 was examined, as in Comparative Experiment 2 described in the first embodiment described above. The experimental method in Comparative Experiment 8 is as described in Comparative Experiment 2. The experimental result is as illustrated in FIG. 45. The graph illustrated in FIG. 45 is similar to the graphs illustrated in FIGS. 23 and 24.

The experimental results of Comparative Experiment 8 will be described. According to FIG. 45, in Example 4, the chromaticity is hardly changed by displacement of about ±0.2 µm, and the change rate of the chromaticity is kept sufficiently low from about ±0.2 µm to about ±0.4 µm. Thus, it can be said that the light blocking portion 343 in Example 4 can sufficiently exhibit the color mixing prevention function. The color mixing prevention function provided in Example 4 is slightly lower than that provided in Example 3 (FIG. 38) of Comparative Experiment 6 described in the above-described third embodiment. Still, Example 4 provides an excellent color mixing prevention function compared with Comparative Example 2 (FIG. 23) of Comparative Experiment 2 described in the first embodiment. Thus, it can be said that Example 4 can provide a color mixing prevention function that is lower than that in Example 3, but is higher than that in Comparative Example 2.

Fifth Embodiment

A fifth embodiment will be described with reference to FIG. 46 or FIG. 47. This fifth embodiment illustrates a case with a light blocking portion 443 with a configuration changed from that in the third embodiment described above. Note that redundant descriptions of structures, actions, and effects similar to those of the third embodiment described above will be omitted.

Figure 46:
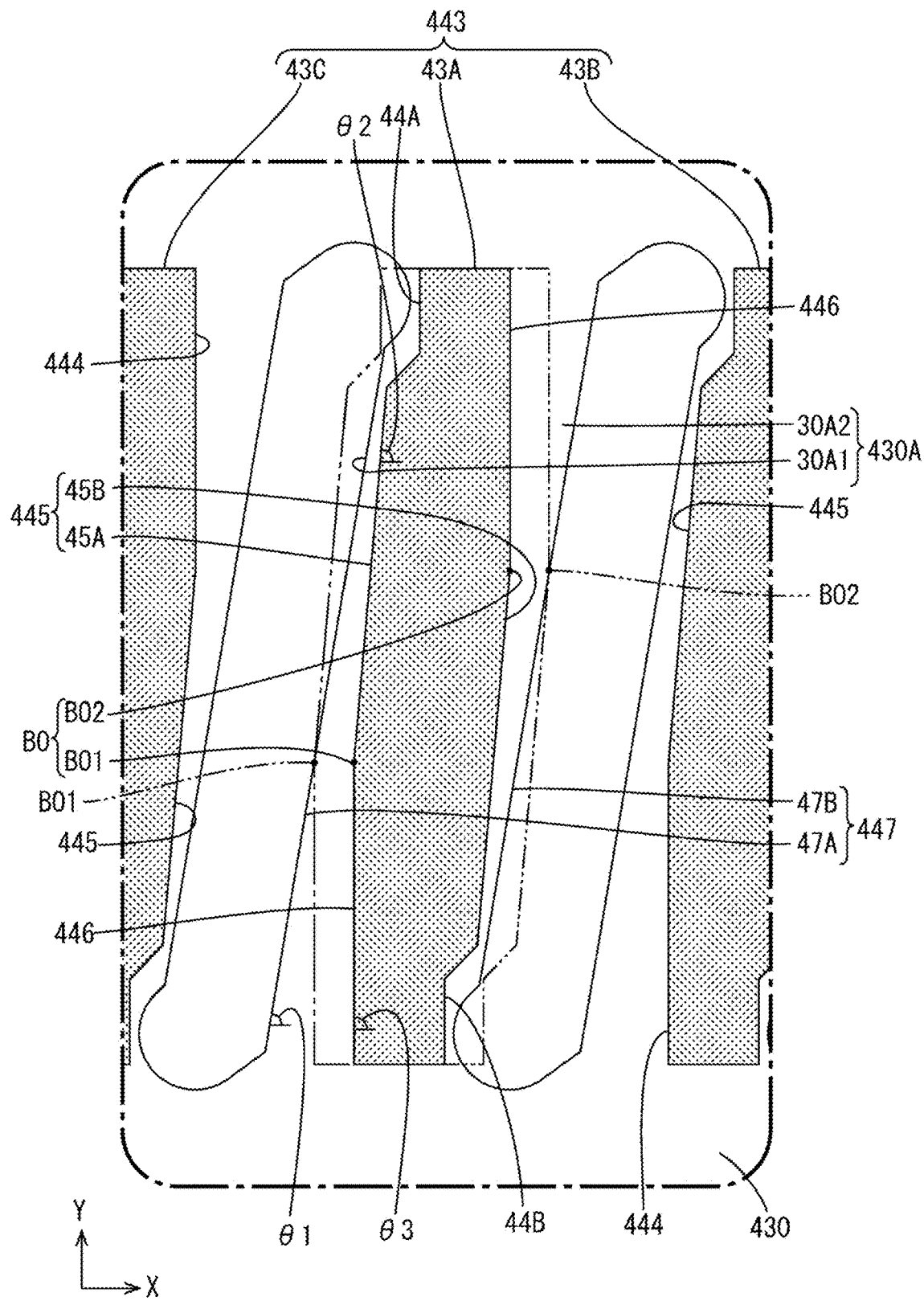
FIG. 46 is a plan view illustrating a relationship between a slit and a light blocking portion at a normal position in a display region of a liquid crystal panel according to a fifth embodiment.
Figure 47:
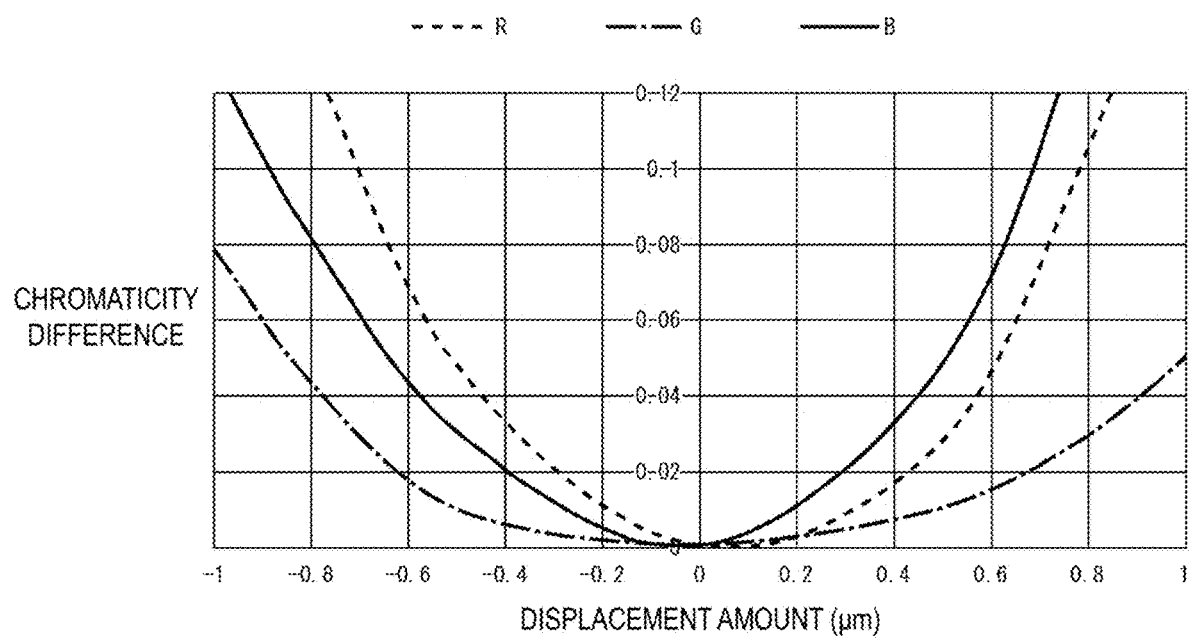
FIG. 47 is a graph illustrating a relationship between a displacement amount of the light blocking portion in the X-axis direction and a chromaticity difference generated in each pixel due to the displacement of the light blocking portion, which is an experimental result of Example 5 of Comparative Experiment 9 according to the fifth embodiment.

As illustrated in FIG. 46, the light blocking portion 443 according to the present embodiment is provided in such a manner that the maximum displacement thereof toward each of the left and right sides in the X-axis direction from the normal position (position illustrated in FIG. 46) with respect to the common electrode 430 results in the boundary BO between an inclined portion 445 included in an end portion 444 and a straight portion 446 matching the intersection between the end portion 444 of the light blocking portion 443 and an edge portion 447 of the slit 430A. In FIG. 46, the outer shape of the light blocking portion 443 maximally displaced toward each of the left and right sides in the X-axis direction is indicated by a two-dot chain line. The area of the light blocking portion 443 according to the present embodiment is smaller than the area of the light blocking portion 243 described in the third embodiment. The area of the light blocking portion 443 overlapping a slit 430A as a result of the leftward or rightward maximum displacement of the light blocking portion 443 in the X-axis direction with respect to a common electrode 430 is smaller than that of the light blocking portion 243 described in the third embodiment (see FIG. 33 and FIG. 34). Therefore, according to the present embodiment, it is possible to further suppress a decrease in luminance that may occur due to the displacement of the light blocking portion 443 in the X-axis direction, compared with the third embodiment.

Subsequently, in order to validate an advantage of the liquid crystal panel according to the present embodiment, the following Comparative Experiment 9 was performed. Comparative Experiment 9 is similar to Comparative Experiment 2 described in the first embodiment, and the liquid crystal panel having the configuration described in the paragraph preceding Comparative Experiment 9 is used as Example 5 (see FIG. 46). In Comparative Experiment 9, using the liquid crystal panel according to Example 5, the relationship between the displacement amount of the light blocking portion 443 in the X-axis direction and the chromaticity difference generated in each of the pixels GPX, BPX, and RPX due to the displacement of the light blocking portion 443 was examined, as in Comparative Experiment 2 described in the first embodiment described above. The experimental method in Comparative Experiment 9 is as described in Comparative Experiment 2. The experimental result is as illustrated in FIG. 47. The graph illustrated in FIG. 47 is similar to the graphs illustrated in FIGS. 23 and 24.

The experimental results of Comparative Experiment 9 will be described. According to FIG. 47, in Example 5, the chromaticity is hardly changed by displacement of about ±0.1 µm, and the change rate of the chromaticity is kept sufficiently low from about ±0.1 µm to about ±0.2 µm. Thus, it can be said that the light blocking portion 443 in Example 5 can somewhat exhibit the color mixing prevention function. The color mixing prevention function provided in Example 5 is lower than that provided in Example 3 (FIG. 38) of Comparative Experiment 6 described in the above-described third embodiment. Still, Example 5 provides an excellent color mixing prevention function compared with Comparative Example 2 (FIG. 23) of Comparative Experiment 2 described in the first embodiment. Thus, it can be said that Example 5 can provide a color mixing prevention function that is lower than that in Example 3, but is higher than that in Comparative Example 2.

Sixth Embodiment

A sixth embodiment will be described with reference to FIG. 48 or FIG. 49. This sixth embodiment illustrates a case with a light blocking portion 543 with a configuration changed from that in the fourth embodiment described above. Further, repetitive descriptions of structures, actions, and effects similar to those of the fourth embodiment described above will be omitted.

Figure 48:
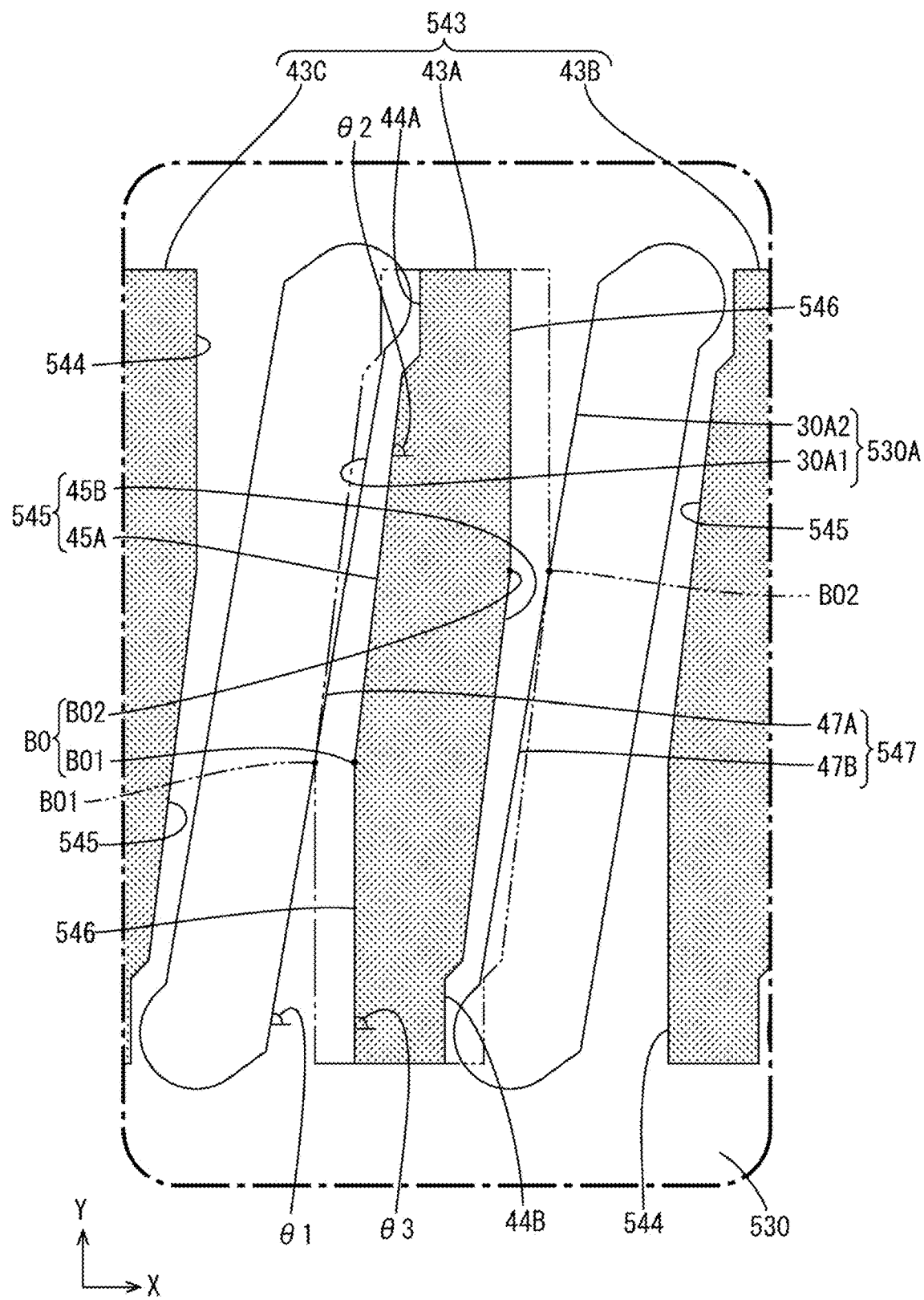
FIG. 48 is a plan view illustrating a relationship between a slit and a light blocking portion at a normal position in a display region of a liquid crystal panel according to a sixth embodiment.
Figure 49:
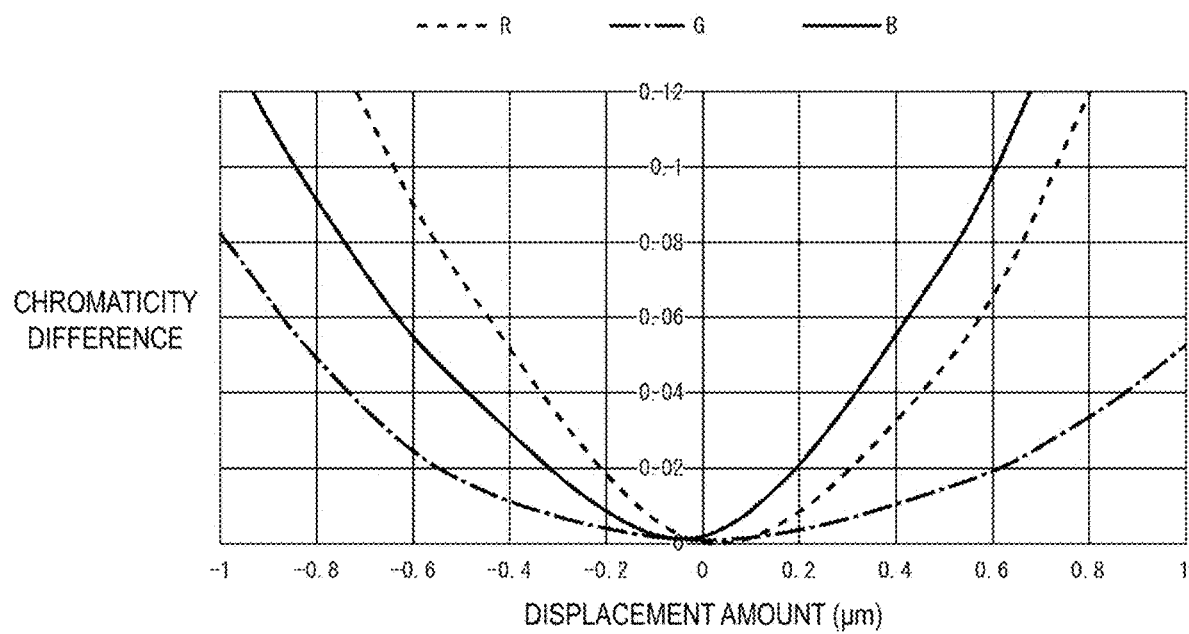
FIG. 49 is a graph illustrating a relationship between a displacement amount of the light blocking portion in the X-axis direction and a chromaticity difference generated in each pixel due to the displacement of the light blocking portion, which is an experimental result of Example 6 of Comparative Experiment 10 according to the sixth embodiment.

As illustrated in FIG. 48, the light blocking portion 543 according to the present embodiment is provided in such a manner that the maximum displacement thereof toward each of the left and right sides in the X-axis direction from the normal position (position illustrated in FIG. 48) with respect to a common electrode 530 results in the boundary BO between an inclined portion 545 included in an end portion 544 and a straight portion 546 matching the intersection between the end portion 544 of the light blocking portion 543 and an edge portion 547 of the slit 530A. In FIG. 48, the outer shape of the light blocking portion 543 maximally displaced toward each of the left and right sides in the X-axis direction is indicated by a two-dot chain line. The area of the light blocking portion 543 according to the present embodiment is smaller than the area of the light blocking portion 343 described in the fourth embodiment. The area of the light blocking portion 543 overlapping the slit 530A as a result of the leftward or rightward maximum displacement of the light blocking portion 543 in the X-axis direction with respect to the common electrode 530 is smaller than that of the light blocking portion 343 described in the fourth embodiment (see FIG. 40 and FIG. 41). Therefore, according to the present embodiment, it is possible to further suppress a decrease in luminance that may occur due to the displacement of the light blocking portion 543 in the X-axis direction, compared with the fourth embodiment.

Subsequently, in order to validate an advantage of the liquid crystal panel according to the present embodiment, the following Comparative Experiment 10 was performed. Comparative Experiment 10 is similar to Comparative Experiment 2 described in the first embodiment, and the liquid crystal panel having the configuration described in the paragraph preceding Comparative Experiment 10 is used as Example 6 (see FIG. 48). In Comparative Experiment 10, using the liquid crystal panel according to Example 6, the relationship between the displacement amount of the light blocking portion 543 in the X-axis direction and the chromaticity difference generated in each of the pixels GPX, BPX, and RPX due to the displacement of the light blocking portion 543 was examined, as in Comparative Experiment 2 described in the first embodiment described above. The experimental method in Comparative Experiment 10 is as described in Comparative Experiment 2. The experimental result is as illustrated in FIG. 49. The graph illustrated in FIG. 49 is similar to the graphs illustrated in FIGS. 23 and 24.

The experimental results of Comparative Experiment 10 will be described. According to FIG. 49, in Example 6, the chromaticity is hardly changed by displacement of about ±0.1 µm, and the change rate of the chromaticity is kept sufficiently low from about ±0.1 µm to about ±0.15 µm. Thus, it can be said that the light blocking portion 543 in Example 6 can somewhat exhibit the color mixing prevention function. The color mixing prevention function provided in Example 6 is lower than that provided in Example 4 (FIG. 45) of Comparative Experiment 8 described in the above-described fourth embodiment. Still, Example 6 provides an excellent color mixing prevention function compared with Comparative Example 2 (FIG. 23) of Comparative Experiment 2 described in the first embodiment. Thus, it can be said that Example 6 can provide a color mixing prevention function that is lower than that in Example 4, but is higher than that in Comparative Example 2.

Seventh Embodiment

A seventh embodiment will be described with reference to FIGS. 50 to 62. This seventh embodiment illustrates a case with a source wiring line 626, a color filter 629, a light blocking portion 643, and the like with a configuration changed from that in the second embodiment described above. Further, repetitive descriptions of structures, actions, and effects similar to those of the second embodiment described above will be omitted.

Figure 50:
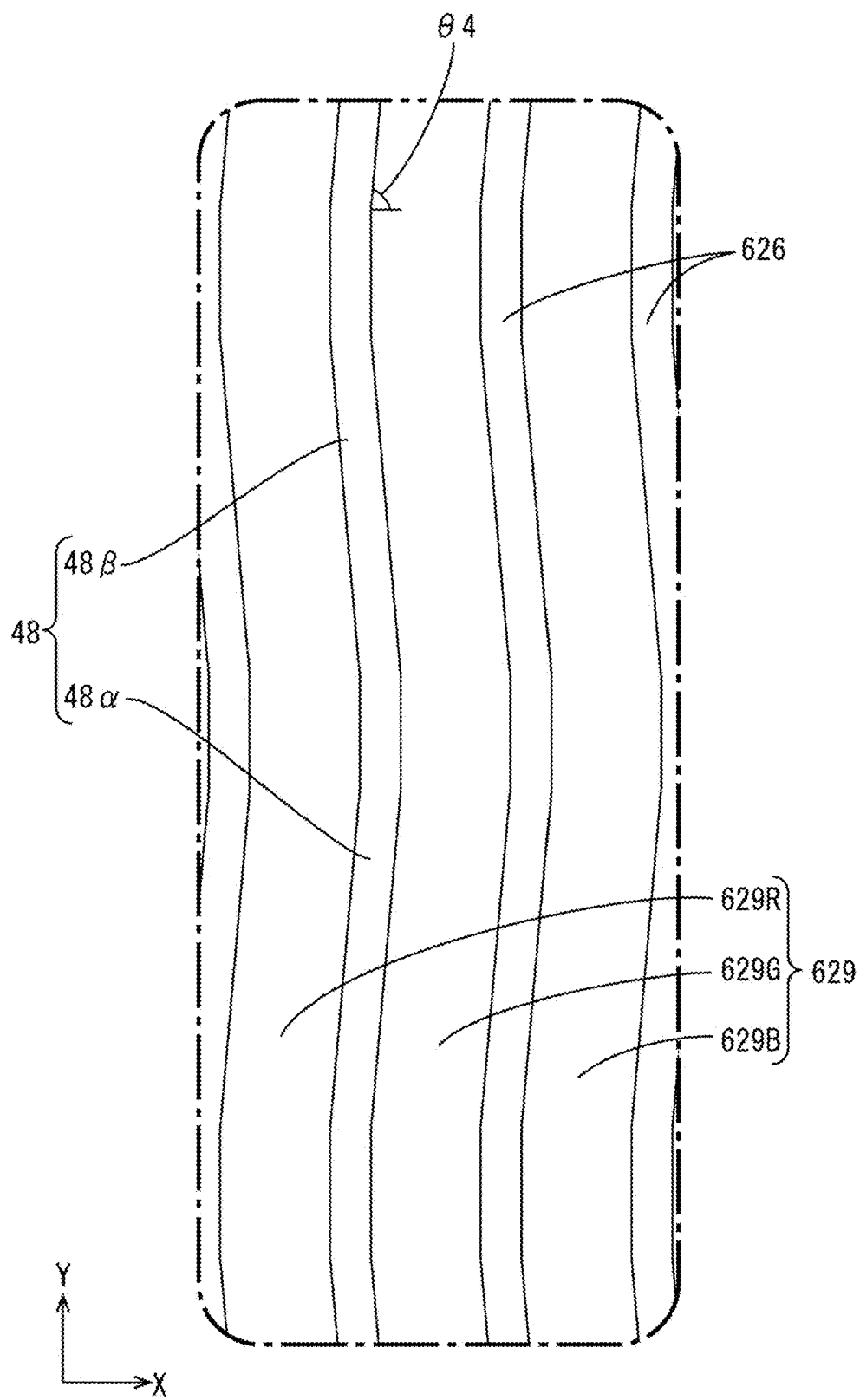
FIG. 50 is a plan view illustrating a source wiring line and a color filter in a display region of a liquid crystal panel according to a seventh embodiment.

The source wiring line 626 according to the present embodiment extends substantially along the Y-axis direction while being repeatedly bent into a zigzag shape as illustrated in FIG. 50. The source wiring line 626 includes an oblique wiring line portion 48 which is a portion extending along a fifth direction which is a direction inclined with respect to the X-axis direction (first direction) and the Y-axis direction (fourth direction). The oblique wiring line portion 48 forms an angle of, for example, 85° with respect to the X-axis direction and forms an angle of, for example, 5° with respect to the Y-axis direction. Here, the angle formed between the X-axis direction (first direction) and the fifth direction which is the extension direction of the oblique wiring line portion 48 is defined as the "fourth angle θ4", and the fourth angle θ4 is, for example, 85°. There are two types of the oblique wiring line portion 48: a first oblique wiring line portion 48α and a second oblique wiring line portion 48β that are inclined toward opposite sides with respect to the X-axis direction (the Y-axis direction). The first oblique wiring line portion 48α extends along a direction from the lower left to the upper right in FIG. 50. The second oblique wiring line portion 48B extends along a direction from the lower right to the upper left in FIG. 50. The color filter 629 (a first color filter 629G, a second color filter 629B, and a third color filter 629R) extend in parallel with the source wiring line 626 while being repeatedly bent in a zigzag shape. Similarly to the source wiring line 626, the color filter 629 includes a portion (oblique color filter portion) extending along the fifth direction which is a direction inclined with respect to the X-axis direction and the Y-axis direction. The portion of the color filter 629 extending along the fifth direction is substantially parallel to the oblique wiring line portion 48 of the source wiring line 626, forms an angle of, for example, 85° with respect to the X-axis direction, and forms an angle of, for example, 5° with respect to the Y-axis direction.

Figure 51:
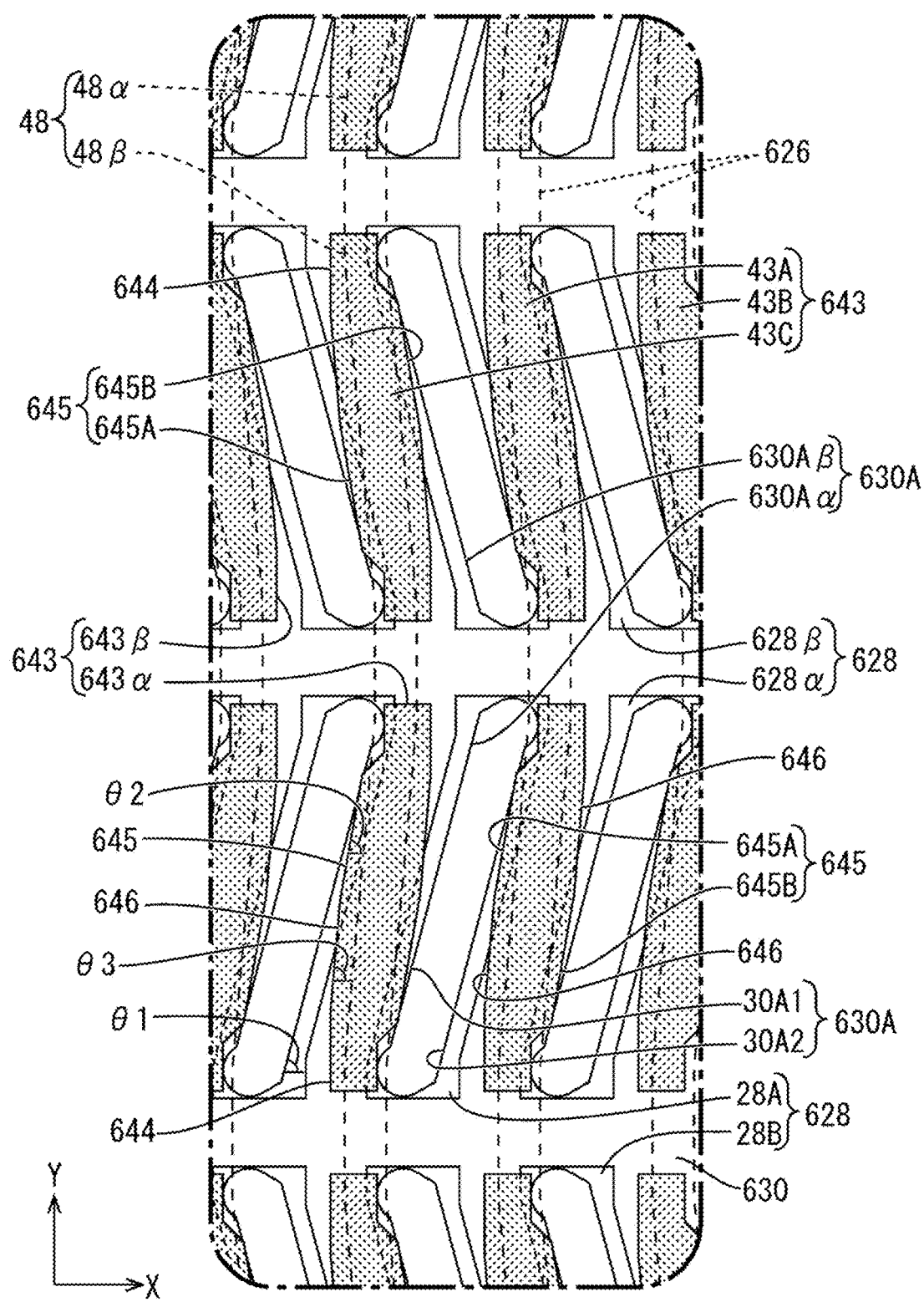
FIG. 51 is a plan view illustrating the source wiring line, a pixel electrode, a slit, and a light blocking portion in the display region of the liquid crystal panel according to the seventh embodiment.

The extension direction of the center-side portion of a slit 630A of a common electrode 630 according to the present embodiment in the Y-axis direction forms an angle of, for example, 75° with the X-axis direction, and forms an angle of, for example, 15° with the Y-axis direction as illustrated in FIG. 51. Here, the angle formed between the X-axis direction (first direction) and the second direction which is the extension direction of the center-side portion of the slit 630A in the Y-axis direction is defined as the "first angle θ1", and the first angle θ1 is, for example, 75°. The center-side portion of a pixel electrode 628 in the Y-axis direction is substantially parallel to the center-side portion of the slit 630A in the Y-axis direction, forms an angle of, for example, 75° with respect to the X-axis direction, and forms an angle of, for example, 15° with respect to the Y-axis direction. Here, two pixel electrodes 628α and 628β adjacent to each other with the gate wiring line 25 (see FIG. 5) interposed therebetween in the Y-axis direction are inclined toward opposite sides with respect to the X-axis direction (Y-axis direction). One pixel electrode 628α of the two pixel electrodes 628α and 628β described above extends along the direction from the lower left to the upper right in FIG. 51, and is disposed adjacent to the first oblique wiring line portion 48α of the source wiring line 626 in the X-axis direction. The other pixel electrode 628β of the two pixel electrodes 628α and 628β described above extends along the direction from the lower right to the upper left in FIG. 51, and is disposed adjacent to the second oblique wiring line portion 48β of the source wiring line 626 in the X-axis direction.

As illustrated in FIG. 51, two slits 630Aα and 630Aβ overlapping the two pixel electrodes 628α and 628β described above are inclined toward opposite sides with respect to the X-axis direction (Y-axis direction). One slit 630Aα of the two slits 630Aα and 630Aβ described above extends along the direction from the lower left to the upper right in FIG. 51, and is disposed adjacent to the first oblique wiring line portion 48α of the source wiring line 626 in the X-axis direction. The extension direction of one slit 630Aα is inclined toward the same side as the extension direction of the first oblique wiring line portion 48α with respect to the X-axis direction (first direction). The other slit 630Aβ of the two slits 630Aα and 630Aβ described above extends along the direction from the lower right to the upper left in FIG. 51, and is disposed adjacent to the second oblique wiring line portion 48β of the source wiring line 626 in the X-axis direction. The extension direction of the other slit 630Aβ is inclined toward the same side as the extension direction of the second oblique wiring line portion 48β with respect to the X-axis direction.

As illustrated in FIG. 51, the two light blocking portions 643 respectively adjacent to the two slits 630Aα and 630Aβ in the X-axis direction include inclined portions 645 inclined toward opposite sides with respect to the X-axis direction (the Y-axis direction). A first inclined portion 645A and a second inclined portion 645B in the inclined portion 645 of one light blocking portion 643α of the two light blocking portions 643 each extend along a direction from the lower left to the upper right in FIG. 51. The first inclined portion 645A and the second inclined portion 645B in the inclined portion 645 of the other light blocking portion 643β of the two light blocking portions 643 each extend along a direction from the lower right to the upper left in FIG. 51.

As illustrated in FIG. 51, the source wiring line 626 including the oblique wiring line portion 48 is disposed at the boundary between two color filters 629 (the first color filter 629G and the second color filter 629B) adjacent to each other in the X-axis direction, similarly to the light blocking portion 643. Therefore, the source wiring line 626 and the light blocking portion 643 at least partially overlap each other. As described above, since the extension direction (fifth direction) of the oblique wiring line portion 48 is inclined toward the same side as the extension direction (second direction) of the slit 630A with respect to the X-axis direction (first direction), the overlapping range of the light blocking portion 643 and the source wiring line 626 in the X-axis direction is less likely to change depending on the position in the extension direction of the oblique wiring line portion 48, compared with the case where the extension direction of the oblique wiring line portion 48 is orthogonal to the X-axis direction (parallel to the Y-axis direction). Accordingly, the color mixing prevention function provided by the light blocking portion 643 is favorably maintained.

Furthermore, as described above, the first angle θ1 formed between the X-axis direction and the extension direction of the slit 630A is "75°", and thus is smaller than the fourth angle θ4 (85°) formed between the X-axis direction and the extension direction of the oblique wiring line portion 48 of the source wiring line 626. With this configuration, as compared with the case where the first angle θ1 is equal to or larger than the fourth angle θ4, the response time of the liquid crystal molecules can be reduced in the case where the alignment state of the liquid crystal molecules is controlled using the electrical field generated between the common electrode 630 as the upper layer electrode and the pixel electrode 628 as the lower layer electrode, for example. As a result, the display quality can be improved.

Figure 52:
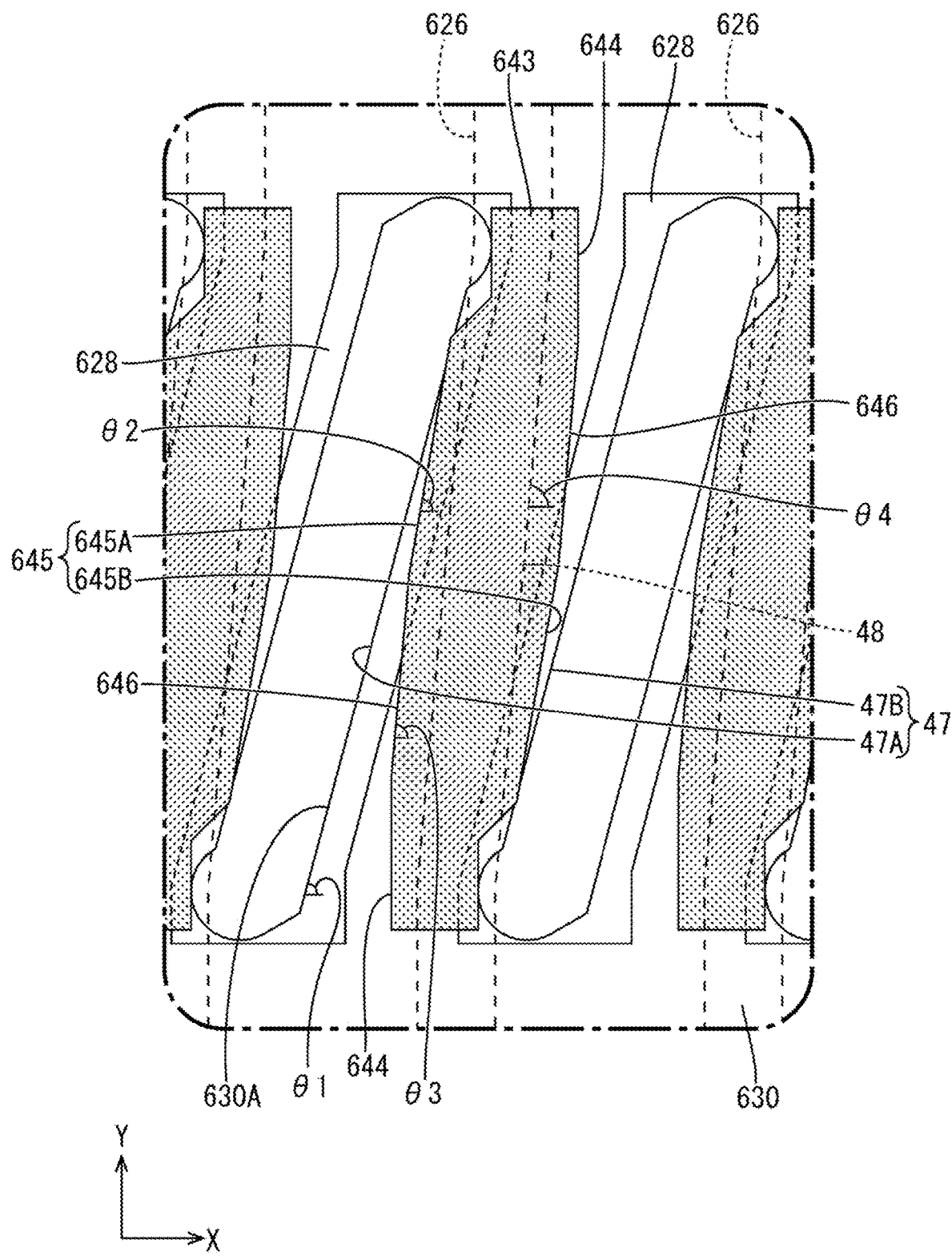
FIG. 52 is a plan view illustrating a relationship between the slit and the light blocking portion at a normal position in the display region of the liquid crystal panel according to the seventh embodiment.
Figure 53:
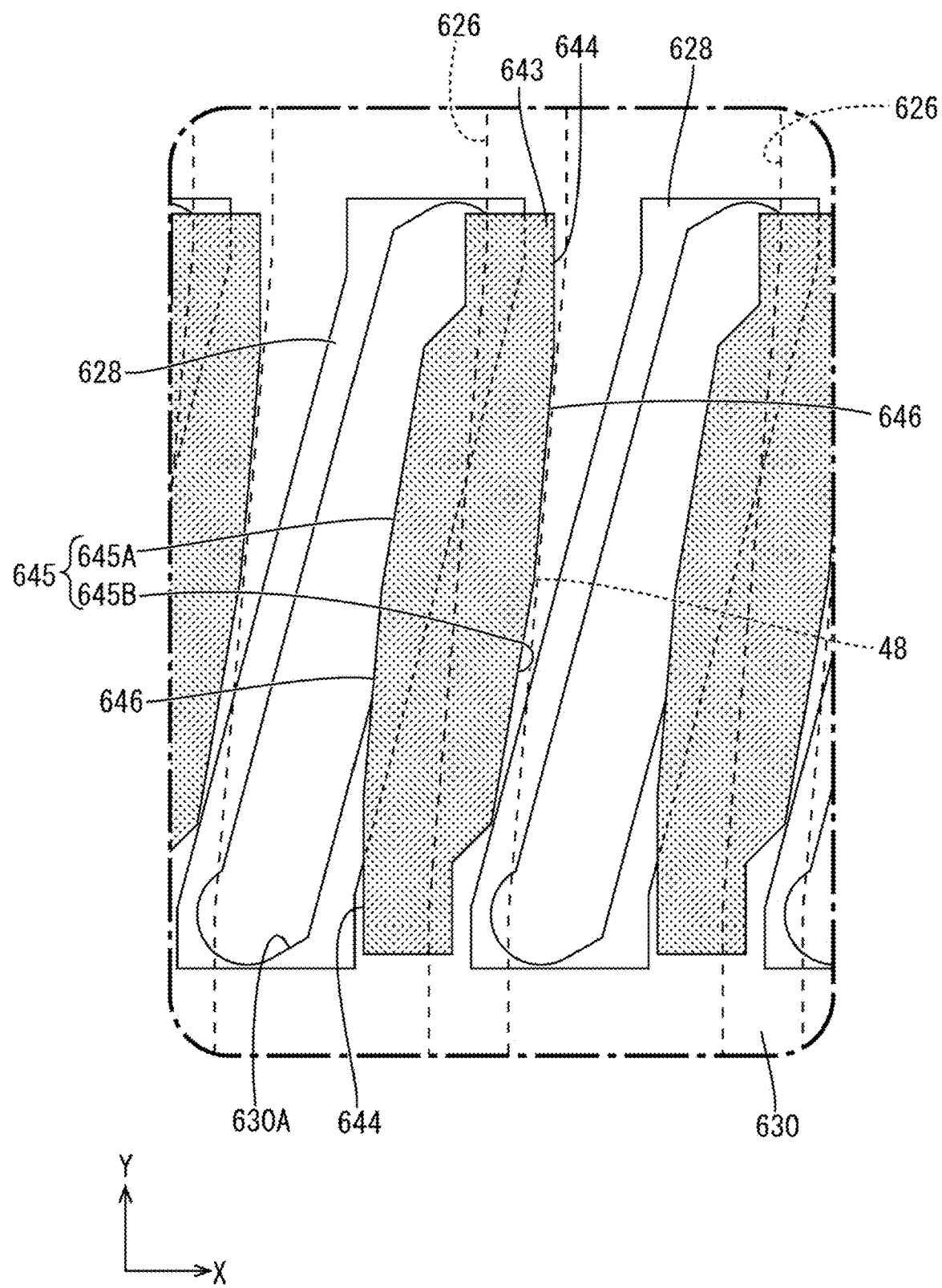
FIG. 53 is a plan view illustrating a relationship between the slit and the light blocking portion maximally displaced toward the left side, in the display region of the liquid crystal panel according to the seventh embodiment.
Figure 54:
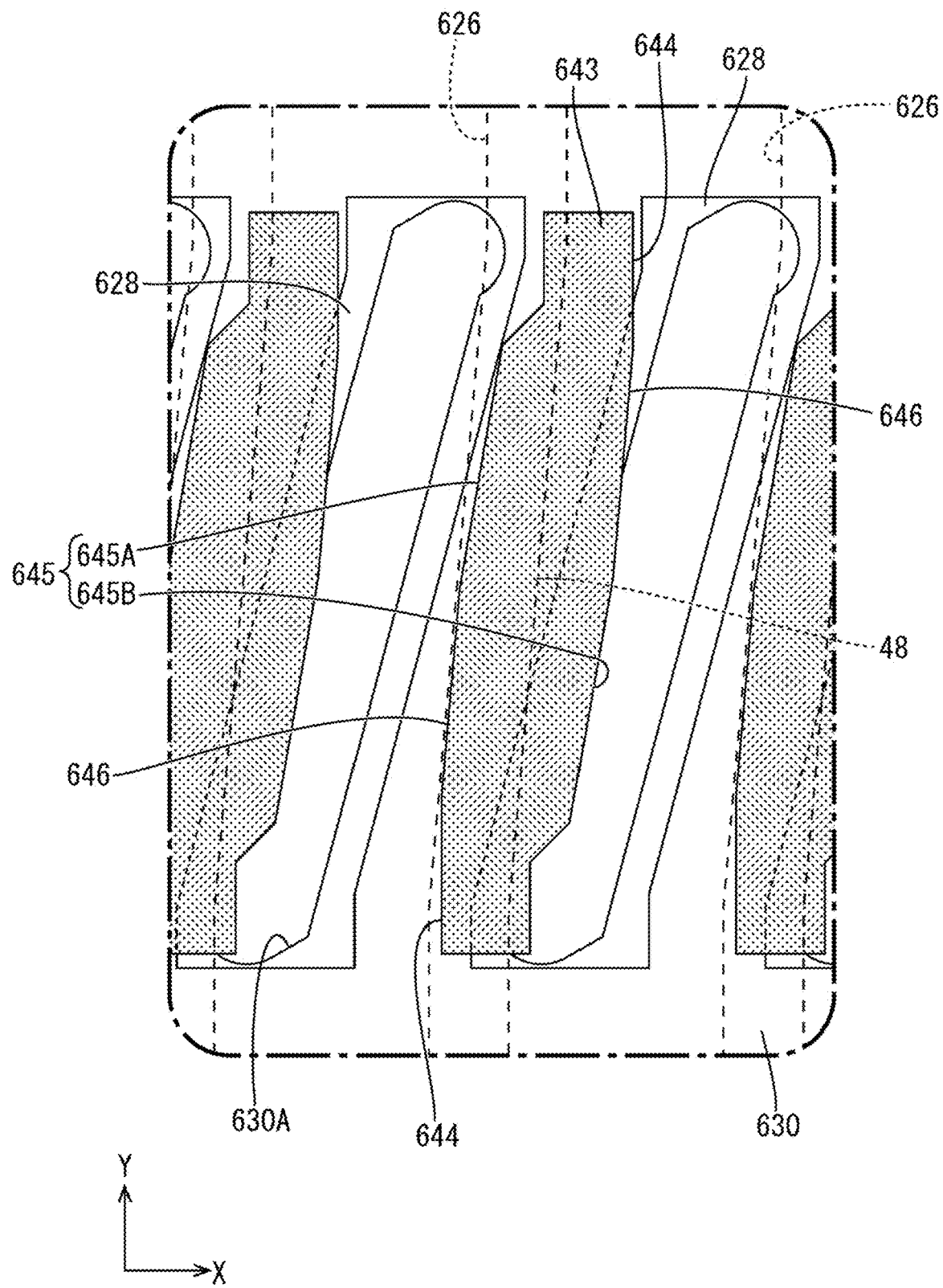
FIG. 54 is a plan view illustrating a relationship between the slit and the light blocking portion maximally displaced toward the right side, in the display region of the liquid crystal panel according to the seventh embodiment.

As illustrated in FIG. 52, the inclined portion 645 included in an end portion 644 of the light blocking portion 643 according to the present embodiment forms an angle of, for example, 80° with respect to the X-axis direction and an angle of, for example, 10° with respect to the Y-axis direction. Here, the angle formed between the X-axis direction (first direction) and the third direction which is the extension direction of the inclined portion 645 is defined as the "second angle θ2", and the second angle θ2 is, for example, 80°. Therefore, the second angle θ2 is smaller than the fourth angle θ4 (85°) and larger than the first angle θ1 (75°). The light blocking portion 643 is planarly disposed so that the center position thereof matches with the source wiring line 626 in the X-axis direction. A dimension of the portion of the light blocking portion 643 including the inclined portion 645 in the X-axis direction is larger than a dimension of the source wiring line 626 in the X-axis direction. Therefore, when the light blocking portion 643 is not displaced in the X-axis direction, the center-side portion of the light blocking portion 643 in the X-axis direction overlaps the source wiring line 626, and both end side portions of the light blocking portion 643 in the X-axis direction protrude toward both sides of the source wiring line 626, that is, do not overlap the source wiring line 626. Both end side portions of the light blocking portion 643 described above overlap the two color filters 629 (the first color filter 629G and the second color filter 629B) sandwiching the source wiring line 626 in the X-axis direction. Accordingly, the color mixing prevention function provided by the light blocking portion 643 is guaranteed.

As illustrated in FIG. 52, a third angle portion 646 included in the end portion 644 of the light blocking portion 643 according to the present embodiment extends along a sixth direction which is a direction inclined with respect to the X-axis direction and the Y-axis direction. The third angle portion 646 forms an angle of, for example, 85° with respect to the X-axis direction and forms an angle of, for example, 5° with respect to the Y-axis direction. Here, the angle formed between the X-axis direction (first direction) and the sixth direction which is the extension direction of the third angle portion 646 is defined as the "third angle θ3", and the third angle θ3 is, for example, 85° and thus is larger than the second angle θ2 (80°) described above, and equal to the fourth angle θ4 (85°) described above. With this configuration, the overlapping range in the X-axis direction between the portion of the light blocking portion 643 including the third angle portion 646 and the oblique wiring line portion 48 of the source wiring line 626 is less likely to change depending on the position in the extension direction (fifth direction) of the oblique wiring line portion 48. Accordingly, the color mixing prevention function provided by the light blocking portion 643 is more favorably maintained.

Figure 55:
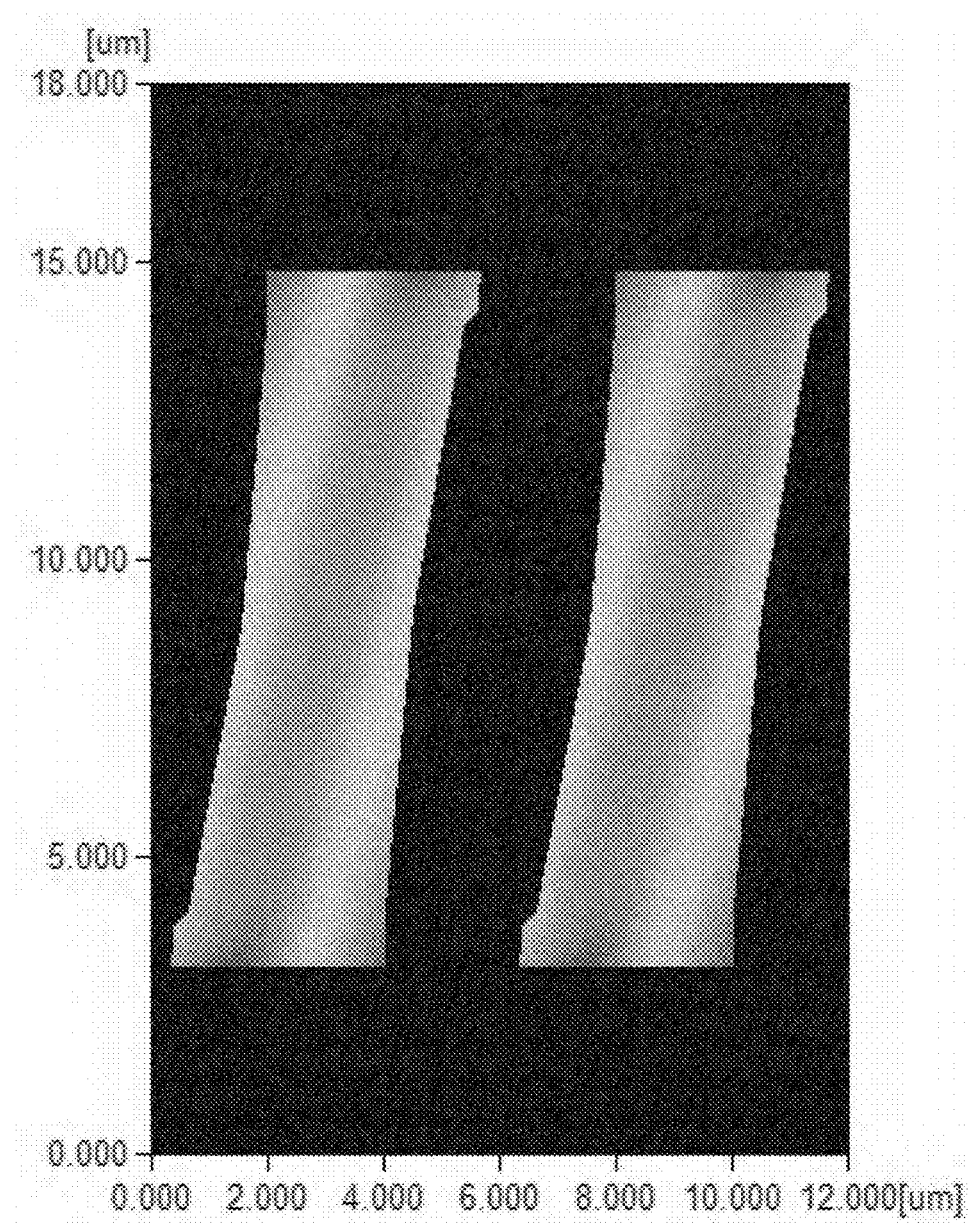
FIG. 55 is a diagram illustrating a transmittance distribution in a case where the light blocking portion is at the normal position, which is an experimental result of Example 7 of Comparative Experiment 11 according to the seventh embodiment.
Figure 56:
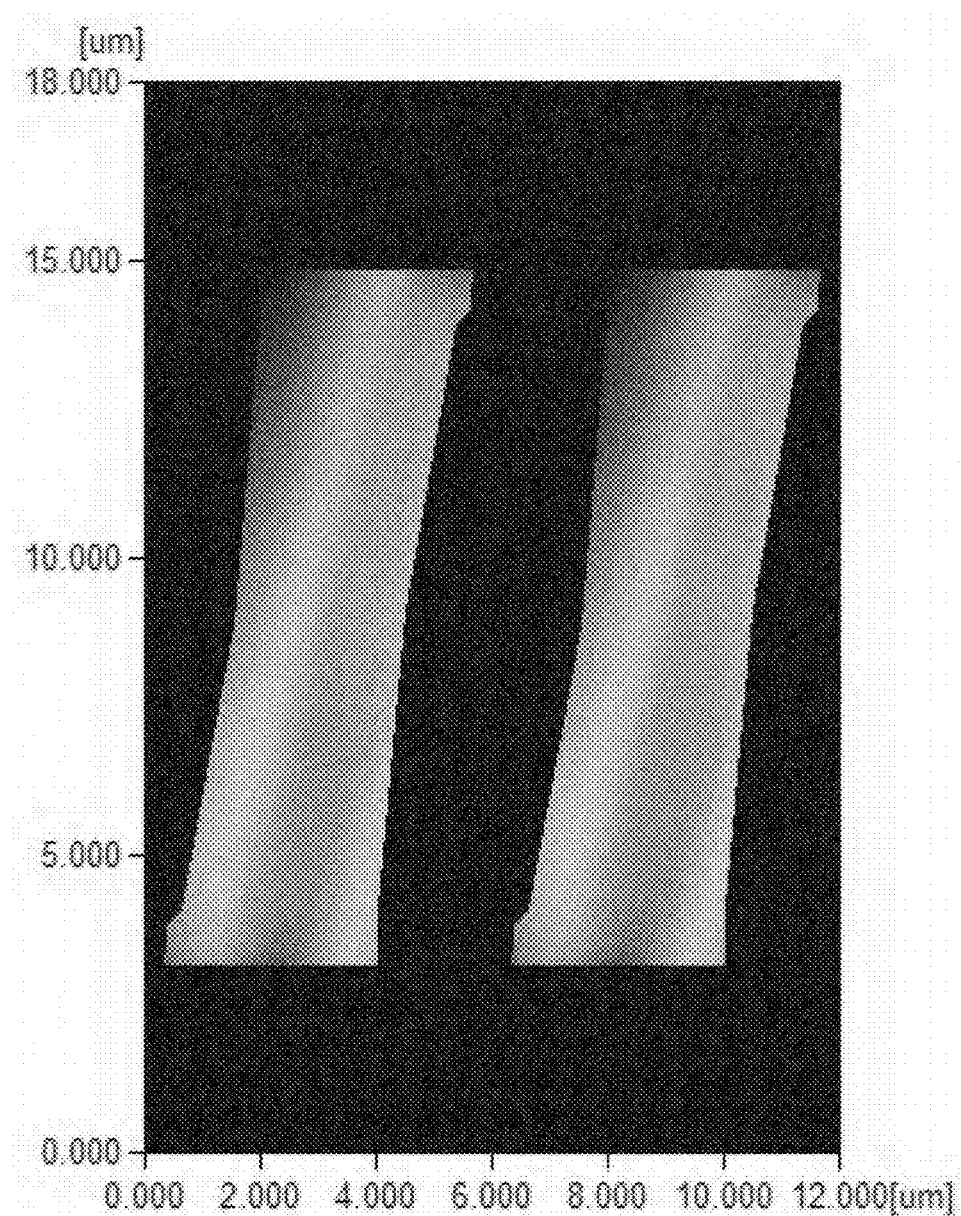
FIG. 56 is a diagram illustrating a transmittance distribution in a case where the light blocking portion is maximally displaced toward the left side, which is an experimental result of Example 7 of Comparative Experiment 11 according to the seventh embodiment.
Figure 57:
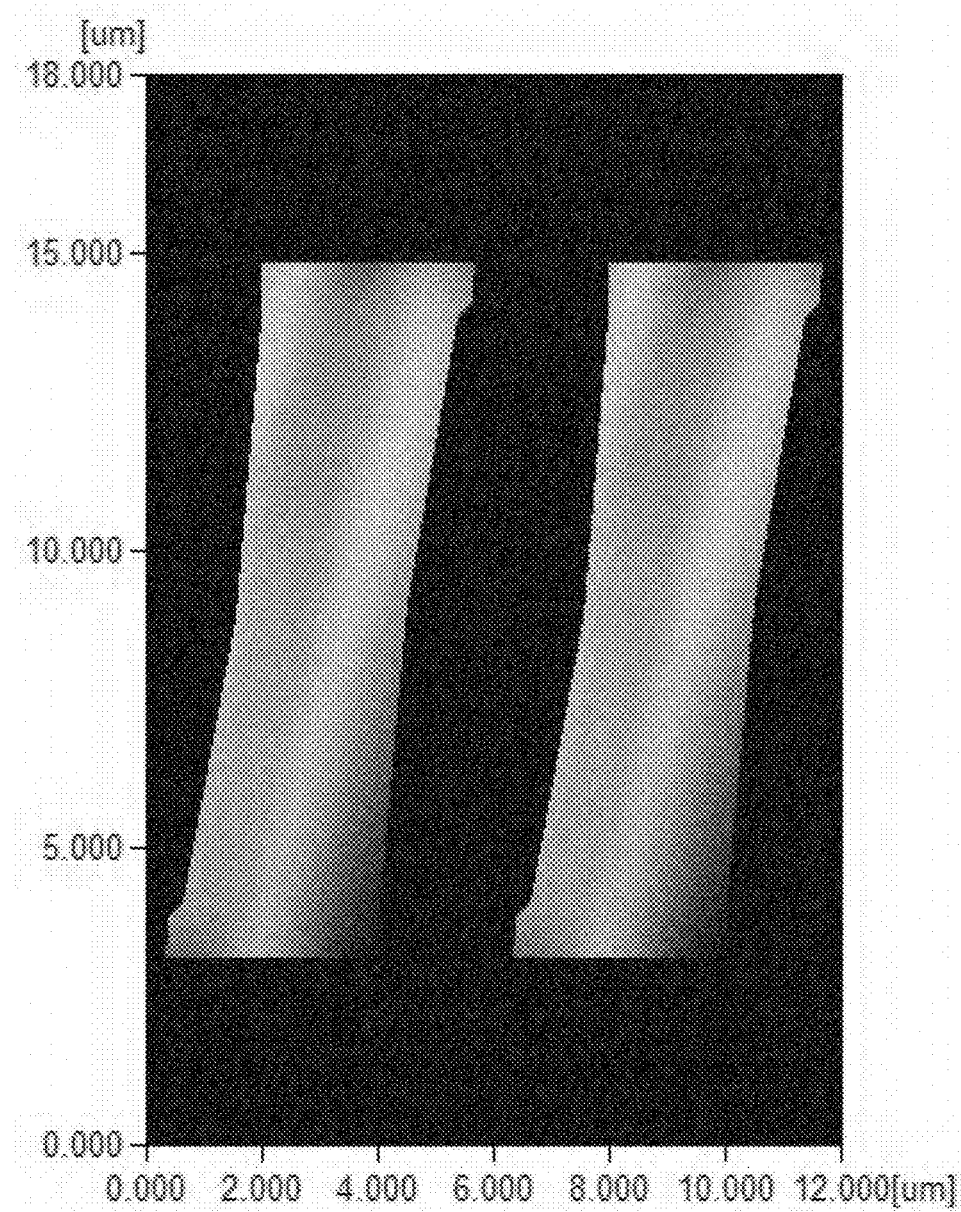
FIG. 57 is a diagram illustrating a transmittance distribution in a case where the light blocking portion is maximally displaced toward the right side, which is an experimental result of Example 7 of Comparative Experiment 11 according to the seventh embodiment.

Subsequently, in order to validate an advantage of the liquid crystal panel 11 according to the present embodiment, the following Comparative Experiments 11 and 12 were performed. First of all, a description will be given on Comparative Experiment 11. Comparative Experiment 11 is similar to Comparative Experiment 1 described in the first embodiment, and the liquid crystal panel having the configuration described in the paragraph preceding Comparative Experiment 11 is used as Example 7 (see FIGS. 52 to 54). The experimental method in Comparative Experiment 11 is as described in Comparative Experiment 1. The experimental result is as illustrated in FIG. 55 to FIG. 57. FIG. 55 illustrates a transmittance distribution under the condition that the light blocking portion 643 is not displaced with respect to the common electrode 630 (see FIG. 52). FIG. 56 illustrates a transmittance distribution under the condition that the light blocking portion 643 is maximally displaced toward the left side with respect to the common electrode 630 (see FIG. 53). FIG. 57 illustrates a transmittance distribution under the condition that the light blocking portion 643 is maximally displaced toward the right side with respect to the common electrode 630 (see FIG. 54). The transmittance distributions illustrated in FIGS. 55 to 57 are similar to the transmittance distributions illustrated in FIGS. 17 to 19.

The experimental results of Comparative Experiment 11 will be described. In Example 7, when the light blocking portion 643 is maximally displaced toward the left side in the X-axis direction with respect to the common electrode 630, as illustrated in FIG. 56, while a decrease in luminance occurs near the upper left corner portions of the pixels GPX, BPX, and RPX, the decrease is hardly visually recognized as a dark line. In Example 7, when the light blocking portion 643 is maximally displaced toward the right side in the X-axis direction with respect to the common electrode 630, as illustrated in FIG. 57, while a decrease in luminance occurs near the lower right corner portions of the pixels GPX, BPX, and RPX, the decrease is hardly visually recognized as a dark line. As described above, according to FIGS. 55 to 57, in Example 7, the luminance is about 2% lower than that in Example 3 (FIG. 35 to FIG. 37) of Comparative Experiment 5 described in the third embodiment described above, but the decrease in luminance is suppressed to a degree equivalent to that in Example 1 (FIGS. 17 to 19) of Comparative Experiment 1 described in the first embodiment, and the dark line is sufficiently less likely to be visually recognized.

Figure 58:
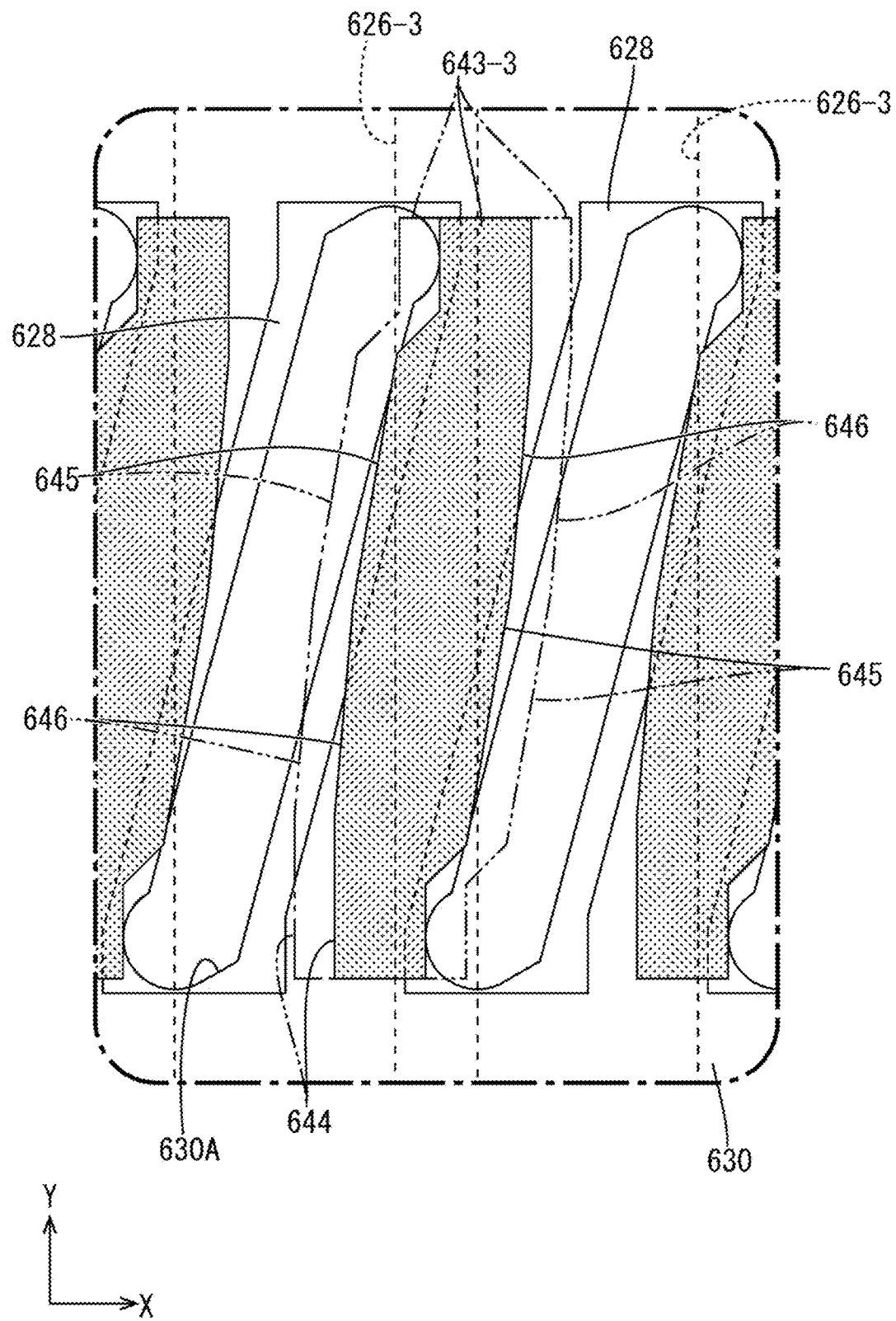
FIG. 58 is a plan view illustrating a relationship between the slit and the light blocking portion at the normal position in a display region of a liquid crystal panel according to Comparative Example 3 of Comparative Experiment 12 according to the seventh embodiment.
Figure 59:
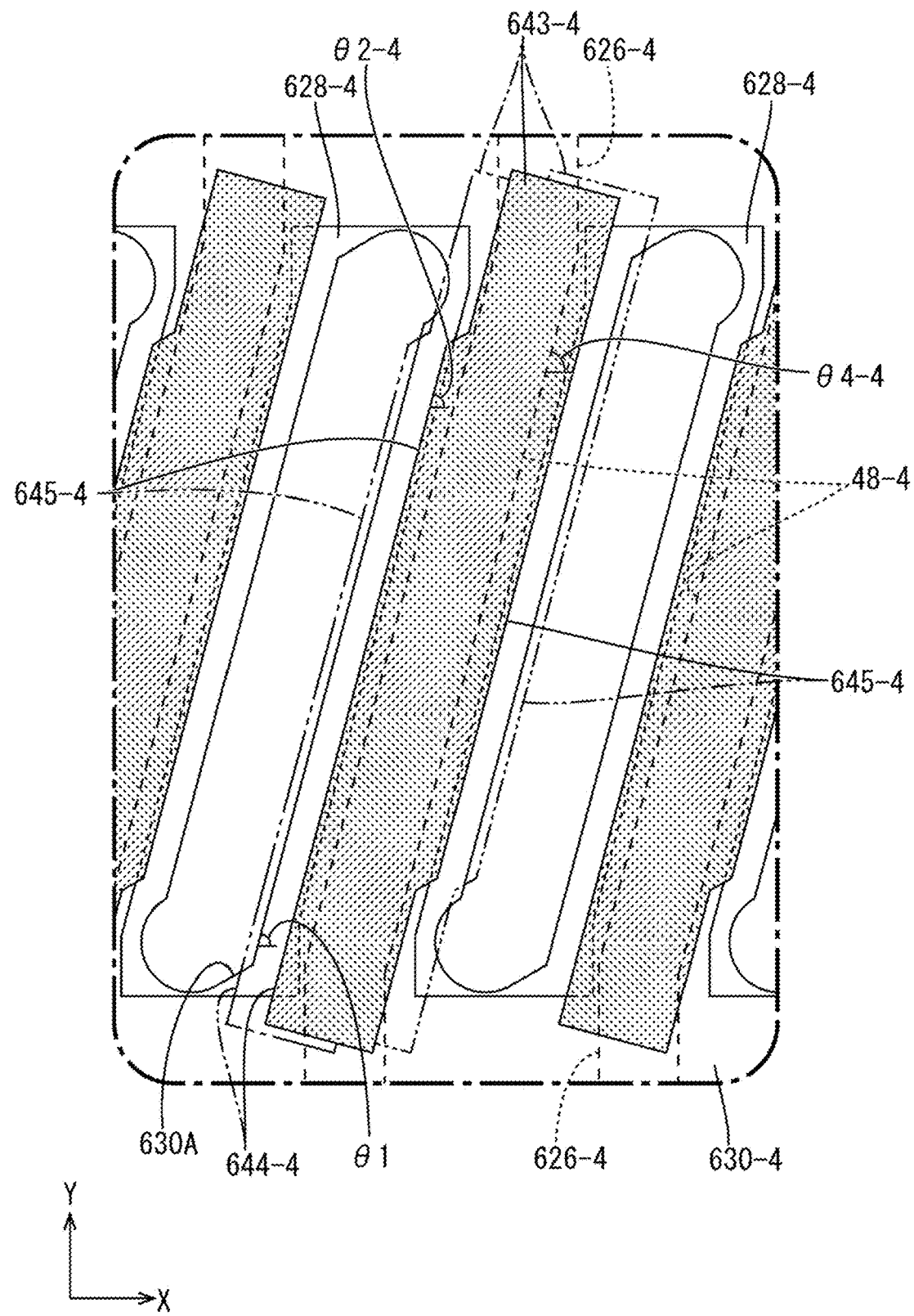
FIG. 59 is a plan view illustrating a relationship between the slit and the light blocking portion at the normal position in a display region of a liquid crystal panel according to Comparative Example 4 of Comparative Experiment 12 according to the seventh embodiment.
Figure 60:
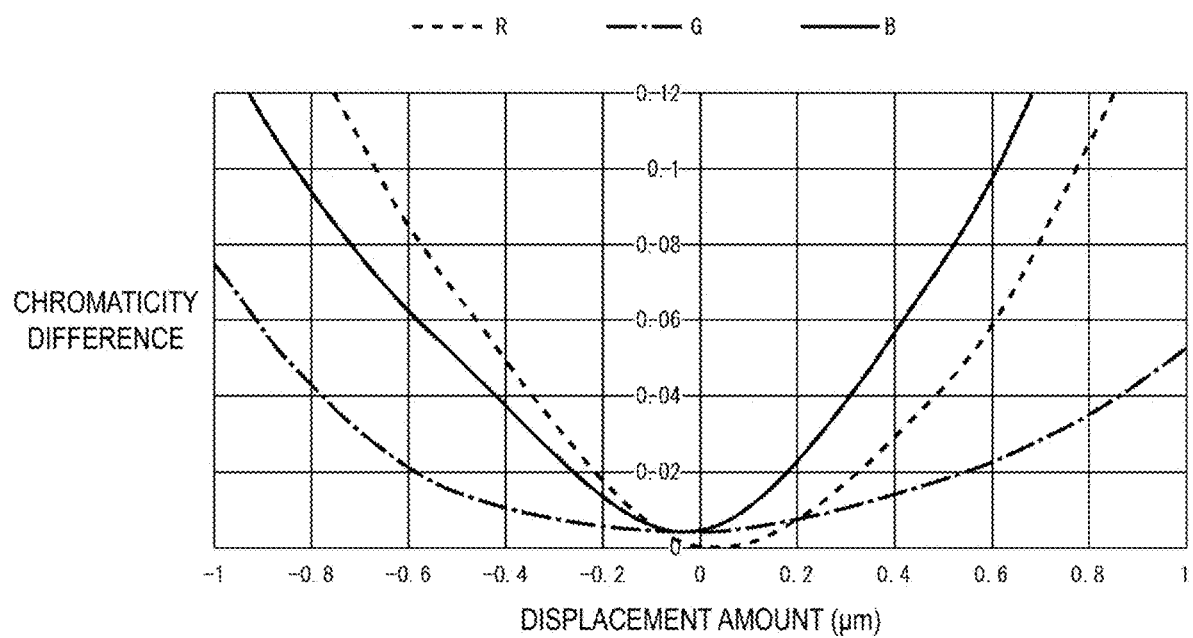
FIG. 60 is a graph illustrating a relationship between a displacement amount of the light blocking portion in the X-axis direction and a chromaticity difference generated in each pixel due to the displacement of the light blocking portion, which is an experimental result of Comparative Example 3 of Comparative Experiment 12 according to the seventh embodiment.
Figure 61:
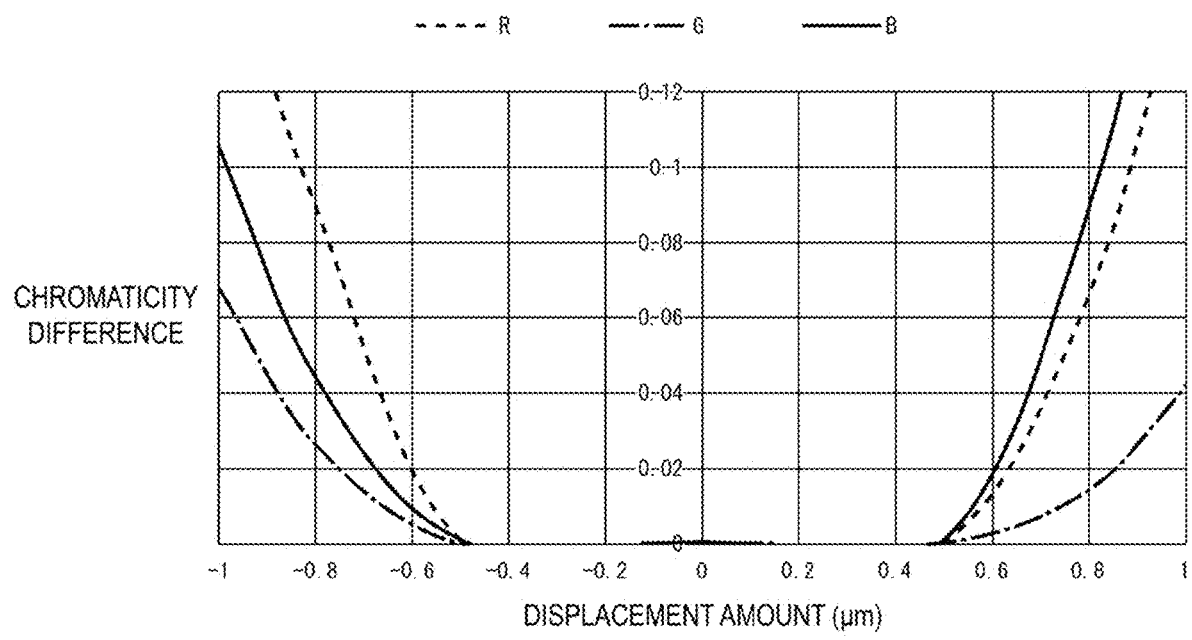
FIG. 61 is a graph illustrating a relationship between a displacement amount of the light blocking portion in the X-axis direction and a chromaticity difference generated in each pixel due to the displacement of the light blocking portion, which is an experimental result of Comparative Example 4 of Comparative Experiment 12 according to the seventh embodiment.
Figure 62:
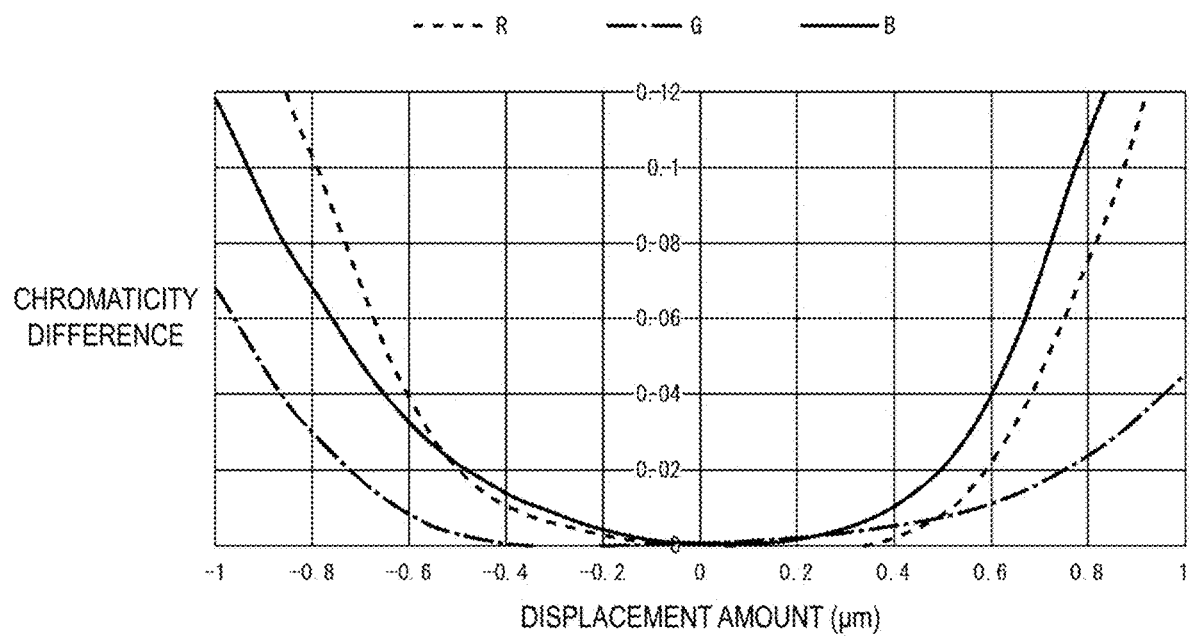
FIG. 62 is a graph illustrating a relationship between a displacement amount of the light blocking portion in the X-axis direction and a chromaticity difference generated in each pixel due to the displacement of the light blocking portion, which is an experimental result of Example 7 of Comparative Experiment 12 according to the seventh embodiment.

Next, a description will be given on Comparative Experiment 12. In Comparative Experiment 12, the liquid crystal panel according to Example 7 described in Comparative Experiment 11 and a liquid crystal panel with a configuration changed in various ways according to Comparative Examples 3 and 4 were used. The configuration of the liquid crystal panel according to Comparative Example 3 is as illustrated in FIG. 58, and the configuration of the liquid crystal panel according to Comparative Example 4 is as illustrated in FIG. 59. FIGS. 58 and 59 are plan views in cases where light blocking portions 643-3 and 643-4 are at the normal position with respect to the common electrode 630. In FIG. 58 and FIG. 59, the light blocking portions 643-3 and 643-4 are illustrated in a shaded manner, and the outer shape of the light blocking portions 643-3 and 643-4 maximally displaced toward each of the left and right sides in the X-axis direction is indicated by a two-dot chain line. The liquid crystal panels according to Comparative Examples 3 and 4 have the same configuration as the liquid crystal panel according to Example 7 except for the configuration described below. As illustrated in FIG. 58, a source wiring line 626-3 included in the liquid crystal panel according to Comparative Example 3 extends substantially straight along the Y-axis direction and does not include the oblique wiring line portion 48 (see FIG. 52). As illustrated in FIG. 59, an oblique wiring line portion 48-4 of a source wiring line 626-4 in the liquid crystal panel according to Comparative Example 4 has a fourth angle θ4-4 of 75°. An end portion 644-4 of the light blocking portion 643-4 in the liquid crystal panel according to Comparative Example 4 is formed as an inclined portion 645-4 over the entire length, with a second angle θ2-4 being 75°. In the liquid crystal panel according to Comparative Example 4, the second angle θ2-4 and the fourth angle θ4-4 are equal to the first angle θ1. In Comparative Experiment 12, for the liquid crystal panels according to Example 7 and Comparative Examples 3 and 4, the relationship between the displacement amount of the light blocking portion 643, 643-3, 643-4 in the X-axis direction and the chromaticity difference generated in each of the pixels GPX, BPX, and RPX due to the displacement of the light blocking portion 643, 643-3, 643-4 was examined, as in Comparative Experiment 2 described in the first embodiment described above. The experimental method in Comparative Experiment 12 is as described in Comparative Experiment 2. The experimental result is as illustrated in FIG. 60 to FIG. 62. FIG. 60 illustrates the experimental result of Comparative Example 3. FIG. 61 illustrates the experimental result of Comparative Example 4. FIG. 62 illustrates the experimental result of Example 7. The graphs illustrated in FIGS. 60 to 62 are similar to the graphs illustrated in FIGS. 23 and 24.

The experimental results of Comparative Experiment 12 will be described. According to FIG. 60, it can be seen that in Comparative Example 3, only a slight displacement of about ±0.1 μm has led to a large change in chromaticity. In Comparative Example 3, a chromaticity difference occurs even with no displacement (a state where the displacement amount is 0 μm). Thus, it can be said that the light blocking portion 643-3 in Comparative Example 3 cannot sufficiently exhibit the color mixing prevention function. According to FIG. 61, it can be seen that in Comparative Example 4, the chromaticity is hardly changed by displacement of about ±0.5 μm, and the chromaticity tends to sharply change when displacement exceeding ±0.5 μm occurs. Thus, it can be said that the light blocking portion 643-4 in Comparative Example 4 can sufficiently exhibit the color mixing prevention function. However, in Comparative Example 4, when the light blocking portion 643-4 is displaced in the X-axis direction, the light blocking portion 643-4 overlaps a pixel electrode 628-4 over the entire length in the Y-axis direction. Therefore, there is a concern that the transmittance may be significantly reduced. Furthermore, the wiring line length of the source wiring line 626-4 is long, and thus the wiring line resistance thereof might be large or the capacitance generated between the source wiring and the common electrode 630-4 might be large. On the other hand, according to FIG. 62, in Example 7, the chromaticity is hardly changed by displacement of about ±0.2 µm, and the change rate of the chromaticity is kept sufficiently low (chromaticity difference of about 0.02 or less) from about ±0.2 µm to about ±0.5 µm. Thus, it can be said that the light blocking portion 643 in Example 7 can sufficiently exhibit the color mixing prevention function. Compared with Comparative Example 4 (see FIG. 61), the color mixing prevention function provided by Example 7 is slightly low. However, Example 7 is superior to Comparative Example 4 in that the transmittance is kept high and the wiring line resistance of the source wiring line 626 and the capacitance that may be generated between the source wiring line 626 and the common electrode 630 are suppressed. In addition, in Example 7, a color mixing prevention function equivalent to that in Example 3 (see FIG. 38) of Comparative Experiment 6 described in the third embodiment is achieved. Thus, it can be said that Example 7 can provide a color mixing prevention function that is lower than that in Comparative Example 4, but is equivalent to that in Example 3 of Comparative Experiment 6.

As described above, the liquid crystal panel (display device) 11 of the present embodiment includes the source wiring line (wiring line) 626 disposed more on the lower layer side than the first color filter 629G and the second color filter 629B, at the boundary between the first color filter 629G and the second color filter 629B, and the first color filter 629G, the second color filter 629B, and the source wiring line 626 each extend along the fifth direction inclined toward the same side as the second direction with respect to the first direction.

The first color filter 629G and the second color filter 629B extend along the fifth direction inclined with respect to the first direction, and the source wiring line 626 disposed at the boundary between the first color filter 629G and the second color filter 629B also extends along the fifth direction. The light blocking portion 643 and the source wiring line 626 are both disposed at the boundary between the first color filter 629G and the second color filter 629B and thus at least partially overlap each other. Since the fifth direction, which is the extension direction of the source wiring line 626, is inclined toward the same side as the second direction with respect to the first direction, the overlapping range of the light blocking portion 643 and the source wiring line 626 in the first direction is less likely to change depending on the position in the fifth direction, compared with the case where the fifth direction is orthogonal to the first direction. Accordingly, the color mixing prevention function provided by the light blocking portion 643 is favorably maintained.

The slit 630A is designed with the first angle θ1 being smaller than the fourth angle θ4 which is an angle formed by the fifth direction with respect to the first direction. With this configuration, as compared with the case where the first angle θ1 is equal to or larger than the fourth angle θ4, the response time of the liquid crystal molecules can be reduced in the case where the alignment state of the liquid crystal molecules is controlled using the electrical field generated between the common electrode 630 as the upper layer electrode and the pixel electrode 628 as the lower layer electrode, for example. As a result, the display quality can be improved.

The end portion 644 of the light blocking portion 643 includes the third angle portion 646 forming the third angle θ3 larger than the second angle θ2 with respect to the first direction, and the first color filter 629G, the second color filter 629B, and the source wiring line 626 are designed with the fourth angle θ4 formed by the fifth direction with respect to the first direction being equal to the third angle θ3. The overlapping range of the portion of the light blocking portion 643 including the third angle portion 646 and the source wiring line 626 in the first direction is less likely to change depending on the position in the fifth direction. Accordingly, the color mixing prevention function provided by the light blocking portion 643 is more favorably maintained.

A dimension of the portion of the light blocking portion 643 including the inclined portion 645 in the first direction is larger than a dimension of the source wiring line 626 in the first direction. When the light blocking portion 643 is not displaced in the first direction, each part of the light blocking portion 643 does not overlap the source wiring line 626 and overlaps the first color filter 629G and the second color filter 629B. Accordingly, the color mixing prevention function provided by the light blocking portion 643 is guaranteed.

Eighth Embodiment

An eighth embodiment will be described with reference to FIGS. 63 to 69. This eighth embodiment illustrates a case with a source wiring line 726 and a color filter 729 with a configuration changed from that in the seventh embodiment described above. Further, repetitive descriptions of structures, actions, and effects similar to those of the seventh embodiment described above will be omitted.

Figure 63:
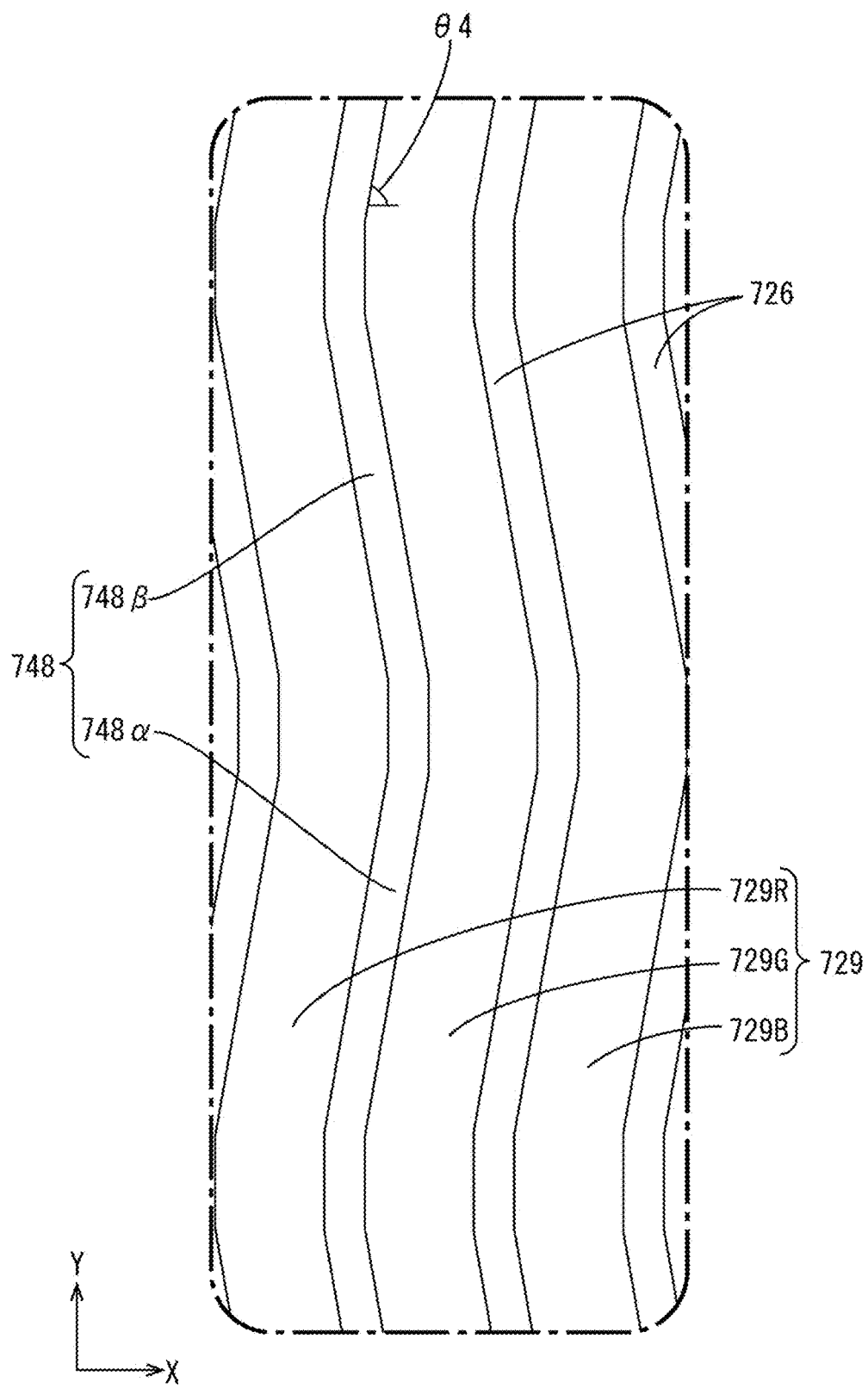
FIG. 63 is a plan view illustrating a source wiring line and a color filter in a display region of a liquid crystal panel according to an eighth embodiment.
Figure 64:
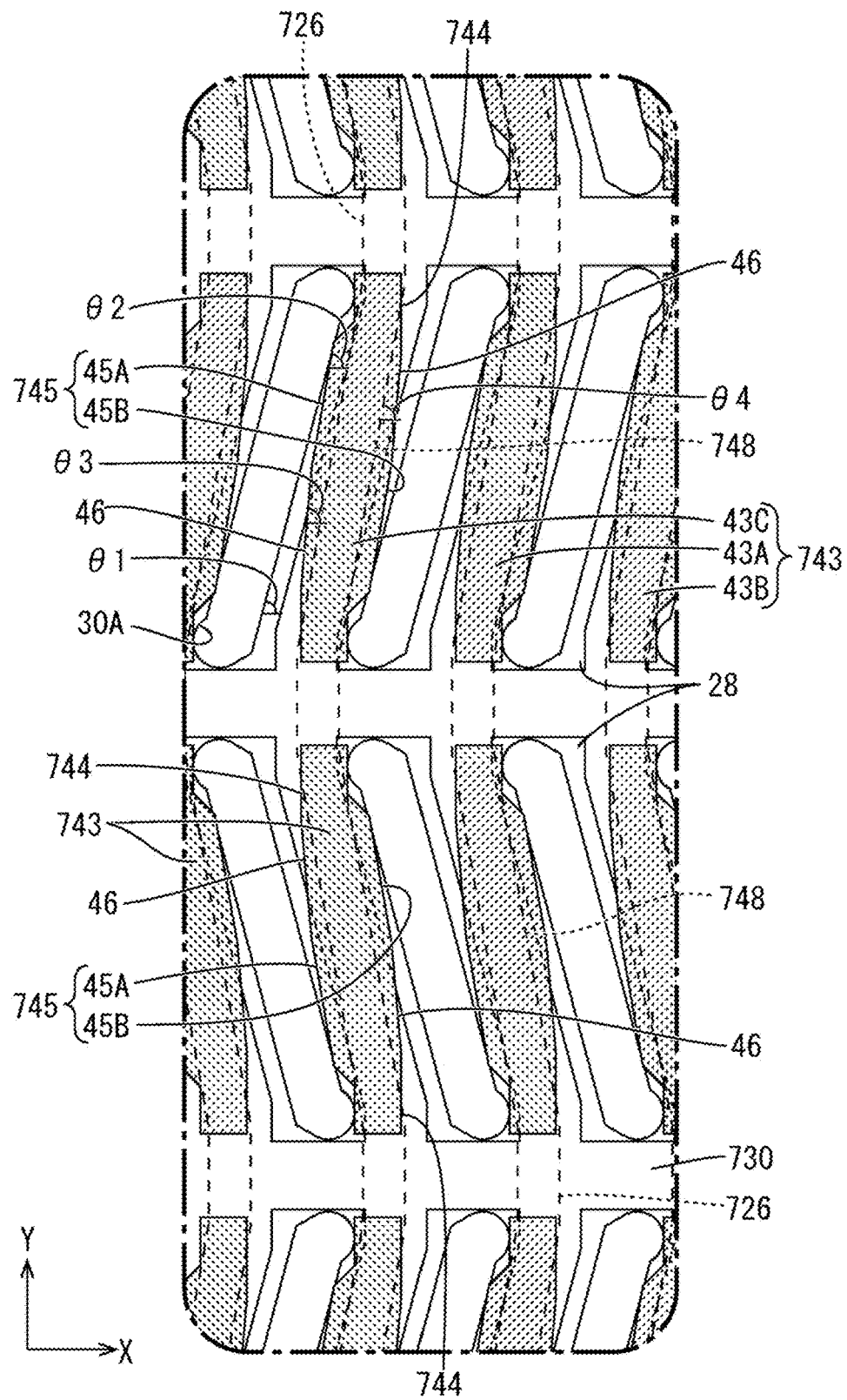
FIG. 64 is a plan view illustrating the source wiring line, a pixel electrode, a slit, and a light blocking portion in the display region of the liquid crystal panel according to the eighth embodiment.
Figure 65:
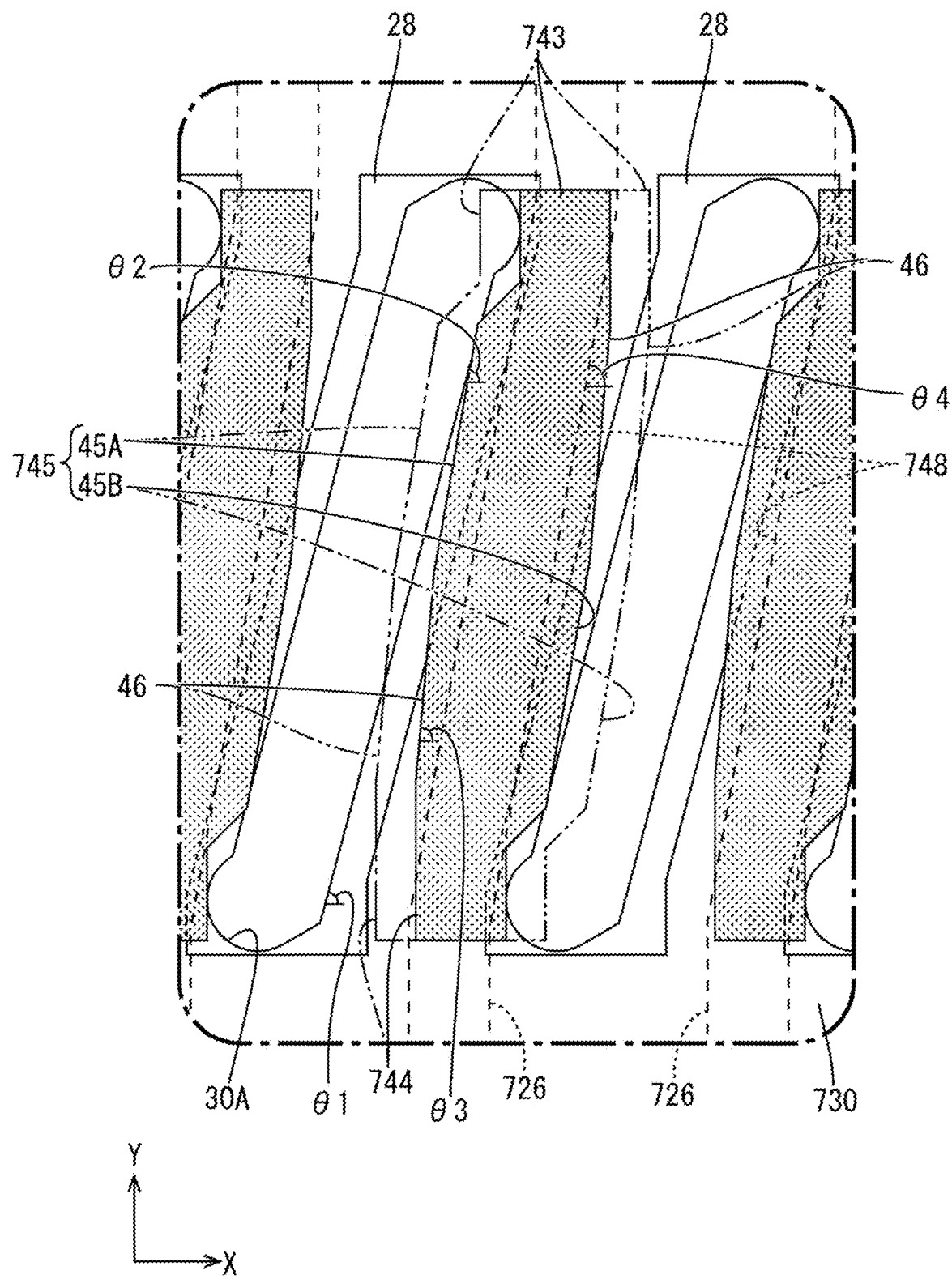
FIG. 65 is a plan view illustrating a relationship between the slit and the light blocking portion at a normal position in the display region of the liquid crystal panel according to the eighth embodiment.

As illustrated in FIG. 63, the source wiring line 726 according to the present embodiment has an oblique wiring line portion 748 extending along the fifth direction inclined with respect to the X-axis direction and the Y-axis direction, and forming an angle of, for example, 80° with respect to the X-axis direction and forms an angle of, for example, 10° with respect to the Y-axis direction. That is, in the present embodiment, the fourth angle θ4 is 80°. The color filter 729 (a first color filter 729G, a second color filter 729B, and a third color filter 729R), similarly to the source wiring line 726, extends along the fifth direction which is a direction inclined with respect to the X-axis direction and the Y-axis direction, and a portion extending along the fifth direction is substantially parallel to the oblique wiring line portion 748 of the source wiring line 726. The portion of the color filter 729 extending along the fifth direction forms an angle of, for example, 80° with respect to the X-axis direction, and forms an angle of, for example, 10° with respect to the Y-axis direction. On the other hand, as illustrated in FIG. 64 and FIG. 65, an inclined portion 745 included in an end portion 744 of a light blocking portion 743 forms an angle of, for example, 80° with respect to the X-axis direction and an angle of, for example, 10° with respect to the Y-axis direction. That is, in the present embodiment, the second angle θ2 is 80°. As described above, the color filter 729 and the source wiring line 726 have the fourth angle θ4, which is an angle formed between the X-axis direction and the fifth direction, being equal to the second angle θ2, which is an angle formed between the X-axis direction and the extension direction of the inclined portion 745. With this configuration, the overlapping range in the X-axis direction between the portion of the light blocking portion 743 including the inclined portion 745 and the source wiring line 726 is less likely to change depending on the position in the extension direction of the oblique wiring line portion 748. Accordingly, the color mixing prevention function provided by the light blocking portion 743 is more favorably maintained.

Figure 66:
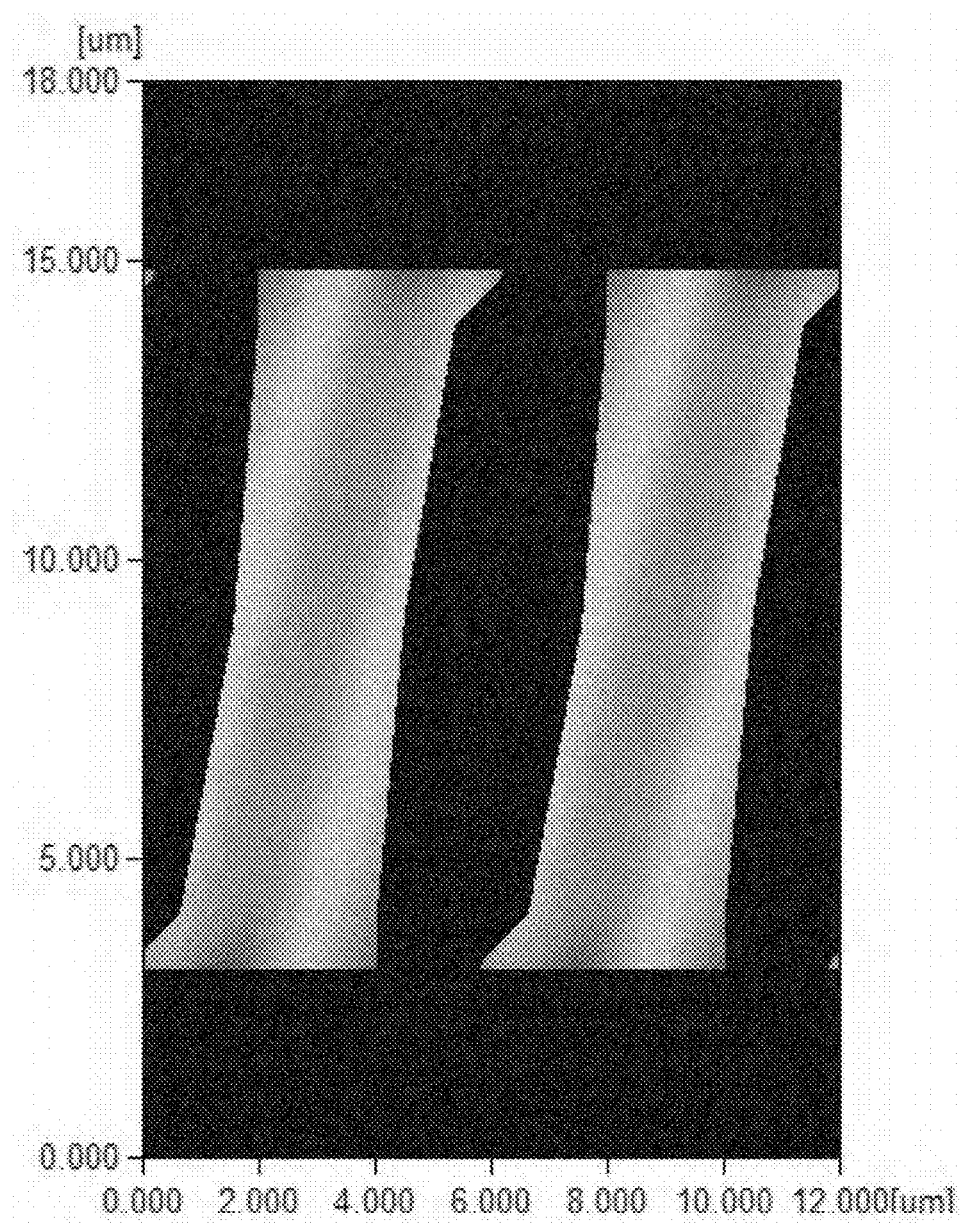
FIG. 66 is a diagram illustrating a transmittance distribution in a case where the light blocking portion is at the normal position, which is an experimental result of Example 8 of Comparative Experiment 13 according to the eighth embodiment.
Figure 67:
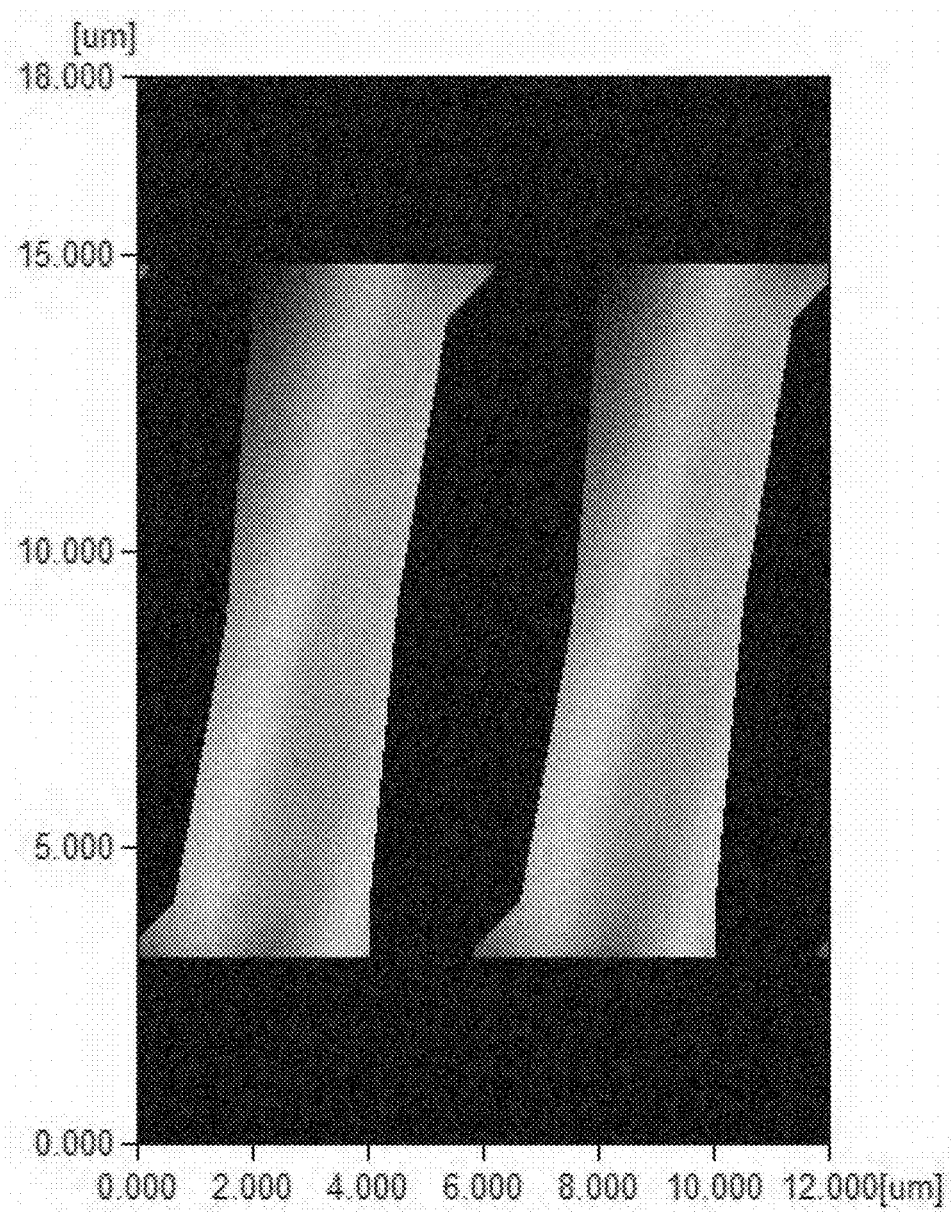
FIG. 67 is a diagram illustrating a transmittance distribution in a case where the light blocking portion is maximally displaced toward the left side, which is an experimental result of Example 8 of Comparative Experiment 13 according to the eighth embodiment.
Figure 68:
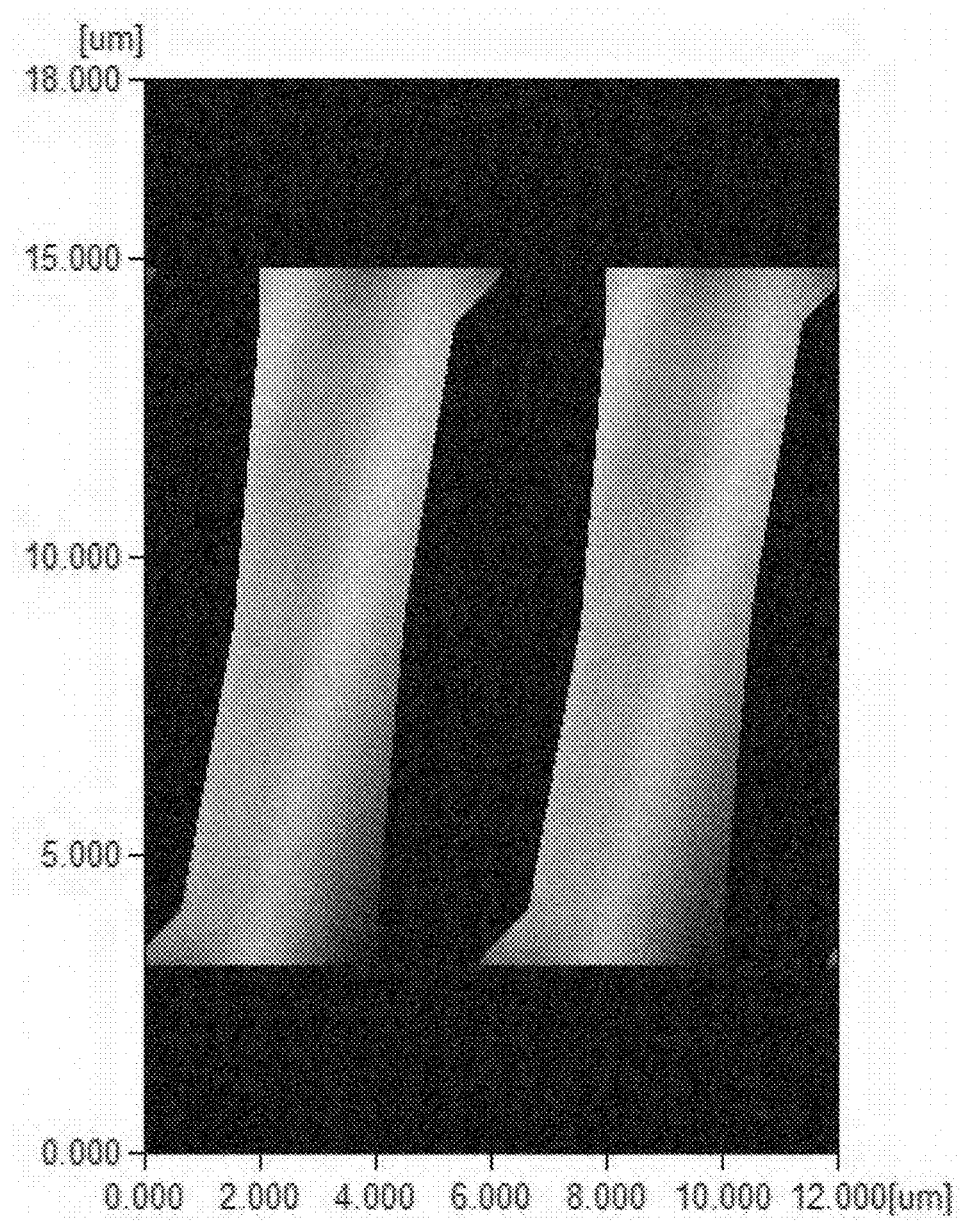
FIG. 68 is a diagram illustrating a transmittance distribution in a case where the light blocking portion is maximally displaced toward the right side, which is an experimental result of Example 8 of Comparative Experiment 13 according to the eighth embodiment.

Subsequently, in order to validate an advantage of the liquid crystal panel 11 according to the present embodiment, the following Comparative Experiments 13 and 14 were performed. First of all, a description will be given on Comparative Experiment 13. Comparative Experiment 13 is similar to Comparative Experiment 1 described in the first embodiment, and the liquid crystal panel having the configuration described in the paragraph preceding Comparative Experiment 13 is used as Example 8 (see FIG. 65). The experimental method in Comparative Experiment 13 is as described in Comparative Experiment 1. The experimental result is as illustrated in FIG. 66 to FIG. 68. FIG. 66 illustrates a transmittance distribution under the condition that the light blocking portion 743 is not displaced with respect to the common electrode 730. FIG. 67 illustrates a transmittance distribution under the condition that the light blocking portion 743 is maximally displaced toward the left side with respect to the common electrode 730. FIG. 68 illustrates a transmittance distribution under the condition that the light blocking portion 743 is maximally displaced toward the right side with respect to the common electrode 730. The transmittance distributions illustrated in FIGS. 66 to 68 are similar to the transmittance distributions illustrated in FIGS. 17 to 19.

The experimental results of Comparative Experiment 13 will be described. In Example 8, when the light blocking portion 743 is maximally displaced toward the left side in the X-axis direction with respect to the common electrode 730, as illustrated in FIG. 67, while a decrease in luminance occurs near the upper left corner portions of the pixels GPX, BPX, and RPX, the decrease is hardly visually recognized as a dark line. In Example 7, when the light blocking portion 743 is maximally displaced toward the right side in the X-axis direction with respect to the common electrode 730, as illustrated in FIG. 68, while a decrease in luminance occurs near the lower right corner portions of the pixels GPX, BPX, and RPX, the decrease is hardly visually recognized as a dark line. As described above, according to FIGS. 66 to 68, in Example 8, the luminance is about 1% lower than that in Example 3 (FIG. 35 to FIG. 37) of Comparative Experiment 5 described in the third embodiment described above, but the luminance is slightly higher than that in Example 7 (see FIG. 55 to FIG. 57) of Comparative Experiment 11 described above, and the decrease in luminance is suppressed to a degree equivalent to that in Example 1 (FIGS. 17 to 19) of Comparative Experiment 1 described in the first embodiment, and the dark line is less likely to be visually recognized.

Figure 69:
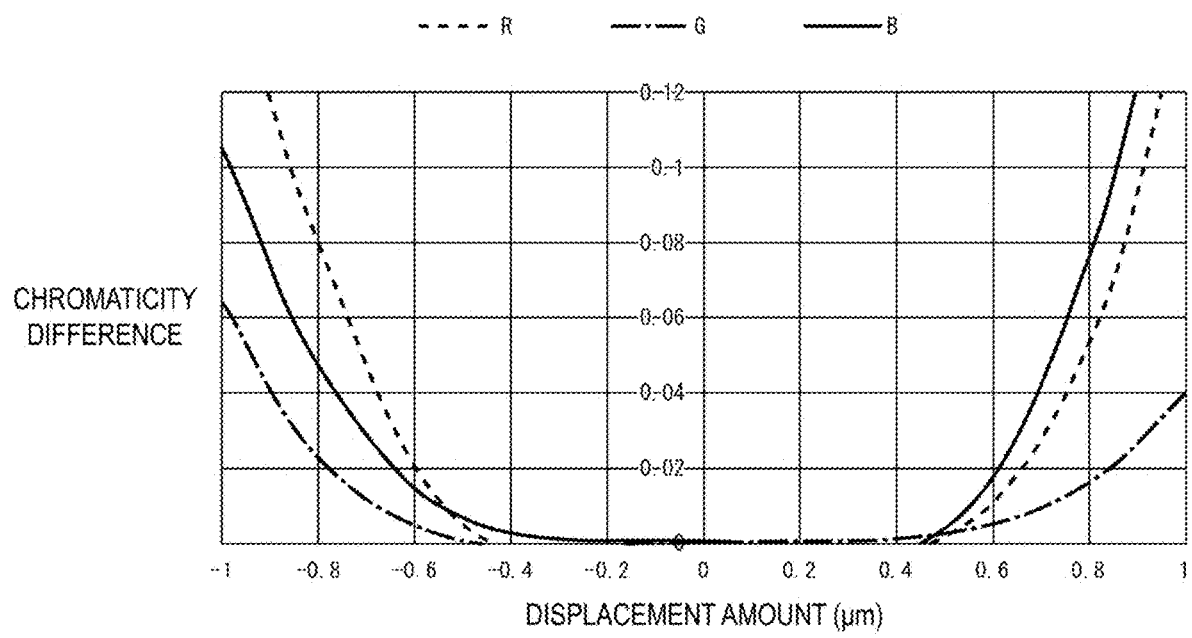
FIG. 69 is a graph illustrating a relationship between a displacement amount of the light blocking portion in the X-axis direction and a chromaticity difference generated in each pixel due to the displacement of the light blocking portion, which is an experimental result of Example 8 of Comparative Experiment 14 according to the eighth embodiment.

Next, a description will be given on Comparative Experiment 14. In Comparative Experiment 14, using the liquid crystal panel according to Example 8 described in Comparative Experiment 13 described above, the relationship between the displacement amount of the light blocking portion 743 in the X-axis direction and the chromaticity difference generated in each of the pixels GPX, BPX, and RPX due to the displacement of the light blocking portion 743 was examined, as in Comparative Experiment 2 described in the first embodiment described above. The experimental method in Comparative Experiment 14 is as described in Comparative Experiment 2. The experimental result is as illustrated in FIG. 69. The graph illustrated in FIG. 69 is similar to the graphs illustrated in FIGS. 23 and 24.

The experimental results of Comparative Experiment 14 will be described. According to FIG. 69, in Example 8, the chromaticity is hardly changed by displacement of about ±0.3 μm, and the change rate of the chromaticity is kept sufficiently low (chromaticity difference of about 0.02 or less) from about ±0.3 μm to about ±0.6 μm. Therefore, the light blocking portion 743 in Example 8 can sufficiently exhibit the color mixing prevention function, and a color mixing prevention function superior to that of Example 7 (see FIG. 62) of Comparative Experiment 12 described above is achieved. In addition, the light blocking portion 743 in Example 8 can achieve a color mixing prevention function equivalent to that in Example 2 (see FIG. 31) of Comparative Experiment 4 described above.

As described above, in the liquid crystal panel (display device) 11 according to the present embodiment, the first color filter 729G, the second color filter 729B, and the source wiring line 726 have the fourth angle θ4 which is the angle formed by the fifth direction with respect to the first direction being equal to the second angle θ2. The overlapping range of the portion of the light blocking portion 743 including the inclined portion 745 and the source wiring line 726 in the first direction is less likely to change depending on the position in the fifth direction. Accordingly, the color mixing prevention function provided by the light blocking portion 743 is more favorably maintained.

Other Embodiments

The techniques disclosed herein are not limited to the embodiments described above and illustrated in the drawings, and the following embodiments, for example, are also included within the technical scope.

(1) A specific numerical value of the second angle θ2 which is an angle formed by the inclined portion 45, 145, 245, 345, 445, 545, 645, 745 with respect to the X-axis direction may be a numerical value other than 87°, 85°, or 83°. Also in such a case, the second angle θ2 is preferably in a range having an upper limit value of 87° and a lower limit value that is larger than the first angle θ1 by 3°.

(2) A specific numerical value of the first angle θ1 which is an angle formed by the slit 30A, 130A, 230A, 330A, 430A, 530A, 630A with respect to the X-axis direction may be a numerical value other than 80°. When the numerical value of the first angle θ1 is changed, it is possible to appropriately change the lower limit value of the numerical value range of the second angle θ2.

(3) In the first to the sixth embodiments described above, the third angle θ3 which is an angle formed by the third angle portion as the "straight portion 46, 146, 446, 546" with respect to the X-axis direction may be larger or smaller than 90°.

(4) The light blocking portion 43, 143, 243, 343, 443, 543, 643, 743 may be configured such that the boundary BO between the inclined portion 45, 145, 245, 345, 445, 545, 645, 745 and the straight portion 46, 146, 446, 546 (the third angle portion 646) included in the end portion 44, 144, 244, 344, 444, 544, 644, 744 is located outside the slit 30A, 130A, 230A, 330A, 430A, 530A, 630A, as a result of the maximum displacement of the light blocking portion toward each of the left and right sides in the X-axis direction from the normal position with respect to the common electrode 30, 130, 230, 330, 430, 530, 630, 730.

(5) In the configurations described in the second to the fourth embodiments, the distance d1 may be larger or smaller than "L1/2". Similarly, the distance d2 may be larger or smaller than "L2/2".

(6) The light blocking portion 43, 143, 243, 343, 443, 543, 643, 743 may be configured such that the inclined portion 45, 145, 245, 345, 445, 545, 645, 745 is included in only one end portion 44, 144, 244, 344, 444, 544, 644, 744 of the pair of left and right end portions 44, 144, 244, 344, 444, 544, 644, 744.

(7) The specific planar shape of the light blocking portion 43, 143, 243, 343, 443, 543, 643, 743 can be appropriately changed to a shape other than that illustrated in each embodiment. For example, the length of the light blocking portion 43, 143, 243, 343, 443, 543, 643, 743 in the Y-axis direction may be equal to the length of the pixel electrode 28 in the Y-axis direction. The length of the light blocking portion 43, 143, 243, 343, 443, 543, 643, 743 in the Y-axis direction may be longer than the length of the pixel electrode 28 in the Y-axis direction. The light blocking portion 43, 143, 243, 343, 443, 543, 643, 743 may extend along the Y-axis direction across the plurality of pixels GPX, BPX, and RPX, or may be provided to cross the display region AA in the Y-axis direction in some cases.

(8) The planar shape of the slit 30A, 130A, 230A, 330A, 430A, 530A, 630A can be appropriately changed to a shape other than that illustrated in each embodiment. For example, the planar shape of the slit 30A, 130A, 230A, 330A, 430A, 530A, 630A may be a V shape or the like. In this case, the planar shape of the pixel electrode 28 may also be a V shape or the like corresponding to that of the slit 30A, 130A, 230A, 330A, 430A, 530A, 630A. Furthermore, the slit 30A, 130A, 230A, 330A, 430A, 530A, 630A may be inclined toward a side opposite to that illustrated in each of the drawings. Specifically, the second direction which is the extension direction of the slit 30A, 130A, 230A, 330A, 430A, 530A, 630A may be a direction from the lower right to the upper left illustrated in FIG. 8 and the like. In this case, the extension direction of the pixel electrode 28, 628 may be a direction from the lower right to the upper left illustrated in FIG. 8 and the like.

(9) The planar shape of the pixel electrode 28, 628 can be appropriately changed to a shape other than that illustrated in each embodiment. For example, the planar shape of the pixel electrode 28, 628 may be a vertically long or horizontally long rectangular shape or the like.

(10) The extension direction of the slit 30A, 130A, 230A, 330A, 430A, 530A, 630A may include a plurality of directions. Specifically, the slit 30A, 130A, 230A, 330A, 430A, 530A, 630A whose extension direction is the direction from the lower left to the upper right illustrated in FIG. 8 and the like and the slit 30A, 130A, 230A, 330A, 430A, 530A, 630A whose extension direction is the direction from the lower right to the upper left illustrated in FIG. 8 and the like may be arranged alternately and repeatedly in the Y-axis direction. With this configuration, the alignment direction of the liquid crystal molecules varies among the pixels GPX, BPX, and RPX adjacent to each other in the Y-axis direction, in accordance with how the slit 30A, 130A, 230A, 330A, 430A, 530A, 630A is inclined. This is preferable in achieving a wider viewing angle. In addition to this example, a specific arrangement of the plurality of types of slits 30A, 130A, 230A, 330A, 430A, 530A, and 630A with different extension directions can be appropriately set.

(11) The "upper layer electrode" that is the electrode among the pixel electrode 28, 628 and the common electrode 30, 130, 230, 330, 430, 530, 630, 730 located on the upper layer side may be the pixel electrode 28, 628, and the "lower layer electrode" that is the electrode located on the lower layer side may be the common electrode 30, 130, 230, 330, 430, 530, 630, 730. In this case, the slit 30A, 130A, 230A, 330A, 430A, 530A, 630A is provided in the pixel electrode 28, 628 which is the "upper layer electrode". In this case, the light blocking portion 43, 143, 243, 343, 443, 543, 643, 743 is disposed on the upper layer side of the pixel electrode 28, 628. Thus, an insulating film may be provided between the pixel electrode 28, 628 and the light blocking portion 43, 143, 243, 343, 443, 543, 643, 743.

(12) The semiconductor film may be a silicon thin film (polycrystalline silicon thin film) or an amorphous silicon thin film.

(13) The alignment film 20PI, 39 may be subjected to alignment treatment through rubbing.

(14) Instead of the second circuit portion 14B, a source driver may be mounted on the array substrate 21, 121, 221 using Chip On Glass (COG).

(15) Part of or the entirety of at least one of the first circuit portion 14A and the second circuit portion 14B may be disposed in the display region AA.

(16) The circuit portion 14 may be omitted.

(17) The materials of the substrates 20GS and 21GS may be synthetic resins or the like other than glass.

(18) The specific numerical value of the pixel density of the liquid crystal panel 11 can be changed as appropriate.

(19) The display mode of the liquid crystal panel 11 may be an IPS mode or the like.

(20) The planar shape of the liquid crystal panel 11 may be a horizontally long rectangular shape, a vertically long rectangular shape, a square shape, a circular shape, a semi-circular shape, an elliptical shape, an oval shape, a trapezoidal shape, or the like.

(21) The counter-side light blocking portion 20BM may be formed in a lattice shape in plan view so as to overlap the plurality of gate wiring line 25 and the plurality of source wiring lines 26 provided to the array substrate 21.

(22) In addition to the head-mounted display 10HMD, the present disclosure can be applied to, for example, a head-up display, a projector, or the like as a device that enlarges and displays an image displayed on the liquid crystal panel 11 using a lens or the like. The present disclosure can be also applied to a display device that does not have an enlarged display function (a television receiver, a tablet terminal, a smartphone, or the like).

(23) In the configuration described in the seventh and the eighth embodiments, the fourth angle θ4 formed between the X-axis direction and the extension direction of the source wiring line 626, 726 and the color filter 629, 729 may be equal to the first angle θ1 formed between the X-axis direction and the extension direction of the slit 630A.

(24) In the configuration described in the seventh and the eighth embodiments, the third angle portion 646 of the light blocking portion 643, 743 may be configured to be parallel to the Y-axis direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A display device comprising:
a first color filter;
a second color filter arranged side by side with the first color filter in the same layer, and exhibiting a color different from a color exhibited by the first color filter;
a first pixel electrode disposed on an upper layer side of the first color filter, and overlapping the first color filter;
a second pixel electrode disposed on an upper layer side of the second color filter, and overlapping the second color filter;
a common electrode disposed on an upper layer side or a lower layer side of the first pixel electrode and the second pixel electrode, and overlapping the first pixel electrode and the second pixel electrode;
an insulating film interposed between the first pixel electrode and the common electrode and between the second pixel electrode and the common electrode; and
a light blocking portion disposed at a first boundary between the first color filter and the second color filter on the upper layer side of the first color filter and the second color filter,
wherein, among the first pixel electrode, the second pixel electrode, and the common electrode, an electrode located on an upper layer side of the insulating film is an upper layer electrode, and another electrode located on a lower layer side of the insulating film is a lower layer electrode,
an arrangement direction of the first color filter and the second color filter is a first direction,
a portion of the upper layer electrode overlapping the lower layer electrode is provided with a slit extending along a second direction inclined with respect to the first direction,
an inclined portion extending along a third direction inclined toward the same side as the second direction with respect to the first direction is included in an end portion, of outer peripheral end portions of the light blocking portion, adjacent to the slit in the first direction,
a second angle of the inclined portion that is an angle formed by the third direction with respect to the first direction is larger than a first angle that is an angle formed by the second direction with respect to the first direction,
the first color filter includes a plurality of first color filters arranged in the first direction,
the slit includes a plurality of first slits, each overlapping a corresponding first color filter of the plurality of first color filters,
the light blocking portion includes a plurality of light blocking portions arranged in the first direction, and
each first slit of the plurality of first slits is arranged alternately with each light blocking portion of the plurality of light blocking portions in the first direction.
2. The display device according to claim 1,
wherein the inclined portion is disposed intersecting an edge portion of the slit in the upper layer electrode in a plan view.
3. The display device according to claim 1,
wherein the end portion of the light blocking portion includes a third angle portion forming a third angle, larger than the second angle, with respect to the first direction, and
the inclined portion is provided in such a manner that a boundary with the third angle portion matches an intersection between the edge portion of the slit and the end portion as a result of expected maximum displacement of the upper layer electrode and the light blocking portion in the first direction.
4. The display device according to claim 1,
wherein the end portion of the light blocking portion includes a third angle portion forming a third angle, larger than the second angle, with respect to the first direction, and
the inclined portion is provided in such a manner that a second boundary with the third angle portion is located in the slit as a result of an expected maximum displacement of the upper layer electrode and the light blocking portion in the first direction.
5. The display device according to claim 4,
wherein a distance between the second boundary and an intersection between an edge portion of the slit and the end portion, as a result of the expected maximum displacement of the upper layer electrode and the light blocking portion in the first direction, is longer than a distance between a center position of the end portion in a length direction and the intersection.
6. The display device according to claim 1,
wherein the inclined portion is provided with the second angle being in a range having an upper limit value of 87° and a lower limit value of an angle that is larger than the first angle by 3°.
7. The display device according to claim 1,
wherein the slit further includes a second slit overlapping the second color filter,
the outer peripheral end portion of the light blocking portion includes a first end portion adjacent to the first slit in the first direction and a second end portion adjacent to the second slit in the first direction, and
the inclined portion includes a first inclined portion included in the first end portion and a second inclined portion included in the second end portion.
8. The display device according to claim 1,
wherein the light blocking portion is disposed on an upper layer side of the upper layer electrode.
9. The display device according to claim 8,
wherein the upper layer electrode is the common electrode, and
the light blocking portion is directly layered on the common electrode.
10. The display device according to claim 1, further comprising:
a wiring line disposed on the lower layer side than the first color filter and the second color filter, at a boundary between the first color filter and the second color filter,
wherein the first color filter, the second color filter, and the wiring line each include a portion extending in a fifth direction inclined toward the same side as the second direction with respect to the first direction.
11. The display device according to claim 10,
wherein the slit is provided with the first angle being smaller than a fourth angle being an angle formed by the fifth direction with respect to the first direction.
12. The display device according to claim 10,
wherein the end portion of the light blocking portion includes a third angle portion forming a third angle, larger than the second angle, with respect to the first direction, and
the first color filter, the second color filter, and the wiring line have a fourth angle being equal to the third angle, the fourth angle being an angle formed by the fifth direction with respect to the first direction.

13. The display device according to claim 10,
wherein the first color filter, the second color filter, and the wiring line have a fourth angle being equal to the second angle, the fourth angle being an angle formed by the fifth direction with respect to the first direction.

14. The display device according to claim 10,
wherein a dimension of a portion of the light blocking portion including the inclined portion in the first direction is larger than a dimension of the wiring line in the first direction.

15. The display device according to claim 1,
wherein a dimension of the light blocking portion in the first direction is smaller than a dimension of the first pixel electrode in the first direction.

16. The display device according to claim 1,
wherein a center position of the light blocking portion in a fourth direction orthogonal to the first direction is substantially the same as a center position of the first pixel electrode, in the fourth direction, which is aligned with the light blocking portion in the first direction.

17. The display device according to claim 1,
wherein only one slit is provided for a corresponding one portion of the upper layer electrode overlapping the lower layer electrode.

\* \* \* \* \*